(12) United States Patent
Reynolds et al.

(10) Patent No.: US 9,230,142 B2
(45) Date of Patent: Jan. 5, 2016

(54) DIMENSIONING AND BARCODE READING SYSTEM

(71) Applicant: Datalogic Automation, Inc., Telford, PA (US)

(72) Inventors: Edward Reynolds, Doylestown, PA (US); Edward Douglas Hatton, Peterborough (CA); Mehul Patel, Wrightstown, PA (US)

(73) Assignee: DATALOGIC AUTOMATION, INC., Telford, PA (US)

( * ) Notice: Subject to any disclaimer, the term of this patent is extended or adjusted under 35 U.S.C. 154(b) by 284 days.

(21) Appl. No.: 13/752,091

(22) Filed: Jan. 28, 2013

(65) Prior Publication Data

US 2013/0200150 A1    Aug. 8, 2013

Related U.S. Application Data

(63) Continuation of application No. 13/227,148, filed on Sep. 7, 2011, now Pat. No. 8,360,318, which is a continuation of application No. 12/251,626, filed on Oct. 15, 2008, now abandoned.

(60) Provisional application No. 60/980,360, filed on Oct. 16, 2007.

(51) Int. Cl.
*G06K 7/10* (2006.01)
*G06K 7/015* (2006.01)
*G06K 7/00* (2006.01)

(52) U.S. Cl.
CPC .............. *G06K 7/015* (2013.01); *G06K 7/0095* (2013.01); *G06K 7/10722* (2013.01); *G06K 7/10792* (2013.01); *G06K 7/10861* (2013.01)

(58) Field of Classification Search
USPC ........................................ 73/1.01; 235/462.01
See application file for complete search history.

(56) References Cited

U.S. PATENT DOCUMENTS

| | | | |
|---|---|---|---|
| 5,550,362 A | 8/1996 | Sherman | |
| 5,555,090 A * | 9/1996 | Schmutz | 356/601 |
| 6,177,999 B1 | 1/2001 | Wurz et al. | |
| 6,603,563 B1 | 8/2003 | Gagliano | |

(Continued)

OTHER PUBLICATIONS

PCT International Search Report dated Dec. 11, 2008, for PCT application No. PCT/US08/79937.

(Continued)

*Primary Examiner* — Rafferty Kelly
(74) *Attorney, Agent, or Firm* — Nelson Mullins Riley & Scarborough, LLP

(57) ABSTRACT

A system and method for auto-calibrating a barcode scanning tunnel to determine the orientation of one or more cameras with respect to a range finder and a conveyor belt comprises providing a scanning tunnel having a moveable surface, at least one range finder having an orientation, at least one camera having an orientation and at least one calibration object having at least one indicia disposed in a predetermined relationship to one or more features of the at least one calibration object, capturing at least one image of the at least one calibration object by the at least one camera, electronically detecting the at least one calibration object at least one indicia and the one or more object features and electronically calculating at least one component of the at least one camera orientation with respect to the moveable surface in response to information obtained from the image and the at least one calibration object at least one indicia.

30 Claims, 37 Drawing Sheets

(56) References Cited

U.S. PATENT DOCUMENTS

| | | |
|---|---|---|
| 6,847,859 B2 | 1/2005 | Nuebling et al. |
| 6,888,640 B2 | 5/2005 | Spina et al. |
| 6,892,230 B1 | 5/2005 | Gu et al. |
| 7,055,363 B2 | 6/2006 | Furze et al. |
| 7,070,099 B2 | 7/2006 | Patel |
| 7,164,108 B2 | 1/2007 | Lofthouse-Zeis et al. |
| 7,478,753 B2 | 1/2009 | Patel et al. |
| 2005/0108369 A1 | 5/2005 | Sather et al. |
| 2006/0043191 A1 | 3/2006 | Patel et al. |
| 2006/0047787 A1 | 3/2006 | Agarwal et al. |

OTHER PUBLICATIONS

PCT Written Opinion of the International Searching Authority dated Dec. 11, 2008, for PCT application No. PCT/US08/79937.

European Search Report dated Jun. 6, 2013, for corresponding application No. 08838877.2.

Response to Preliminary Search Report dated Jun. 21, 2013, for corresponding European application No. 08838877.2.

\* cited by examiner

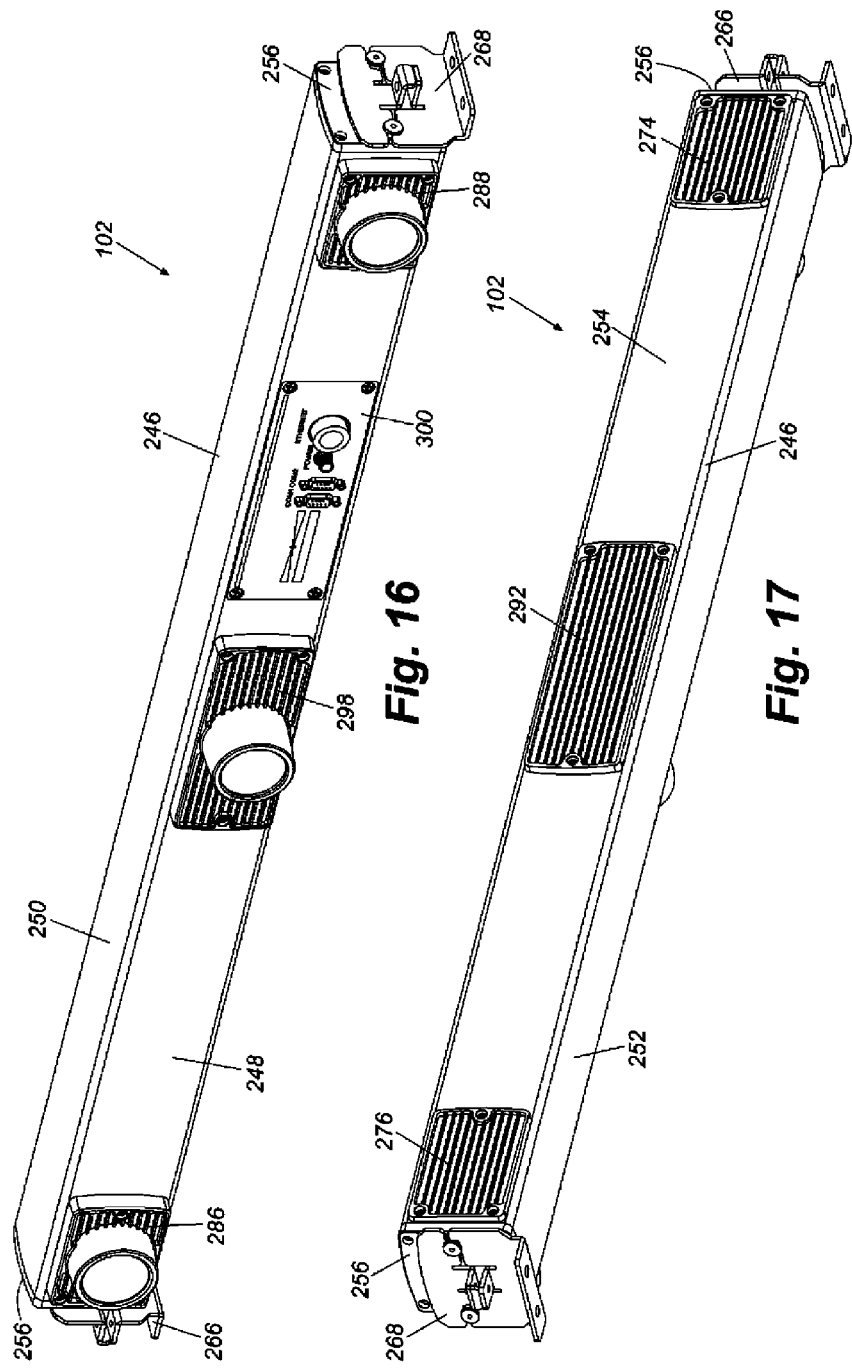

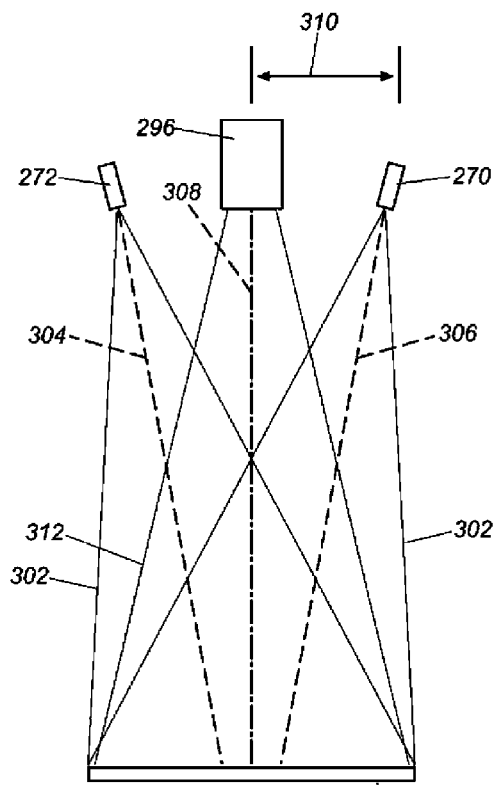
Fig. 19
Fig. 20
Fig. 21

Calibration box with target patterns

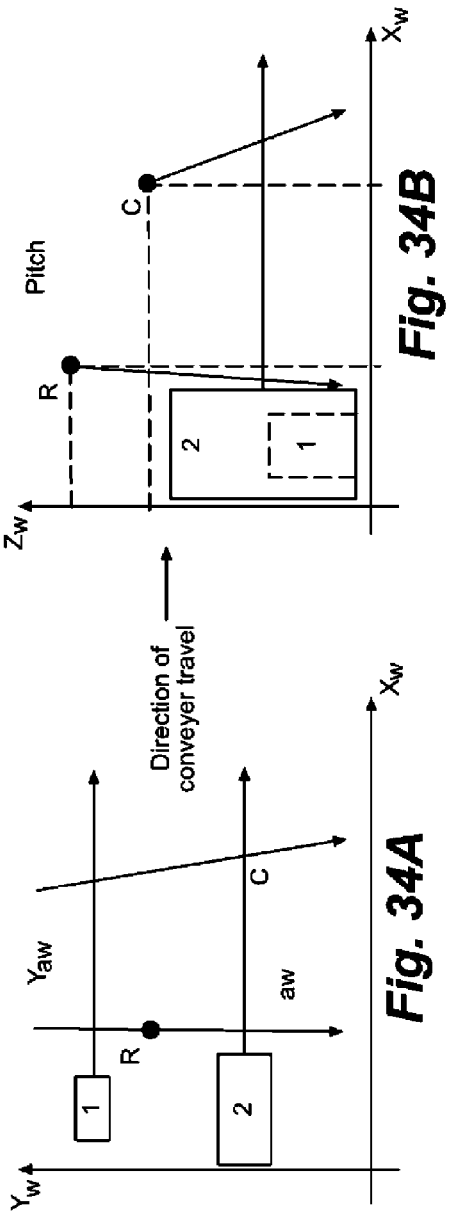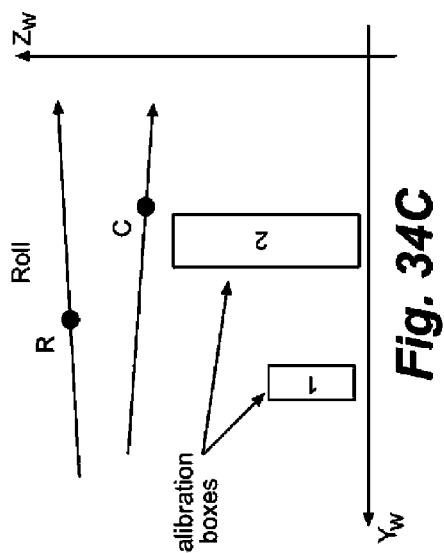
Fig. 34A
Fig. 34B
Fig. 34C

DIMENSIONING AND BARCODE READING SYSTEM

The present application is a continuation of U.S. application Ser. No. 13/227,148 (now U.S. Pat. No. 8,360,318), filed Sep. 7, 2011, which is a continuation of U.S. application Ser. No. 12/251,626 (abandoned), filed Oct. 15, 2008, which claims priority to U.S. provisional application Ser. No. 60/980,360, filed Oct. 16, 2007, entitled DIMENSIONING AND BARCODE READING SYSTEM, the entire disclosure of each of which is hereby incorporated by reference herein.

FIELD OF THE INVENTION

The present invention relates to conveyor systems and, more particularly, to conveyor systems having networked components.

BACKGROUND OF THE INVENTION

Referring to art FIG. 1, a known dimensioning system 10 includes a conveyor system 12 that moves items along a path of travel, and a component system 14 adjacent to the conveyor system that tracks packages being moved by the conveyor system. Conveyor system 12 includes a number of rollers 16, a belt 24, a bed 18 and a tachometer 20. It should be understood that the conveyor can move the items through the path of travel by means other than belts, for example by driven rollers. Rollers 16 are motor-driven rollers that move conveyor belt 24 in a direction denoted by arrows 26 over bed 18, which provides support to the belt. For purposes of the present discussion, the direction corresponding to the start of conveyor system 12 is referred to as "upstream," whereas the direction in which conveyor belt 24 moves is referred to as "downstream."

Tachometer 20 is beneath and in contact with the surface of conveyor belt 24 and rotates with the belt as the belt moves in the direction of arrows 26. As tachometer 20 rotates, it outputs a signal comprising of a series of pulses corresponding to the conveyor belt's linear movement and speed. Tachometer 20, and other devices that provide signals corresponding to the rate of movement of a conveyor belt, from which the locations of items moving in a path of travel along the belt can be determined, should be understood by those of ordinary skill in the art. In general, the number of pulses output by tachometer 20 corresponds to the linear distance traveled by the belt, while pulse frequency corresponds to the belt's speed. The number of tachometer pulses per unit of measurement defines the resolution of the tachometer and its ability to precisely measure the distance that the conveyor belt has moved. Tachometer 20 may be replaced by a shaft encoder, particularly where less accurate measurements are needed.

Component system 14 includes a dimensioner 28, a plurality of barcode scanners 32, and a computer 36, all of which are attached to a frame 38. Frame 38 supports dimensioner 28 and at least one barcode scanner 32 horizontally above conveyor belt 24 so that beams of light emitted by the dimensioner and scanners intersect the top surfaces of packages moved by the belt. Frame 38 also supports additional scanners 32 vertically adjacent to conveyor belt 24 so that beams of light emitted by these scanners intersect the side, back, front or bottom surfaces of packages moved by the belt. One example of prior art scanners include QUAD X laser barcode scanners manufactured by Accu-Sort Systems, Inc. of Telford, Pa., although it should be understood that cameras or other suitable barcode readers could be used, depending on the needs of a given system.

As should be understood in this art, dimensioner 28 detects one or more dimensions of an item on a conveyor. The dimensioner is disposed along the conveyor at a known position relative to the bar code readers. When a package moving along the conveyor reaches the dimensioner, the dimensioner processor opens a package record, determines height, width and length, associates that data in the package record, and outputs the dimension data to the system processor in association with tachometer data that corresponds to the package's location at the dimensioner. Upon receiving the dimensioner data, the system processor opens a package record and associates with the package record the dimension and tachometer data received from the dimensioner.

The system processor also sets an open read window variable and a close read window variable for the barcode scanner. The open read window variable for the barcode scanner is equal to the tachometer value for the downstream-most point on the package, plus a known distance (in tachometer pulses) between the dimensioner and a predetermined position in the path of travel with respect to the barcode scanner. The close read window variable for the barcode scanner is equal to the tachometer value for the upstream-most point on the package, plus a known distance (in tachometer pulses) between the dimensioner and the predetermined position with respect to the barcode scanner.

As should be understood in this art, barcode reader 32 may comprise a laser scanner that projects a plurality of laser lines on the belt, for example in a series of "X" patterns. The scanner outputs a signal that includes barcode information reflected back from the laser lines and a barcode count, which indicates the position in the X patterns at which given barcode information was seen. Thus, the barcode count provides the lateral position on the belt, and the longitudinal position with respect to the centerline of the X patterns, corresponding to the barcode information. The barcode scanner assembly has a photodetector disposed along the conveyor immediately upstream from the X patterns. A processor at barcode scanner assembly 32 monitors the photodetector's output signal and thereby determines when the package's front and back edges pass the photodetector. The barcode scanner also receives the tachometer output. By associating the passage of the package's front and back edges by the photodetector with the tachometer data, the barcode scanner processor determines when the package passes through the X patterns. The barcode scanner processor accordingly determines when valid barcode data may be acquired for the package and acquires the barcode data during that period.

The barcode processor accumulates barcode data while a given package passes through the X patterns and transmits the accumulated barcode data to the system processor when the package reaches a predetermined point in the path of travel following the barcode scanner. More specifically, the barcode scanner processor knows when the front edge of the package passes by the barcode scanner photodetector. After acquiring the package's barcode data over a period based on the package's length, the barcode scanner processor holds the barcode data until a tachometer value the barcode scanner processor associates with the barcode data accumulates to a point indicating that the front edge of the package is at the predetermined point downstream of the scanner. The predetermined point is defined so that the longest package the system is expected to handle can clear the scanner's X patterns. The barcode scanner processor then outputs the barcode data to the system processor.

The system processor relies on tachometer pulses to correctly associate barcode data with a package record. The system processor determines the accumulated tachometer value at the time the barcode data is received from the barcode scanner processor. The open read window and close read window barcode variables for each package structure correspond to the distance between the dimensioner and the predetermined point downstream from the barcode scanner. Thus, the system processor compares the tachometer value associated with the received barcode data with the open read window and close read window barcode variables for the open package structures it maintains in memory. If the tachometer value is between the open read window barcode variable and close read window barcode variable for any open package structure, the system processor assigns the barcode data to that package record. If the tachometer value does not fall within the open window and close window barcode variables stored for any open package record, the barcode data is not assigned to a package record.

The described system of FIG. 1 was directed to barcode scanners that project an X-pattern across the belt. It should be understood to those skilled in the art that X-pattern scanners can be replaced with line scan cameras for detecting and reading barcodes. Line scan cameras like barcode scanners are bulky and heavy and require more than one technician to install and calibrate the scanner in scanning tunnel.

To initially set up and calibrate system 10, the camera tunnel frame is set up and the barcode cameras are mounted to the frame so that they are positioned and orientated properly with respect to the conveyor belt. This requires several technicians to lift the cameras into place in the tunnel and secure them to the frame. In general, prior art cameras are unitary structures that are bulky and cumbersome for a single technician to lift and secure. Moreover, because the cameras operate with high power, a large amount of heat must be expelled from the camera housing so as not to damage the camera electronics and optics. Thus, fans are enclosed in the camera housing to pull air through the housing to cool off the internal components.

Once installed, the cameras require time consuming set-up and calibration techniques and, if removed, the camera setup and calibration must be repeated. Technicians connect each camera to a computer to individually calibrate and set the camera's operating parameters. The technician inputs camera information directly into the camera processor via the computer and may save certain camera settings to a dongle or other portable storage device. Calibration data may include the angle of orientation of the camera, the height of the camera and the location of the camera with respect to the belt and the dimensioner. Once each camera is calibrated and set-up in the tunnel, the cameras are connected to a central computer that receives information captured and processed by each camera. However, should a camera break or need to be serviced, a full calibration and set-up is necessary for the camera being replaced and possibly for the overall tunnel to ensure that all components of the tunnel are properly aligned.

In the system shown in FIG. 1, dimensioner 28 is a triangulation type dimensioner similar to those disclosed in U.S. Pat. Nos. 6,775,012, 6,177,999, 5,969,823, and 5,661,561, the entire disclosures of which are incorporated by reference herein. With regard to these embodiments, dimensioner 28 comprises a light source, such as a laser and a rotating reflector disposed within the dimensioner housing that produce a scanning beam (denoted in phantom at 40) that is directed down at conveyor belt 24. That is, the rotating reflector scans the single point light source across the width of belt 24. Each angular position of the reflector represents an x-axis location across the belt. Scanning beam 40 intersects belt 24 at line 42 in a manner that is transverse (x-axis 80) to the belt's linear movement (y-axis 82) in the path of travel at a fixed angle with respect to an axis normal (z-axis 84) to the belt's surface. Packages moving on belt 24, such as package 62, intersect scanning beam 40, thereby creating an offset in the scanning beam in the y-direction (along y-axis 82). In particular, the laser light source is positioned downstream in the y-axis 82 direction so that the plane of light is reflected at an angle from z-axis 84. Thus, as a box moves downstream the intersection of the plane of light is a continuous line across the belt in along x-axis 80. When a box intersects the plane of light, the portion of the plane intersected by the box will shift forward toward the light source since the light on the box travels a shorter distance than the light that intersects the belt on the left and right sides of the box. This offset or shift in the light on the box surface is proportional to the height of the box.

Both conveyor belt 24 and the packages thereon reflect light created by the scanning beam back to the rotating mirror, which reflects light to a linear array of line scan CCD detectors or a CMOS imager (not shown) within dimensioner 28. The array is oriented parallel to y-axis 82. Because the rotating mirror reflects both the outgoing and reflected laser light, the mirror returns the reflected light to a constant x-axis position, but the reflected light shifts in the y-direction correspondingly to the shift in line 42 caused by the height of a package 62 and the angle at which the scanned laser beam intersects the belt. Thus, the linear array of CCD or CMOS detectors must be accurately aligned in the y-direction to thereby detect the return light's y-axis shift. Moreover, because the array is made up of a single line of pixel sensors, the alignment is critical to detect the reflected light. If the axis of the linear sensor is misaligned with the fixed x-axis point where the mirror directs the reflected light, the sensor will not detect the change in height. The rotating mirror's angular position corresponds to the x-axis position of any given point of reflected light.

Dimensioner 28 generates a signal representative of the height of an object such as package 62 across conveyor belt 24 as described by the y-axis offset detected in scanning beam 40. The signal is also representative of the x-axis positions of the height data by association of that data with the mirror's angular position. Based on the height data and corresponding x-axis data, the dimensioner processor (not shown) determines the cross sectional height profile an object on the belt and, by accumulating such profiles along the object's length, the object's three dimensional profile.

As with the camera, technicians must lift and hold the dimensioner in place while it is secured to the tunnel frame. Next, levels are used to ensure that the dimensioner's detector is parallel to the face of the conveyor belt. If the dimensioner's detector array is out of a substantially parallel adjustment with respect to the belt, the dimensioner may obtain inaccurate dimensions of the object. Additionally, as previously described, should the line scan array not align properly with the rotating mirror, e.g. because of slight misalignments between the array and the rotating mirror, the dimensioner may not detect any shift in the light. Moreover, the rotating mirror may become misaligned during shipping or installation through jarring of the dimensioner.

SUMMARY

The present invention recognizes and addresses the foregoing considerations, and others, of prior art constructions and methods.

These and/or other objects are achieved in a preferred embodiment of a method of calibrating a barcode scanning tunnel, the method comprising providing a scanning tunnel having a moveable surface, at least one range finder having an orientation, at least one camera having an orientation and at least one calibration object having at least one indicia disposed in a predetermined relationship to one or more features of the at least one calibration object. The method further comprises the steps of capturing at least one image of the at least one calibration object by the at least one camera, electronically detecting the at least one calibration object at least one indicia and the one or more object features and electronically calculating at least one component of the at least one camera orientation with respect to the moveable surface in response to information obtained from the image and the at least one calibration object at least one indicia.

In some embodiments, the method further comprising electronically calculating a height and extents of the at least one calibration object by the at least one range finder by electronically detecting the one or more calibration object features. In other embodiments, the at least one indicia is a barcode. Yet in other embodiments, a plurality of indicia disposed in a predetermined relationship to the one or more features of the at least one calibration object. Still in other embodiments, the at least one or more features of the at least one calibration object further comprises at least one of a length, width and height of the at least one calibration object.

In another embodiment, a second calibration object is provided having a plurality of indicia disposed in a predetermined relationship to one or more features of the second calibration object.

In other embodiments, the predetermined relationship between the at lease one indicia and the one or more calibration object features further comprises knowing the distance of the at least one indicia from one or more edges of the calibration object. In yet other embodiments, the at least one indicia is formed from a plurality of bars, and a spacing between adjacent bars of the plurality of bars and the thickness of each bar of the plurality of bars is know with respect to the at least one or more calibration object features.

In some embodiments, the method further comprises calculating a positional relationship of the at least one camera, the at least one moveable surface and the at least one range finder with respect to one another. In still other embodiments, the step of electronically calculating at least one component of the at least one camera orientation with respect to the moveable surface further comprises calculating a relationship of the at least one calibration object indicia with respect to the one or more calibration object features, and comparing the calculated relationship to the predetermined relationship.

In another embodiment of a method of calibrating a barcode scanning tunnel, the method comprises providing a scanning tunnel having a conveyor belt, a range finder having an orientation with respect to the moveable surface, a plurality of cameras each having an orientation with respect to the movable surface and the range finder, and a plurality of calibration boxes each having a predefined length, width and height and each containing a plurality of barcodes disposed in predetermined relationship to at least one edge of the respective calibration box. The provided electronics captures a plurality of images of each of the plurality of calibration boxes by the range finder as each of the plurality of calibration boxes move along the conveyor belt, captures a plurality of images of each of the plurality of calibration boxes by each of the plurality of cameras as each of the plurality of calibration boxes move along the conveyor belt, electronically detects the length, the width and the height of each of the calibration boxes from the plurality of range finder images, electronically detects in each of the plurality of camera images of each of the plurality of calibration boxes at least one of the calibration box plurality of barcodes, calculates the relationship of each of the detected barcodes with respect to the at least one edge of the respective calibration box and electronically calculates each of the plurality of camera orientations based on the calculated relationship of each of the detected barcodes with respect to the at least one edge of the respective calibration box and its respective the predetermined relationship.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIGS. 16 and 17 are perspective views of a range finder in accordance with an embodiment of the present invention;

FIG. 19 is a schematic view of the range finder of FIG. 16;

FIG. 20 is a laser pattern for the range finder in accordance with an embodiment of the present invention;

FIG. 21 is an exploded view of a portion of the laser pattern shown in FIG. 20;

FIG. 34A is a top plan view of the conveyor system of FIG. 31;

FIG. 34B is a side plan view of the conveyor system of FIG. 31;

FIG. 34C is a back plan view of the conveyor system of FIG. 31;

Figure 1:
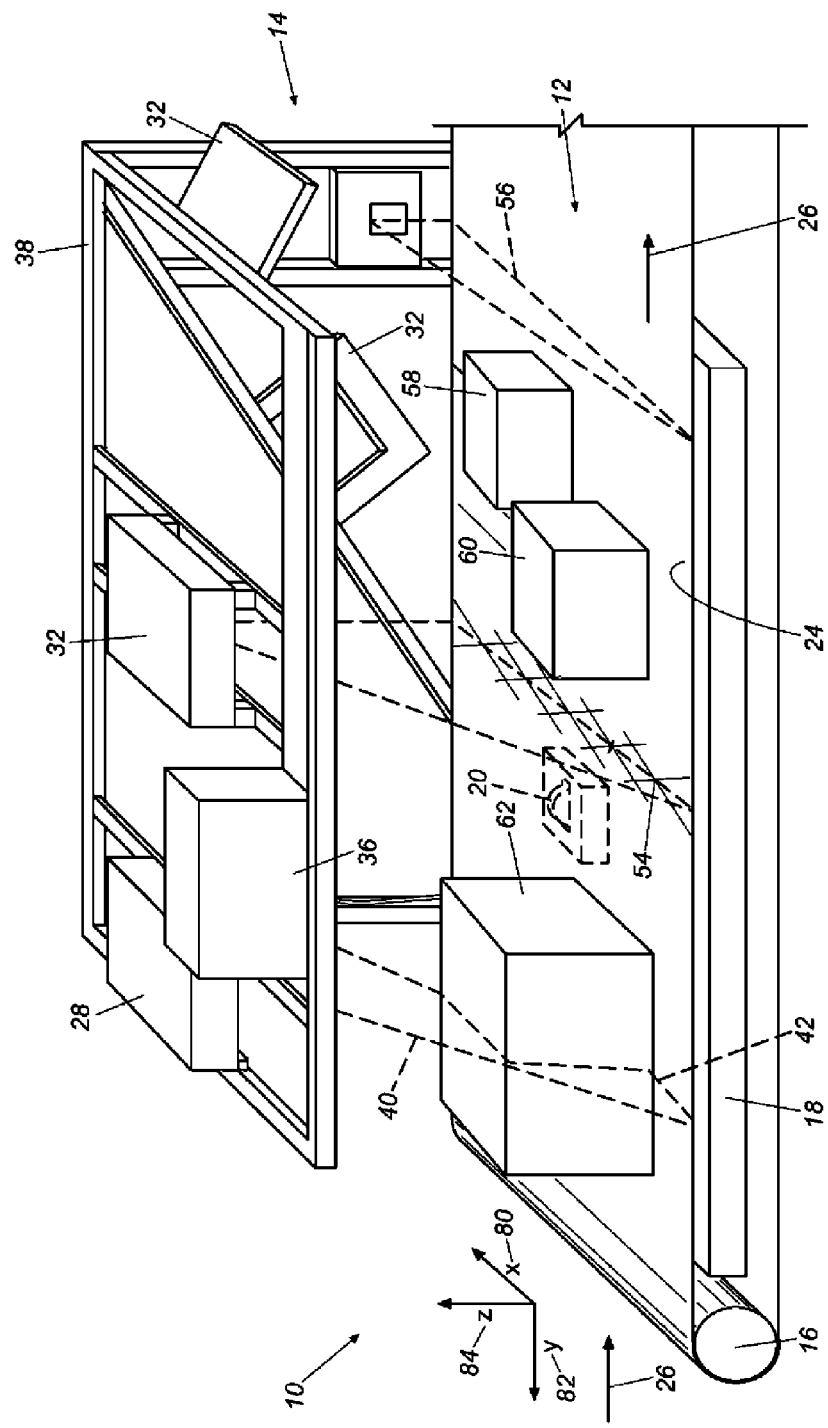
FIG. 1 is a prior art schematic representation of a dynamic dimensioning system.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Additional aspects and advantages of the invention will be set forth in part in the description which follows and, in part, will be obvious from the description, or may be learned by practice of the invention.

Figure 2:
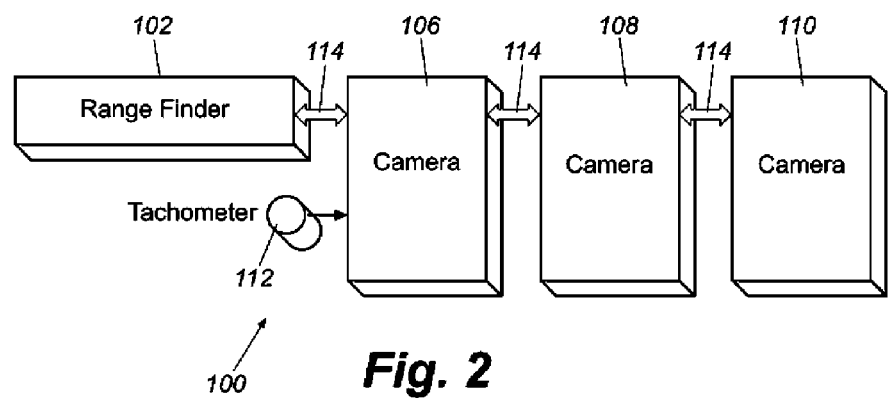
FIG. 2 is a block diagram of a dynamic dimensioning system in accordance with an embodiment of the present invention.

Referring to FIG. 2, a dynamic dimensioning system 100 generally comprises a range finder 102 or other dimensioning device (i.e., a dimensioner, light curtains, etc.) for determining the height and rough dimensions of a box being transported on a conveyor, multiple cameras 106, 108, 110 and a tachometer 112 connected to at least one camera 106 that outputs a signal representative of the movement of the conveyor belt. The range finder and the cameras are networked together by, for example, an Ethernet connection 114. While only three cameras are shown in FIG. 2, it should be understood that any number of cameras can be networked together to form a scanning tunnel. One of skill in the art should understand that Ethernet is a local-area network (LAN) architecture that uses a bus or star topology and supports data transfer rates of 10 Mbps. Ethernet uses the CSMA/CD access method to handle simultaneous demands and is one of the most widely implemented LAN standards. A newer version of Ethernet, called 100Base-T (or Fast Ethernet), supports data transfer rates of 100 Mbps, and the newest version, Gigabit Ethernet supports data rates of 1 gigabit (1,000 megabits) per second.

Figure 3:
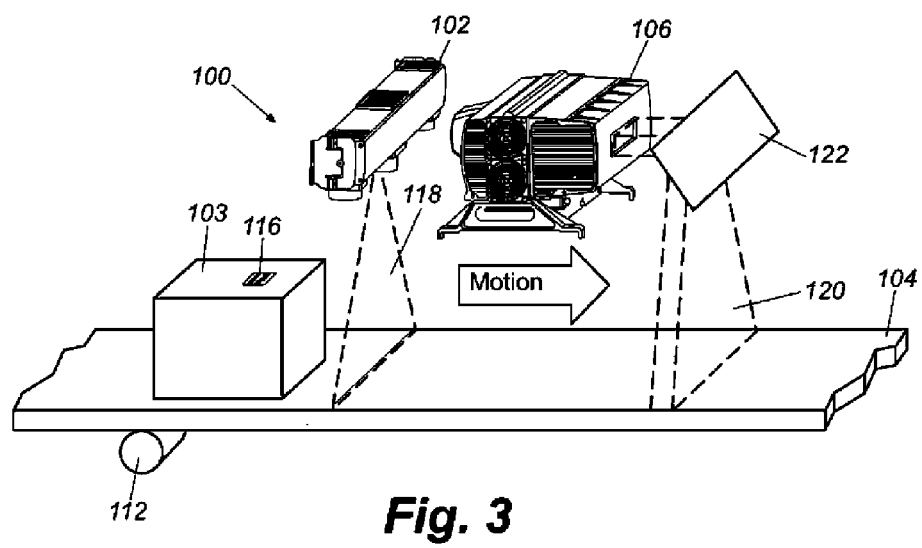
FIG. 3 is a schematic representation of a portion of the dynamic dimensioning system of FIG. 2.

Referring to FIG. 3, dynamic dimensioning system 100 scans objects, such as object 103, moving on a conveyor belt 104, decodes indicia, such as barcodes 116, located on the object and transmits the information to a host system (not shown) for further processing. Shown in the figure is a top read barcode camera 106 and range finder 102 in accordance with one embodiment of the present invention. In general, objects are moved through a field of view 118 of range finder 102. Range finder 102 detects the presence of object 103 and determines the range, extent and orientation of the object with respect to the conveyor belt. The extents of object refer to the left and right edges of the object along x-axis 80. The range finder generates an object start trigger that notifies the cameras (only one of which is shown in FIG. 3) of the presence of the object as well as an object end signal. Range finder 102 transmits height and extent data to camera module 106, which uses the information to focus its optics to maximize the efficiency and effectiveness of detecting and reading barcode 116.

Referring again to FIGS. 2 and 3, each camera 106, 108 and 110 uses the tachometer data to track the motion of object 103 through a field of view 120 of the camera's imaging sensor (not shown in FIGS. 2 and 3). Each camera processes the video data stream and locates and decodes any barcode data present on the object by detecting light reflected from the object being scanned. Once the object reaches a predetermined distance downstream from the tunnel system (this point is set by the host), the system transmits the barcode data to the host system for further processing. It should be understood that camera 106 may be mounted to direct its field of view 120 directly onto conveyor 104, or the field of view may be redirected by a mirror 122 as shown in FIG. 3. Redirect the field of view allows the camera to be positioned so that its scanning image is parallel to y-axis 82, where mirror 122 redirects the field of view along z-axis 84.

Figure 4:
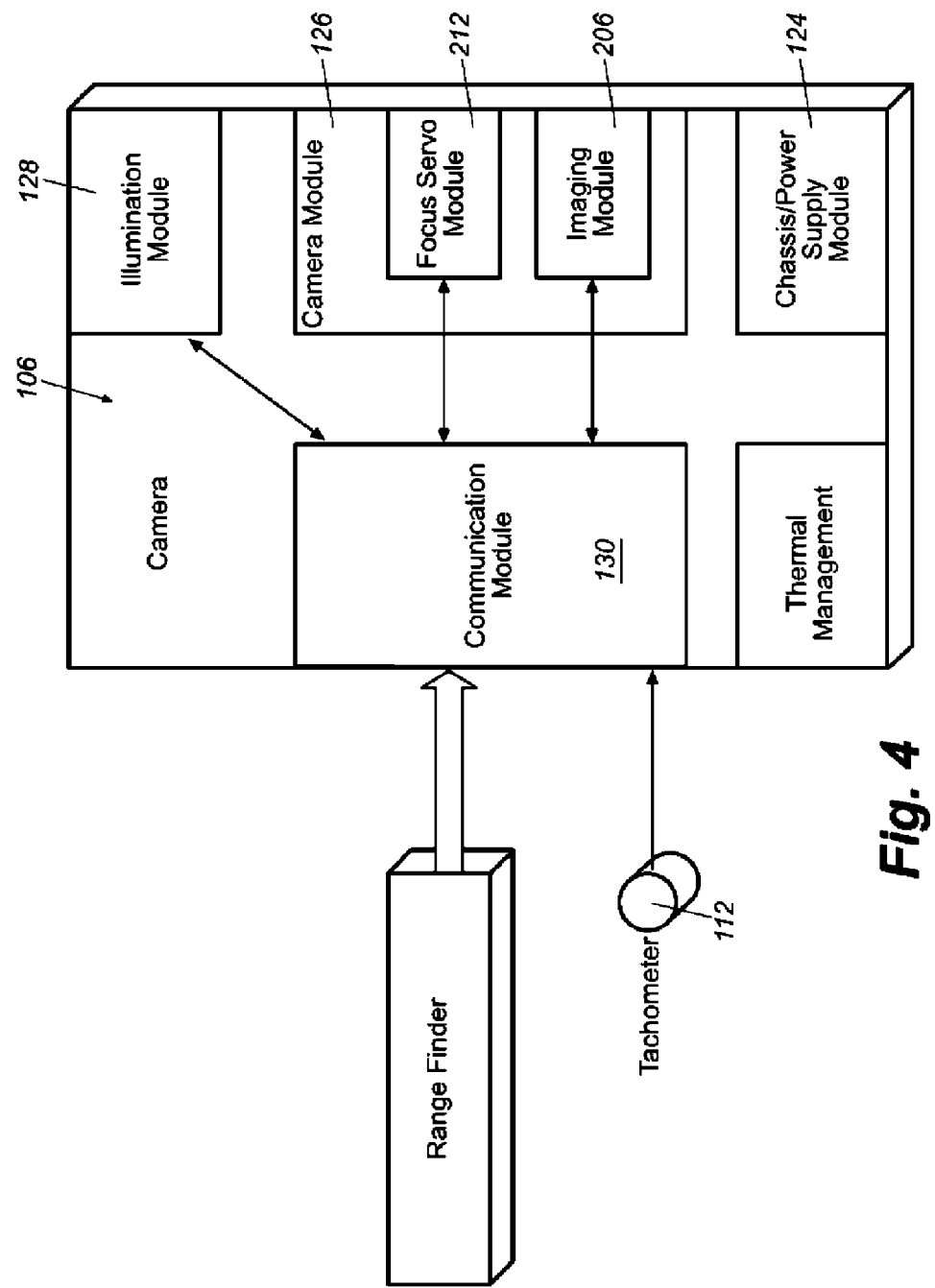
FIG. 4 is a block diagram of a camera for use in the dynamic dimensioning system of FIG. 2.
Figure 5:
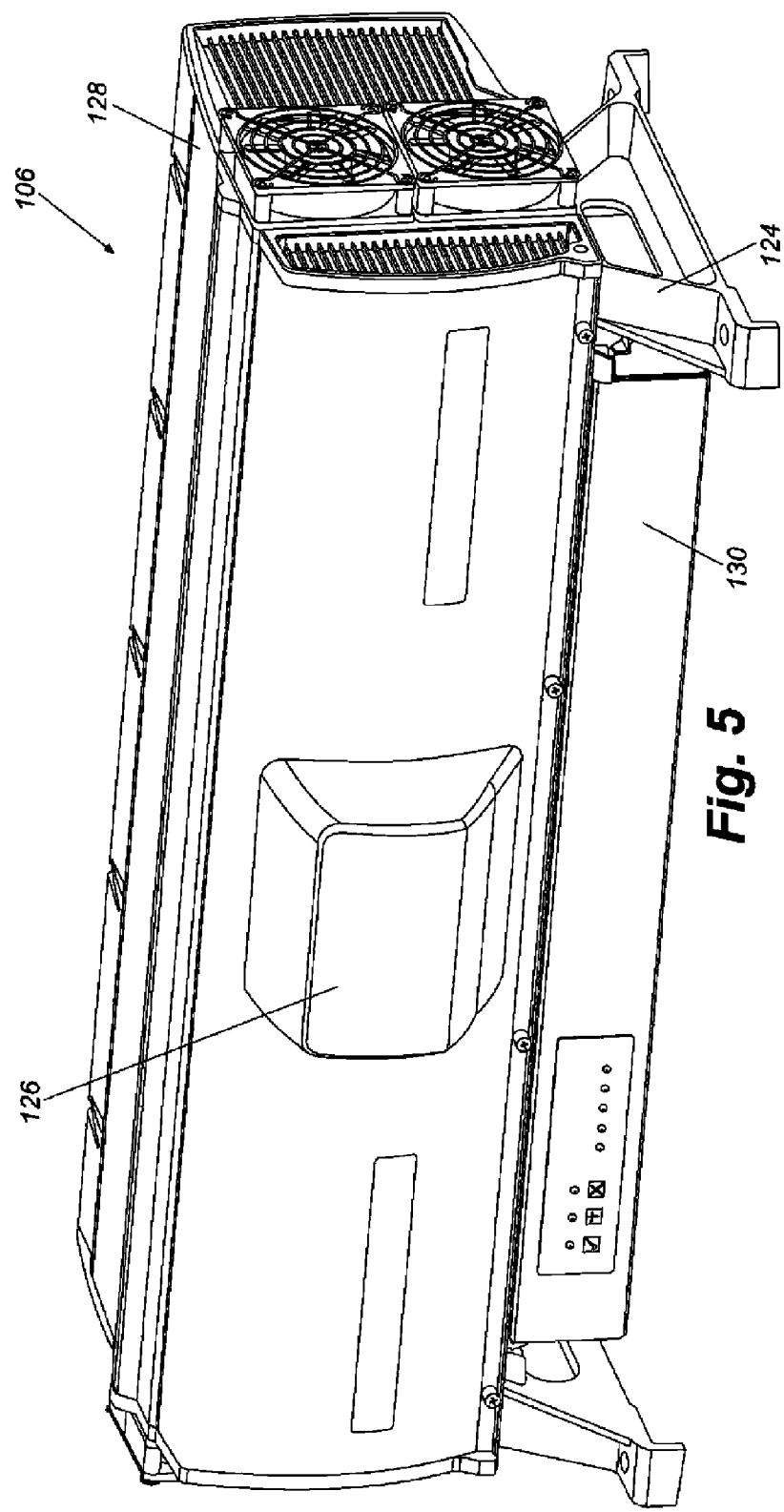
FIG. 5 is a perspective view of the camera shown in FIG. 4.
Figure 6:
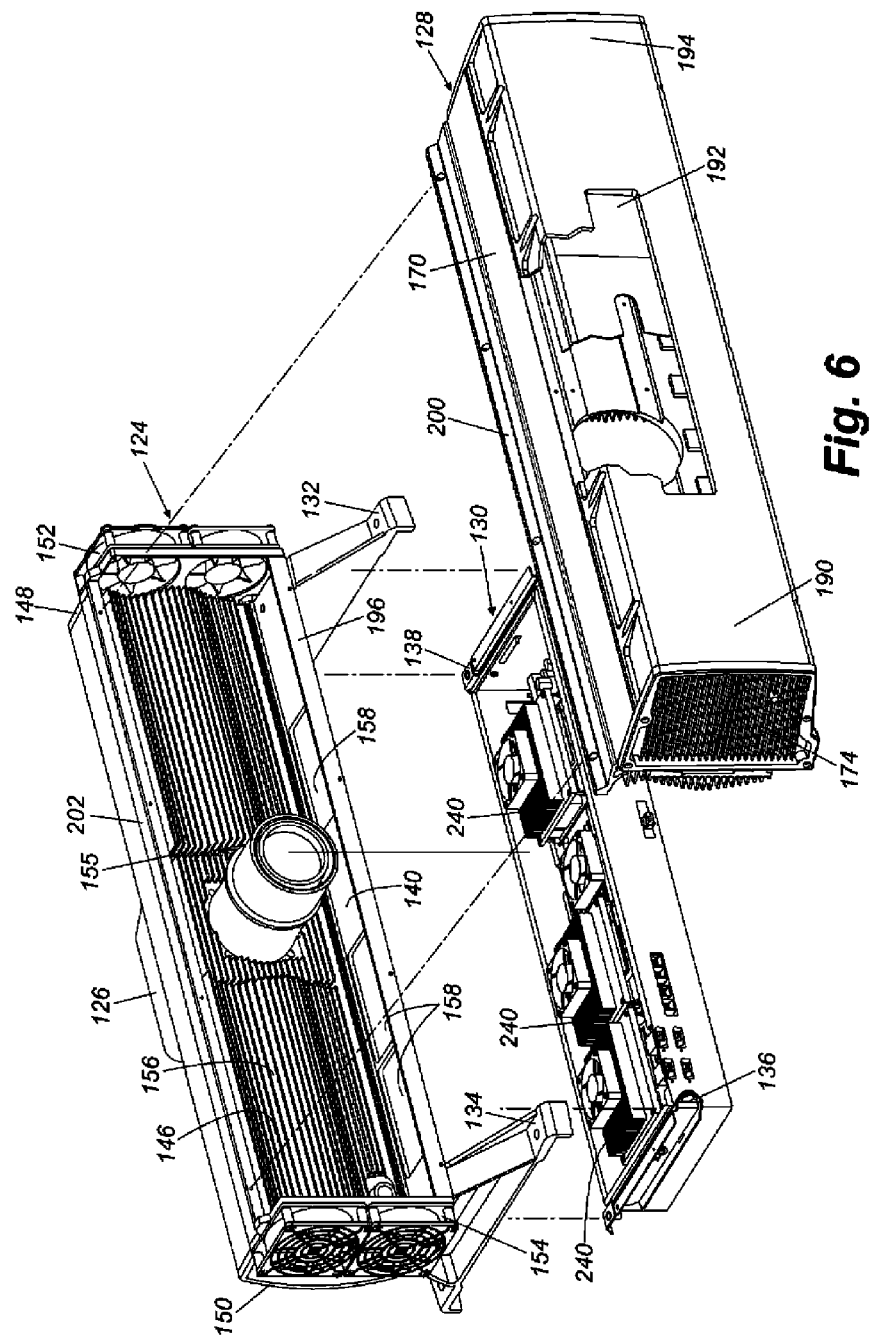
FIG. 6 is an exploded perspective view of the camera shown in FIG. 4.

For ease of discussion, only one of cameras 106, 108 and 110 will be discussed in detail, but it should be understood that cameras 106, 108 and 110 are structurally and electronically the same. Referring to FIGS. 4-6, camera has a chassis module 124, a camera module 126, an illumination module 128 and a distributed processing and communications module 130. The modular design allows for camera 106 to be disassembled during installation to reduce the amount of weight that must be lifted and mounted at any given time.

Figure 7:
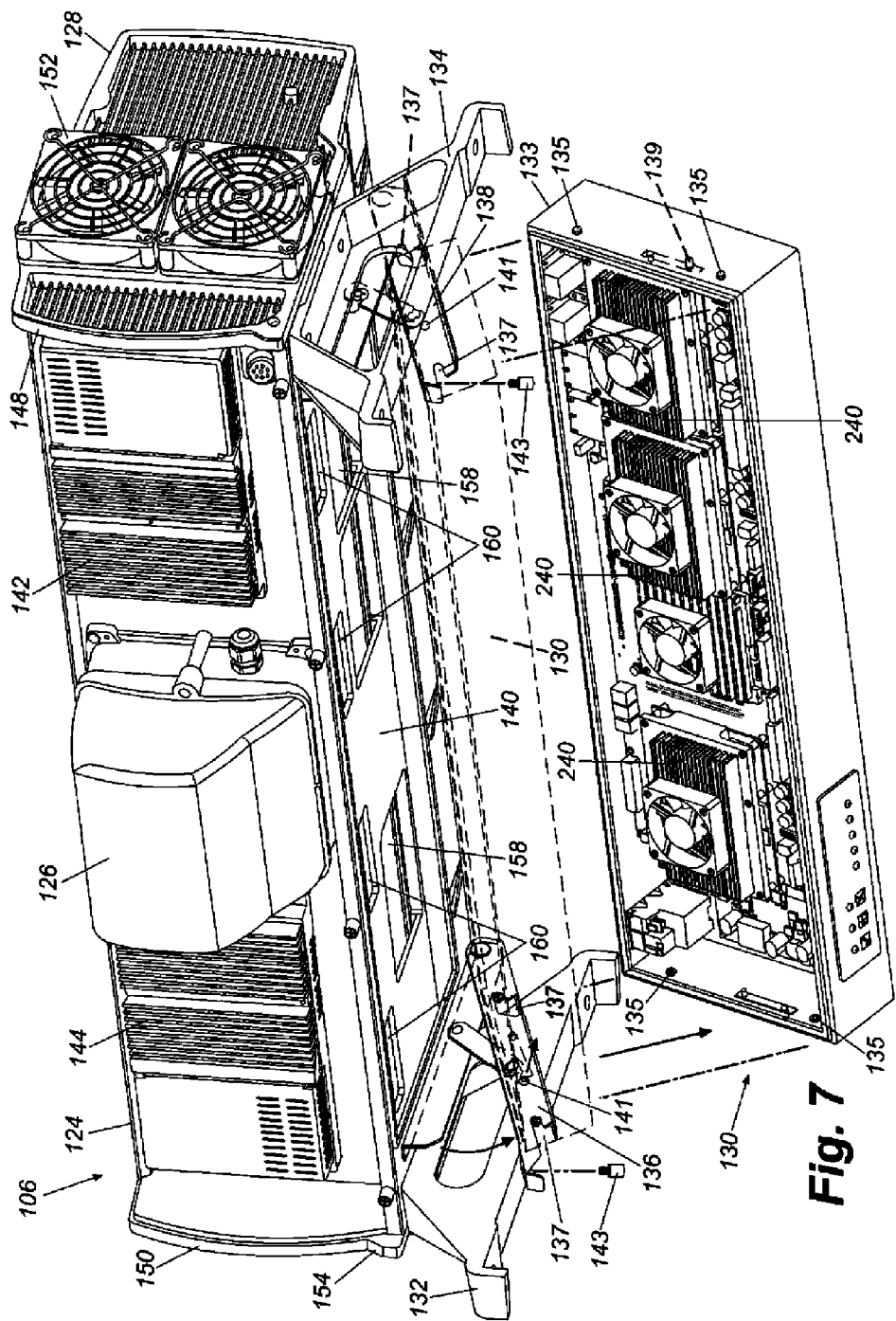
FIG. 7 is an partial exploded perspective view of the camera shown in FIG. 4.

Referring to FIG. 7, chassis module 124 has two fixed brackets 132 and 134 for mounting the chassis module to the scanning tunnel. Two hinged brackets 136 and 138, located on an underside 140 of chassis module 124 adjacent to respective brackets 132 and 134, moveably secure distributed processing and communications module 130 to the chassis module underside. In particular, distributed processing and communications module 130 has four fixed pins 135 that are received in slots 137 formed in hinged brackets 136 and 138. Two spring loaded pins 139 are received in holes 141 formed in hinged brackets 136 and 138 to releasably secure the communications module to the hinged brackets. Two fasteners 143 fasten the ends of moveable brackets 136 and 138 to the chassis module underside 140 to positively maintain the communications module in a closed position. Fasteners 143 may be screws, bolts, or other suitable fasteners.

Mounted within chassis module 124 are two power supplies 142 and 144 that convert AC power into DC power. Power supply 142 provides approximately 350 watts of DC power for use by distributed processing and communications module 130 and camera module 126. Power supply 144 provides approximately 290 watts of DC power for use by illumination module 128. A DC power distribution board (not shown) generates the required DC voltages that are not provided directly by power supplies 142 and 144.

Referring again to FIG. 6, a rear wall 146 is covered by a plurality of metal fins 156 for dissipating heat generated by power supplies 142 and 144. Mounted on opposite ends 148 and 150 of rear wall 146 are two sets of fans 152 and 154. Fans 152 pull air into chassis module 124, and fans 154 push air out. A rectangular opening 155 receives camera module 126, which is secured in place by fasteners, such as screws, bolts or other suitable fasteners. Chassis module underside 140 defines a plurality of openings 158 for receiving heat sinks 240 (FIGS. 5 and 6) from distributed processing and communications module 130. Openings 158 are sized and shaped to snuggly fit the heat sinks so that the communication module interior is sealed off from the area surrounding rear wall 146. It should be understood that gaskets (not shown) may be used around the periphery of the openings to increase the sealing effect, for example rubber, silicon, or other polymer type gaskets, for example rubber, silicon, or other polymer or elastomer type gaskets.

Figure 8:
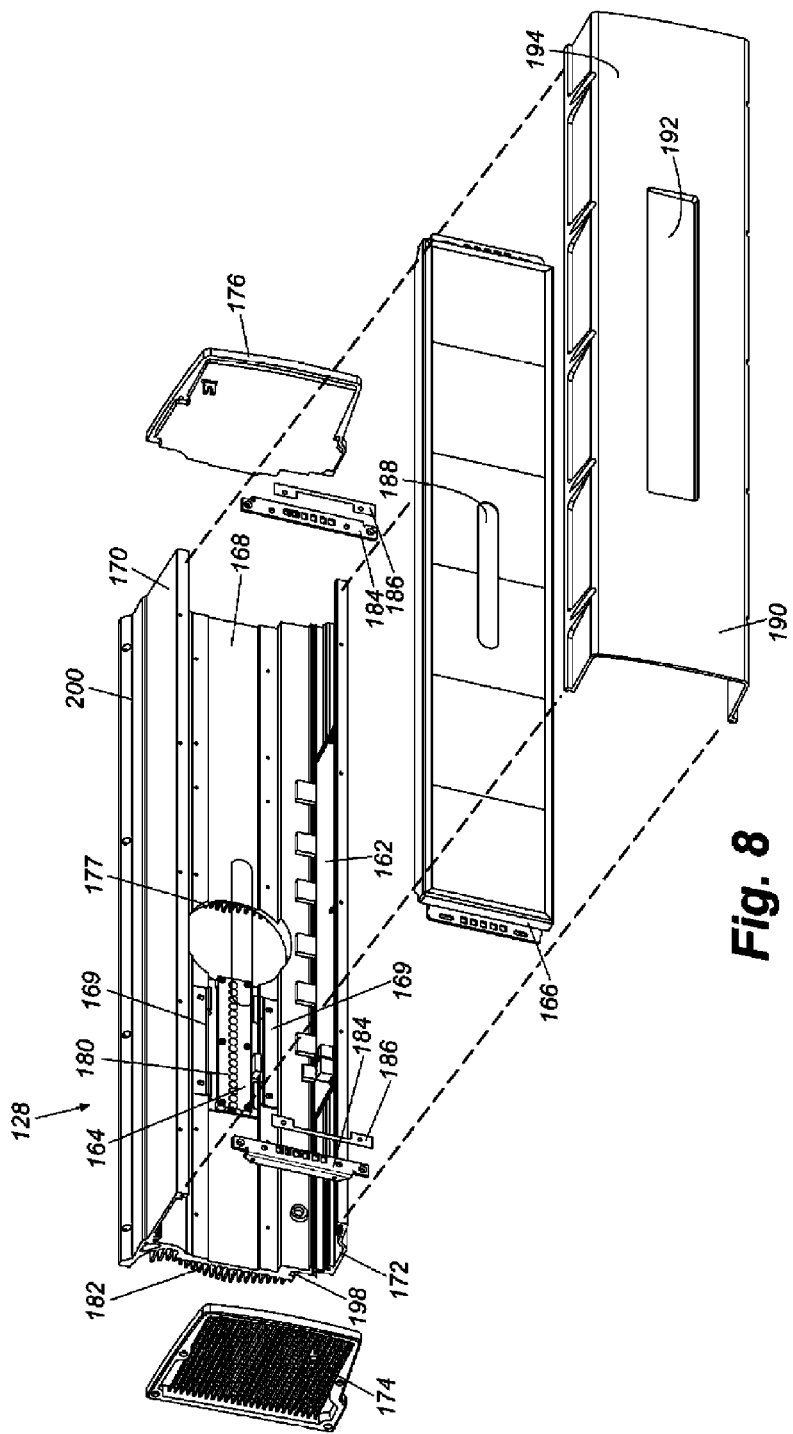
FIG. 8 is an exploded perspective view of an illumination module for use in the camera shown in FIG. 5.
Figure 9:
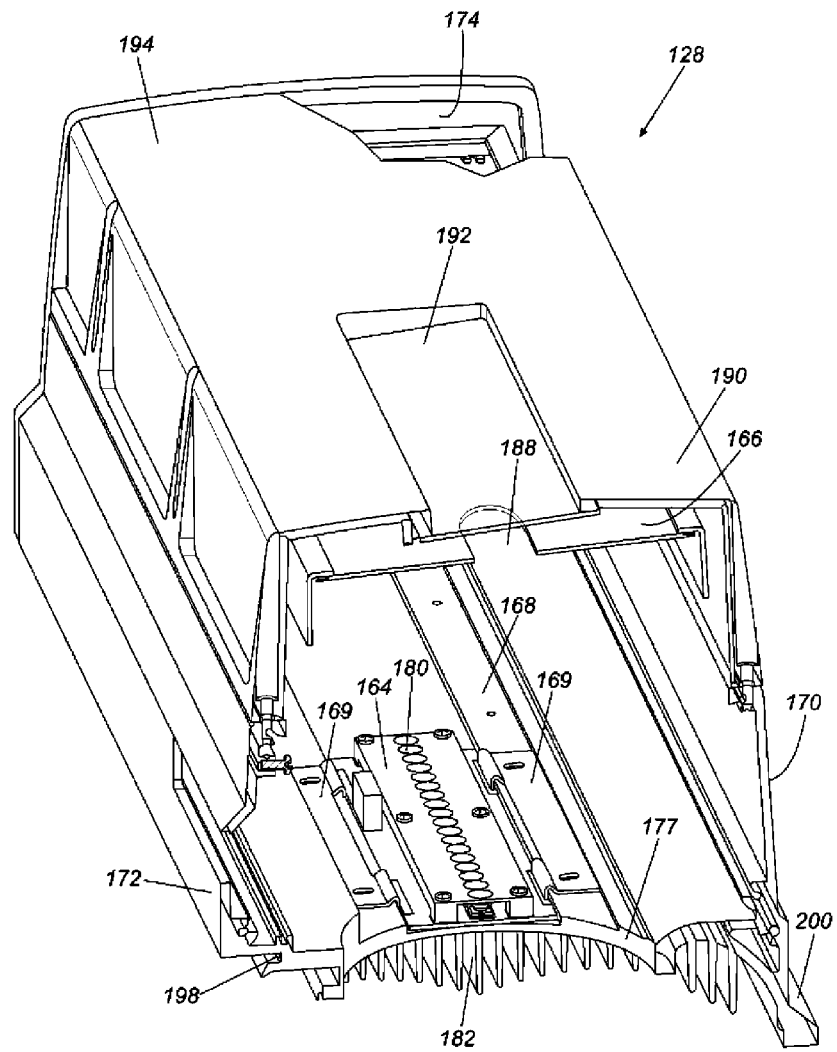
FIG. 9 is a perspective cutaway view of the illumination module shown in FIG. 8.
Figure 10:
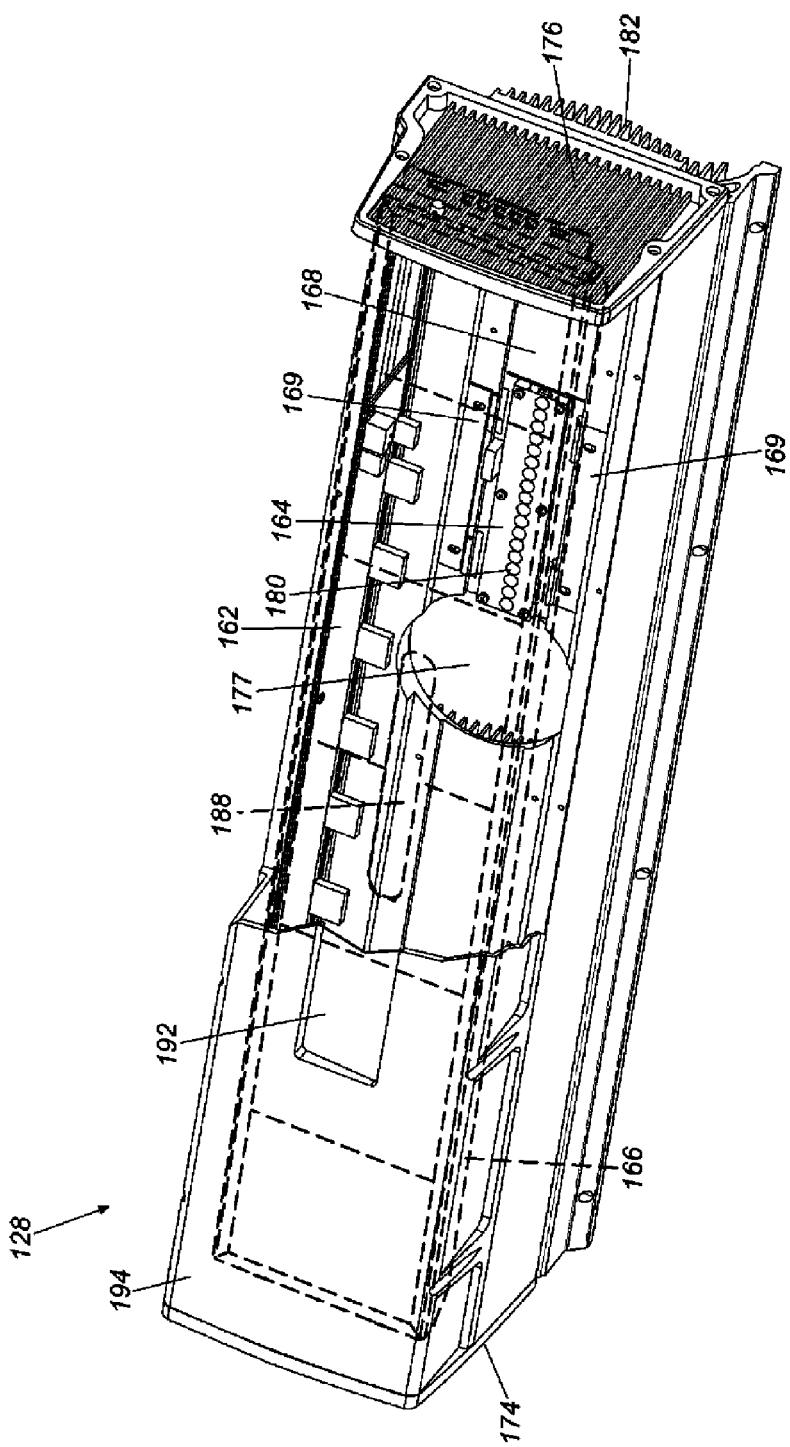
FIG. 10 is a perspective partial cutaway view of the illumination module shown in FIG. 9.

Referring to FIGS. 8 to 10, illumination module 128 comprises an illumination servo and control system 162, LED boards 164 (only one of which is shown in the Figures), and illumination optics 166. All of the components are mounted in a housing formed from a rear wall 168, a top wall 170, a bottom wall 172 and two end caps 174 and 176. A hole 177 is formed through back wall 168 to allow the camera lens to extend through into the illumination module behind illumination optics 166, as described in further detail below.

Illumination servo and control system 162 is mounted on bottom wall 172, connects to LED boards 164 via cables and receives command signals from a processor (not shown in the Figures) in camera module 126, which is used to set the intensity level of illumination for the LEDs. LED boards 164 are mounted on back wall 168 by brackets 169, provide a mounting area for LEDs 180 and conduct away heat produced by LEDs 180 through metal fins 182 formed on rear wall 168. In one embodiment, each LED board 164 may be six inches long and may contain eighteen LEDs aligned in a single row. The LEDs are arranged in an interleaved pattern so that if there is a fault in one string of LEDs, the resulting dark LEDs will be spread out across the boards to thereby maintain a uniform illumination field. In one preferred embodiment, illumination module 128 contains six LED boards.

Illumination optics 166 collimates light output of LEDs 180 and focuses the light into a line that is coplanar with an imaging sensor viewing plane (not shown in FIGS. 8 to 10). Illumination optics 166 comprises two separate cylindrical Fresnel lenses generally denoted by 166, which shows the two lenses as a single unit: the first is parallel to the axis of illumination to focus the LED light to a narrow plane that is coplanar with the imaging sensor scanning plane, and the second lens is arranged perpendicular to the first to spread out the light from each LED board along the scan line to cover the full field of view required of the system. It should be understood that in other embodiments, a single Fresnel lens or a refractive optical element can be used in place of the double Fresnel lens. Fresnel lens 166 is mounted to end caps 174 and 176 by mounting brackets 184 and spacers 186. Fresnel lens 166 defines an opening 188 to allow light reflected from a surface to reach the camera optics of camera module 126, as further described herein.

Enclosing the space defined by illumination module back wall 168, top wall 170, bottom wall 172 and end caps 174 and 176 is a shroud 190. Shroud 190 is preferably formed from a transparent material to allow light from LEDs 180 to pass through the shroud onto the surface being illuminated and allow reflected light to pass back through to the camera optics. Thus, shroud 190 may preferably be formed from any suitable transparent material, and in one preferred embodiment, the shroud is formed from an optical grade acrylic. A window 192 disposed in an aperture in a front wall 194 of shroud 190 is formed from an high grade optical glass, for example float glass or other similar material to minimize distortion of the reflected light returning to the camera optics. Window 192 may be secured to shroud 190 by fasteners or other means that securely maintains the window in place. Suitable fasteners would include clips, pins, press-fitting the glass into the shroud opening, etc.

Illumination module 128 is secured to chassis module 124 by a tongue 196 (FIG. 6) formed on chassis module 124 that is received in a groove 198 formed in bottom wall 172. Once the illumination module groove 198 receives chassis tongue 196, a lip 200 formed on top wall 170 is secured to a chassis top wall 202 by fasteners (not shown), for example screws, bolts, etc.

Figure 11:
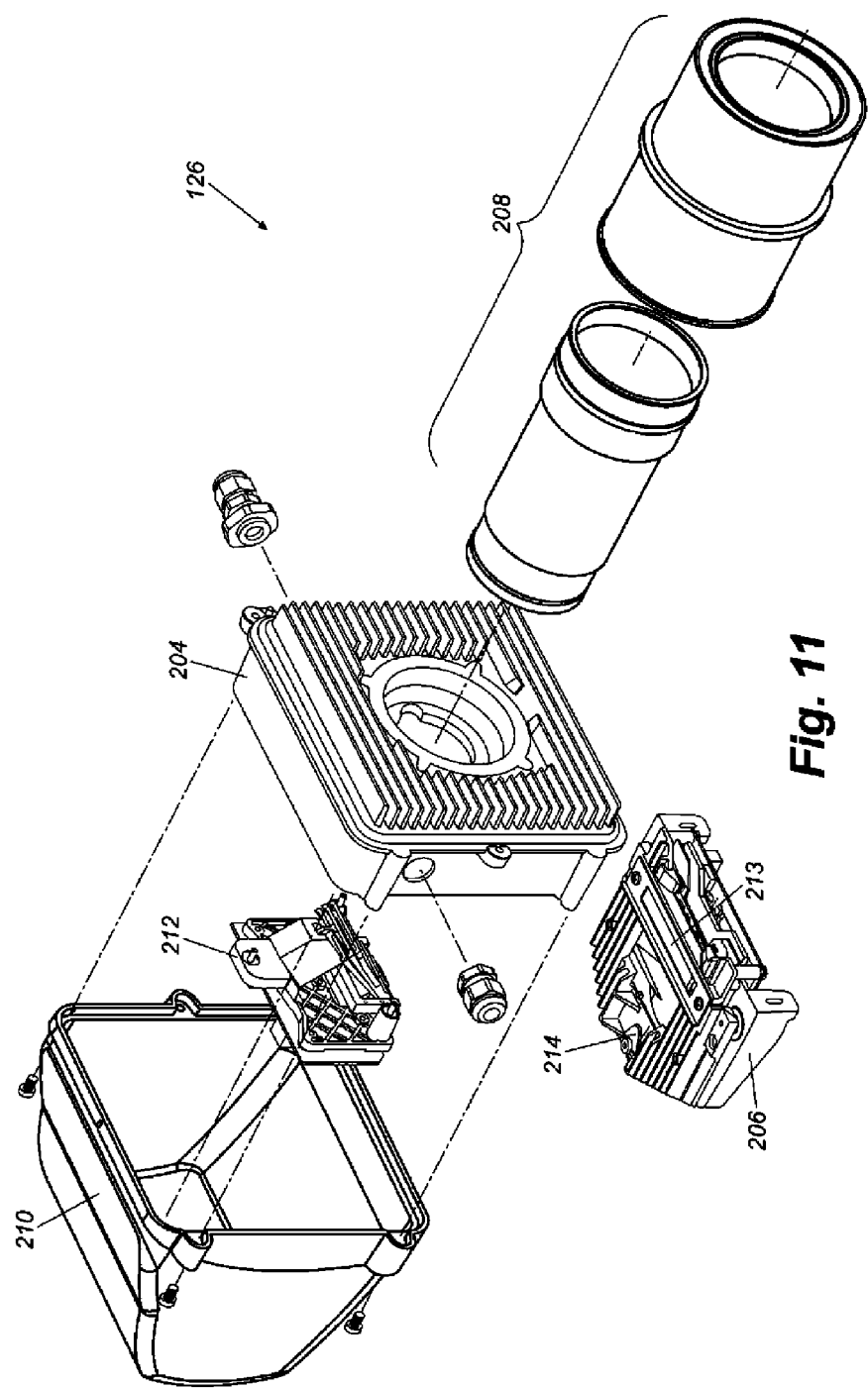
FIG. 11 is an exploded perspective view of a camera module for use in the camera shown in FIG. 4.
Figure 12:
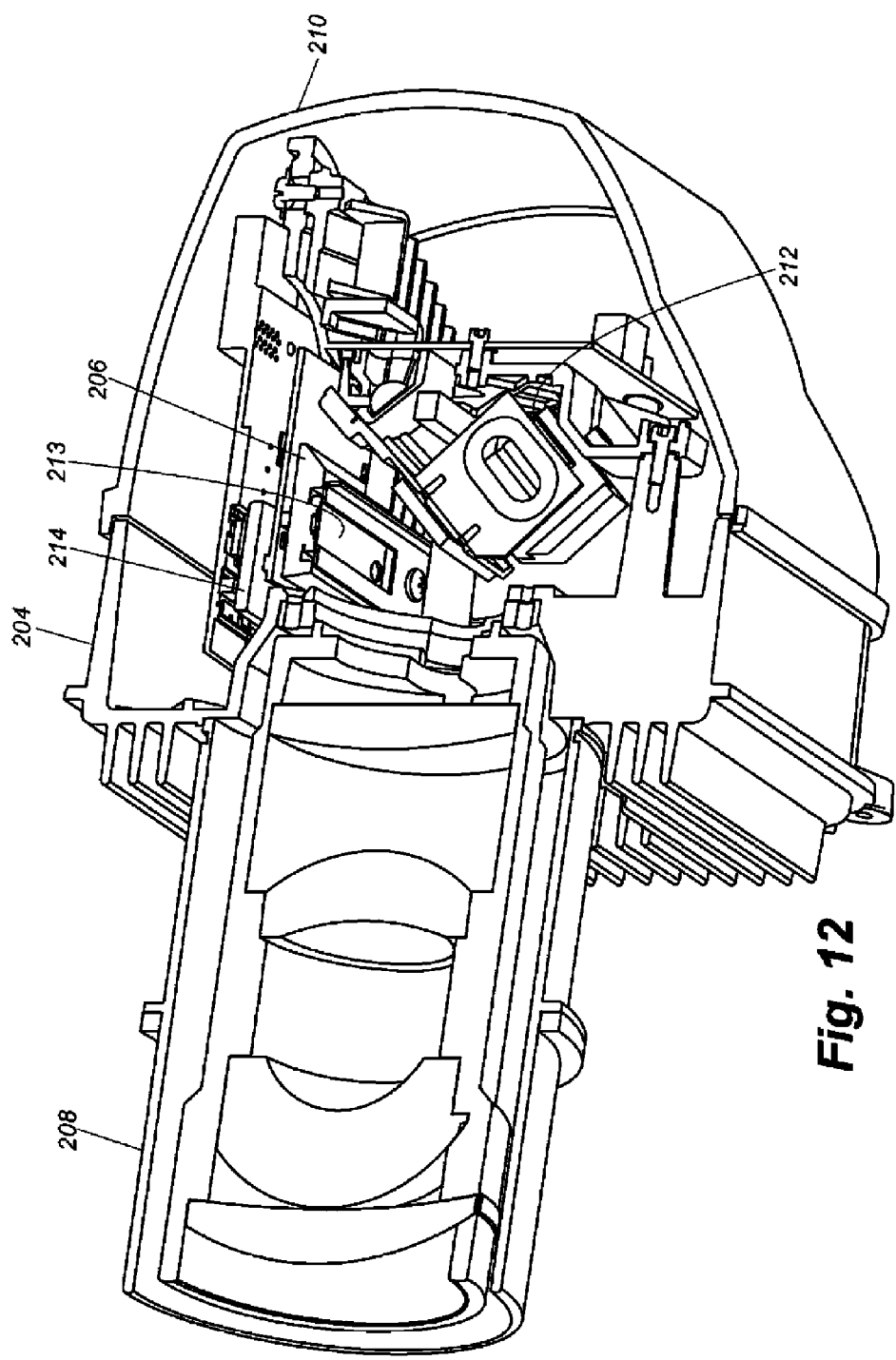
FIG. 12 is a perspective cutaway view of the camera module shown in FIG. 11.

Referring to FIGS. 11 and 12, camera module 126 comprises a body 204, a sensor module 206, a fixed focal length lens 208 and a cover 210. A focus servo module 212 may be a closed loop servo system that controls the movement of a motor (not shown) that adjusts the focal length between main imaging lens 208 and sensor 213. Focus servo module 212 receives commands from a camera module processor 214, which are used to adjust the focal length between main imaging lens 208 and sensor 213 by moving a mirror located between the camera sensor and the fixed optics. Camera module 126 uses a hinged mirror focus system (such as that described in U.S. Pat. No. 6,801,260 assigned to Accu-Sort Systems, Inc., the entire disclosure being incorporated by reference herein) to adjust the optical distance between the main imaging fixed focus lens and sensor.

Imaging lens 208 may have a fixed focal length of 68.5 mm, 90 mm and 140 mm, which provide sufficient coverage for most applications of camera 100 (barcode and OCR applications in auto identification markets). However, it should be understood that other fixed focal lengths may be used depending on the application of camera 100. Sensor module 206 contains two circuit boards (not shown) and an imaging array 213. In one preferred embodiment, the imaging array is an 8000 pixel linear array, 4-tap Dalsa charge-coupled device sensor with a video output of 8 bits per pixel. It should be understood by those of skill in the art that other types of CCD sensors may be used. If the sensor board is operated at its maximum rate of 40-MHz per tap, the sensor board can produce video at a rate of approximately 160 mega pixels per second at six hundred and twenty feet per minute.

Figure 13:
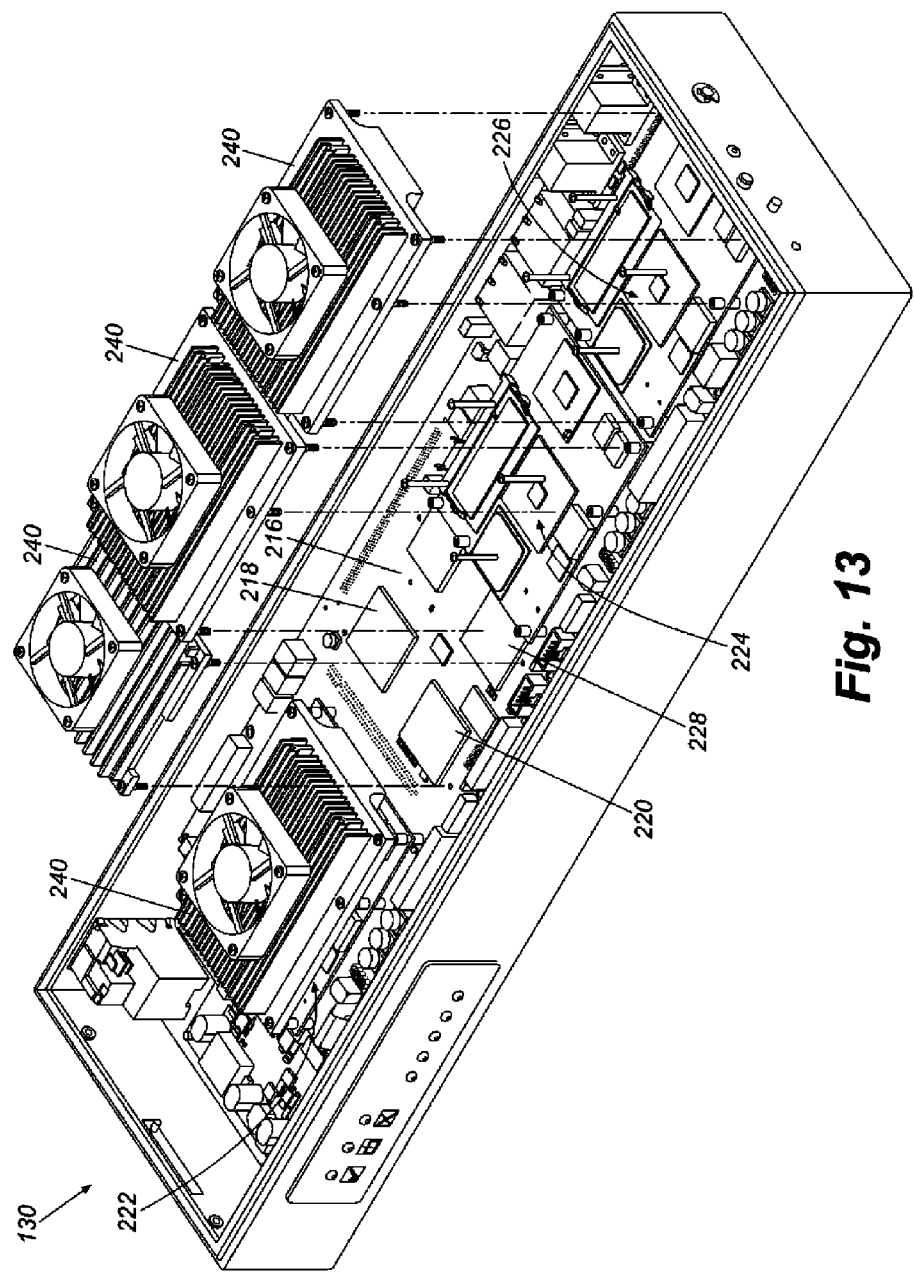
FIG. 13 is an exploded perspective view of a communication module for use in the camera shown in FIG. 5.
Figure 14:
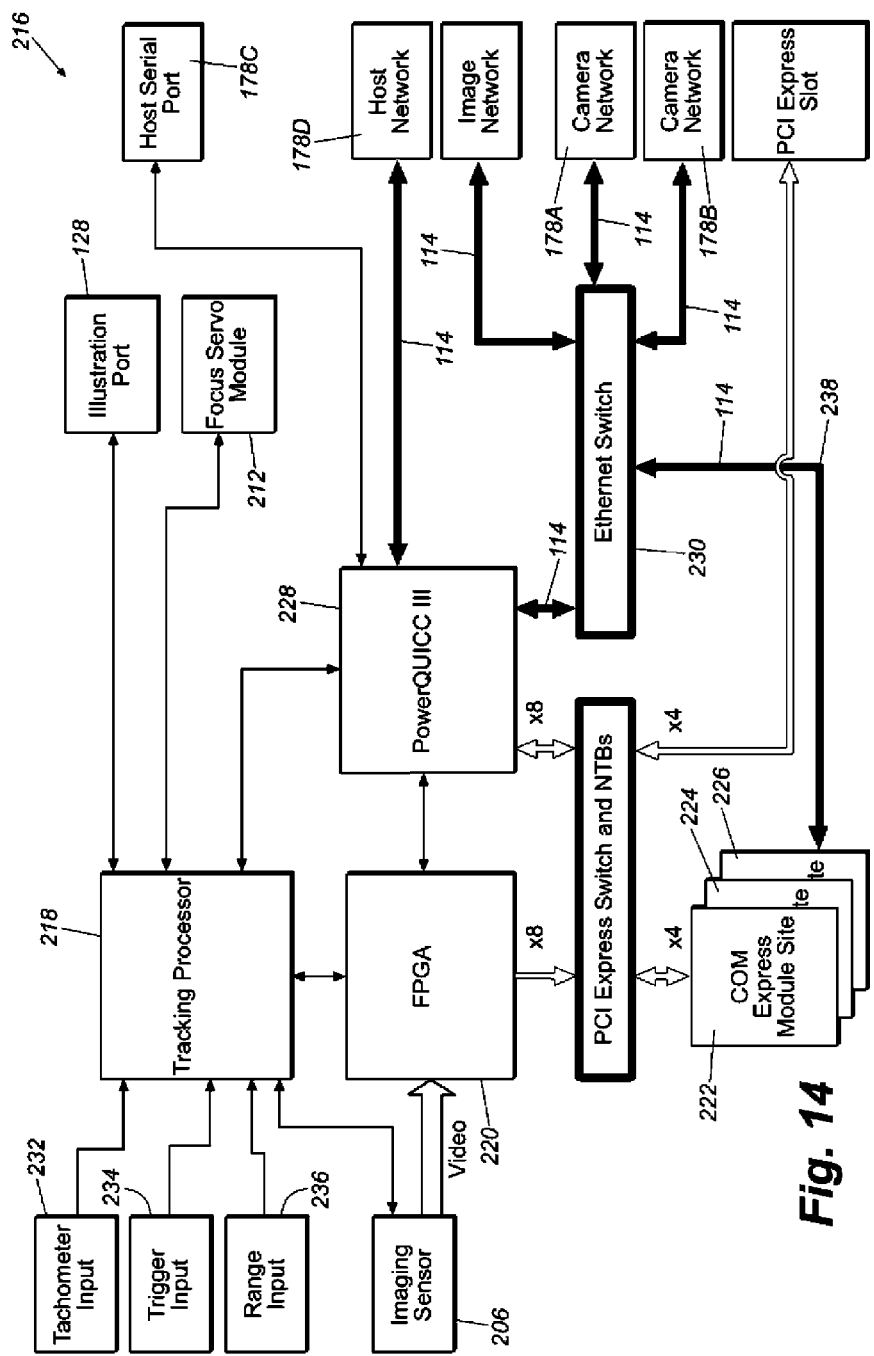
FIG. 14 is a block diagram of the communication module shown in FIG. 13.

Referring to FIGS. 13 and 14, distributed processing and communications module 130 comprises a carrier card 216, a tracking processor 218, a video processor 220, three COM express modules 222, 224 and 226, and a communications processor 228. Carrier card 216 provides the platform for all video processing performed by camera module 106. Video from imaging module 206 is received by video processor 220 where it is processed in real time and transferred to COM Express modules 224, 224 and 226 and communications processor 228 for further processing. The communication processor and COM Express modules communicate with one another and external devices by Ethernet connections 114 through an Ethernet switch 230.

Tracking processor 218 receives an input signal from tachometer 112 at input 232, a trigger signal at input 234 and range information from range finder 102 at input 236 and uses the information to track an object's presence, location and height, as in prior art systems. Tracking processor 218 also provides control and diagnostic commands to illumination module 128 and camera focus servo module 212. Thus, as objects are transported down conveyor belt 104 (FIG. 2), the tracking processor tracks their position relative to camera 106 and height and location information on belt 104. In response to this information, tracking processor 218 sends commands to illumination module 128 to increase or decrease the illumination intensity and to camera focus servo module 212 to adjust the focus of the camera optics to properly acquire a readable image from the objects. In one preferred embodiment, tracking processor 218 is an i.MX31L manufactured by Freescale Semiconductor of Austin, Tex.

Video processor 220 provides all high-speed video processing and handles all real-time control signals from, for example, tachometer 112 and trigger input 234. Video processor 220 conditions and processes tachometer input signal 232 and stamps the tracking information into the linear sensor image data. Video processor 220 also buffers lines of video data from image sensor 206, packs the lines into 64-bit words and puts the words into the memory of communications processor 228 and COM Express modules 222, 224 and 226. Video processor 220 maintains a constant scan speed of imaging sensor 206 based on tachometer input signal 232 and the line density configured in the system.

Communications processor 228 receives data input from tracking processor 218 and video data from video processor 220. The main function of communications processor 228 is to move image data from video processor 220 to COM Express modules 222, 224 and 226. Examples of communications processor 228 are the MPC8548E, MPC8547E, MPC8545E and MPC8543E all manufactured by Freescale, Inc. of Austin, Tex.

COM Express modules 222, 224 and 226 allow expansion of camera 106 without camera system redesign and can be added at any time to provide additional functionality without requiring modification to carrier card 216. Specifically, modules for performing additional features such as dimensioning, optical character recognition, etc. can be installed in camera 106 at any time through the COM Express modules. Communications module 228 is constantly providing camera data to the COM Express modules, which can be used for example for OCR or dimensioning. Each COM Express module 222, 224 and 226 has an Ethernet connection 238 to communications processor 228 through Ethernet switch 230.

Each camera has two network ports 178A and 178B that allow the cameras to be linked together. The dedicated network has 100BaseT Ethernet and has two hardwired signals: a tachometer pulse and a tachometer synchronization signal. The tachometer signal is sourced by the camera having tachometer 112 attached to it. The tachometer synchronization signal is a derivative signal of the tachometer signal, which is directly transmitted to each of the cameras to ensure that each camera can accurately track any given package independently of the other cameras. By monitoring these two signals, all of the cameras in the tunnel can stay in perfect synchronization with a package on conveyor 104 and with each other by simultaneously counting tachometer pulses for each package on the conveyor system. Network ports 178A and 178B allow information from one camera on the network to be transmitted to any other camera on the tunnel network. Each camera also contains two ports 178C and 178D for connecting to the host system. The first port 178C outputs an asynchronous signal and the second 178D is a 100BaseT Ethernet connection. The imaging network connection outputs image data to the host system for further processing. The PCI Express slot is a standard PCI slot that accepts upgrade cards to provide further processing features for camera 106. For example, a PCI card may be used to allow camera 106 to provide real time JPEG compression, which may be output to the host system.

The power consumed by camera 106 may be above 180 watts, of which 15 to 20 watts may be emitted as light. The remaining power is converted to heat, which must be removed from the camera so as not to damage the electronics. Because camera 106 contains sensitive optics and electronics, camera module 126, illumination module 128 and communications module 130 are preferably not cooled by traditional methods of pulling air through each module, since dirt and debris could accumulate on the electronic and optics.

Figure 15:
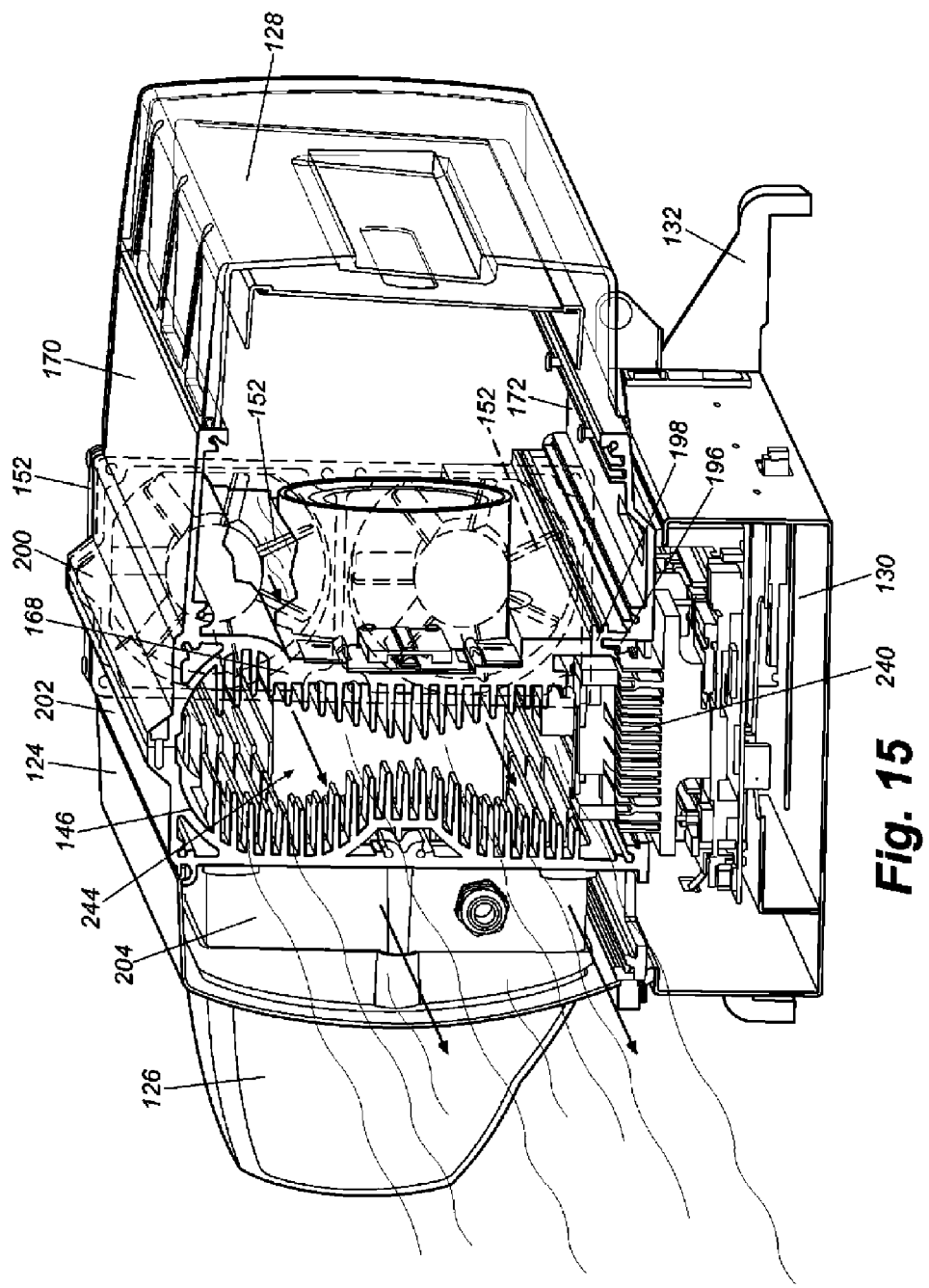
FIG. 15 is a perspective cutaway view of the camera of FIG. 5.

Referring to FIG. 15, the individual modules of camera 106 fit together to form a cooling channel 244. In particular, camera module body 204 fits into opening 155 (FIG. 6) to form continuous chassis rear wall 146. Illumination module 128 is secured to chassis bottom wall tongue 196 by groove 198 and to top wall 202 by a plurality of fasteners, such as screws, bolts or clips as previously described. Communication module 130 is secured to camera chassis 124 by brackets 136 and 138 (FIG. 7), which allow the communication module to pivot about one end 133 so that a user can service the communication module without having to physically remove it from the camera.

When communications module 130 is in its closed position, heat sinks 240 are received through chassis bottom wall openings 158. As a result, illumination module rear wall 168, camera chassis rear wall 146, communications module heat sinks 240 (only one of which is shown in FIG. 15) and chassis bottom wall 140 (not shown in FIG. 15) together define cooling channel 244, which is sealed from the sensitive optics and electronics of the camera. Each of the cooling channel walls contains a plurality of metallic fins to conduct heat away from the electrical components into the cooling channel to assist in heat dissipation. Fans 152 and 154, located at each end of cooling channel 244, pull air into one end and push air out the other end of the channel to expel the heat from the camera. In one embodiment, a fan forced air flow of approximately 130 cubic feet per minute should maintain a desired temperature range within the camera.

Cameras 106, 108 and 110 may play different roles in a scanning tunnel. Preferably, for example, one camera is designated as the master camera, which receives a trigger signal, the system tachometer signal and provides a trigger signal and focus information to other cameras in the tunnel. One camera (either the master camera or one of the slave cameras) is connected to the host system and is responsible for transmitting package data to the host system.

Data collected by each camera for a single box is combined into a single message that is transmitted to the host system when the package reaches a transmit point. Bar code and package information may be transferred between cameras over the 100Base-T Ethernet network. Each of camera modules 106, 108 and 110 is capable of correlating the messages from all of the other cameras in the tunnel system and generating a combined message. That is, if the master camera receives all of the camera data from the other cameras, it can correlate the multiple image data and transmit the combined data to the host system. Because each of the cameras have the ability to receive data from the other cameras and correlate the combined data, two camera modules in the same tunnel system may be connected to different host systems, each with a different data format and transmit points. Additionally, because all of the cameras are networked, one camera could perform processing for data collected by another camera should a camera loose the ability to process data. Moreover, each camera contains set-up and calibration data about every other camera in the tunnel system.

Figure 18:
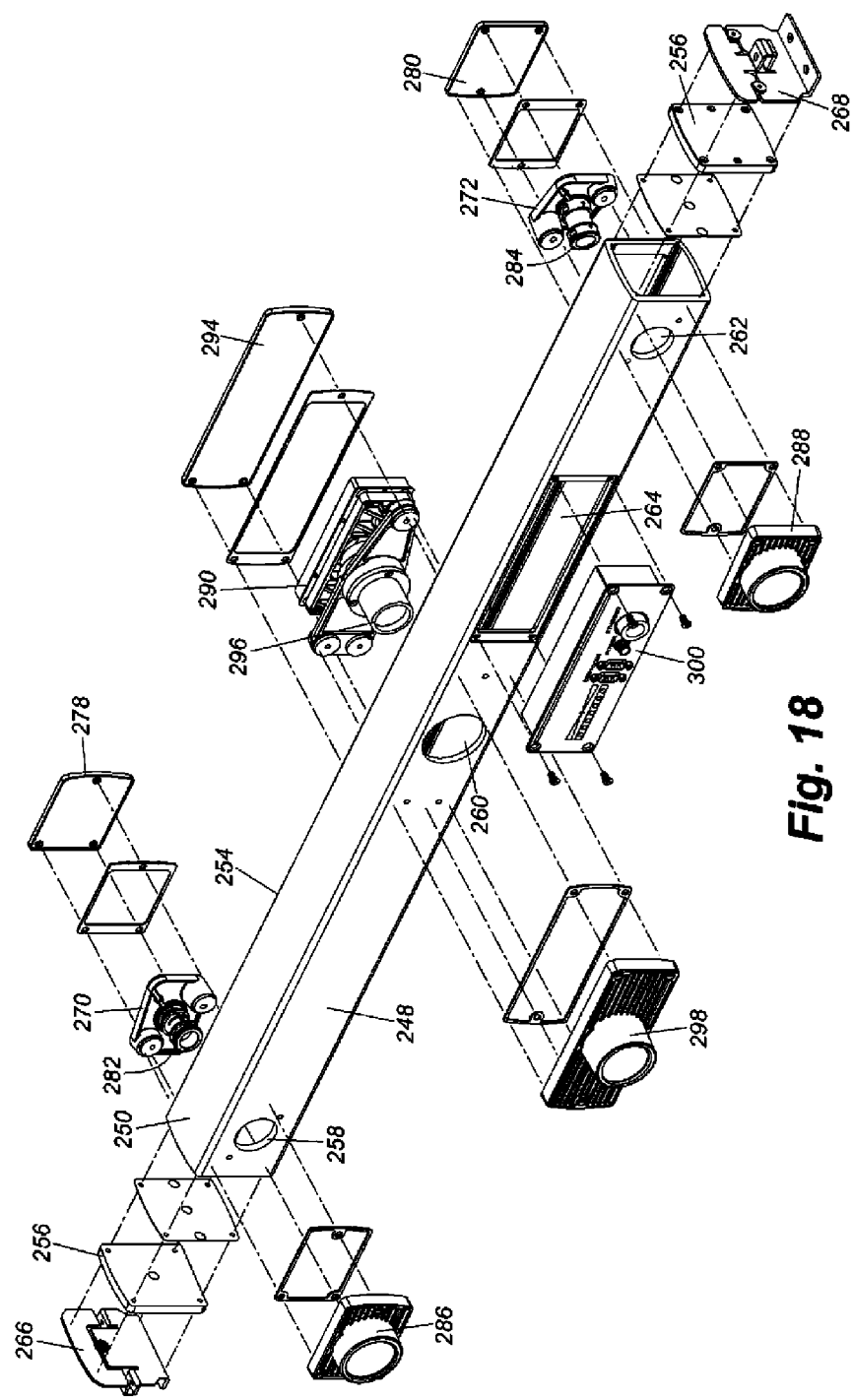
FIG. 18 is an exploded perspective view of the range finder of FIG. 16.

FIGS. 16 and 17 illustrate one embodiment of a range finder for use in the tunnel system of FIG. 3. Range finder 102 has a housing 246 formed from a front wall 248, a top wall 250, a bottom wall 252, a back wall 254 and two end walls 256. Referring to FIG. 18, front wall 248 defines three circular openings 258, 260 and 262 and one rectangular opening 264. Two brackets 266 and 268 are mounted to end walls 256 and allow the range finder to be mounted to the frame of the tunnel system.

Range finder 102 has two laser illumination devices 270 and 272 mounted proximate each end of housing 246 in respective openings (not shown). The laser devices are fastened to housing 246 and secured in place by cover plates 274 and 276 (FIG. 17). A respective front end 282 and 284 of the laser illumination devices extend into respective front wall openings 258 and 262. Each laser device front end 282 and 284 is enclosed by a respective diffractive optical element 286 and 288, which are fastened to range finder front wall 248 over openings 258 and 262 by fasteners or other suitable connecting devices. A range finder linear sensor board 290 is received in a rectangular opening (not shown) formed in housing back wall 254 and is secured in place by a cover plate 292 by screws, bolts or other suitable fasteners. A sensor head 296 extends through housing front wall opening 260 and is covered by sensor optics 298, which is fastened to housing front wall 248. A control panel 300 is received in housing front wall rectangular opening 264 and is secured in place with screws, bolts or other suitable fasteners.

Referring to FIG. 19, laser illumination devices 270 and 272 and their respective diffractive optical lenses (not shown in FIG. 19) are used to generate a laser pattern 302 with a spatially-unique bar arrangement (FIG. 20). Laser illumination devices 270 and 272 are placed at an angle θ with respect to an axis 308 normal to conveyor 104. Referring to FIG. 21, the spatially-unique bar arrangement consists of a series of long lighted bars 314 and short lighted bars 316 that are separated by short blank (non-lighted) spaces 318 and long blank (non-lighted) spaces 320. Narrow lighted bars are one pixel wide, narrow blank spaces are two pixels wide, wide lighted bars are three pixels wide and wide blank spaces are four pixels wide. The spatially-unique bar arrangement contains one hundred and ninety-nine words, where a code word is defined by six elements and is approximately twenty pixels wide. The unique pattern is defined by seventy-eight words and repeats three times to fully cover the belt width. In one embodiment of the unique pattern, there will never be three wide bars or blank spaces in a row. Thus, if three elements are consecutive and of similar widths, they must be narrow bars or spaces. The spatially-unique bar arrangement is also known as a T-bar sequence.

It should be understood by one skilled in the art that as laser pattern 302 spreads to the outer extents of the belt, the elements increase in width. Moreover, when a box intersects laser pattern 302, the portion of the pattern on the top of the box will compress in width since the distance to the top of the box from the laser source is shorter than the distance to the belt. However, because all of the bars and spaces compress, the unique words remain unchanged and does not effect the operation of the range finder.

In some embodiments, the diffractive optical elements may generate a series of light dots across the width of the belt instead of the unique code word pattern. However, the series of light dots are subject to the same alignment problems that exist with prior art dimensioner designs since the line of dot must be properly aligned with the field of view of the linear sensor. In an effort to overcome the alignment issues, in other embodiments equally spaced light bars may be used where the height of each bar is multiple pixels long. In the case of the equally spaced bar pattern, the alignment problem is overcome since acceptable alignment error is increased based on the height of the bars. However, both the equally spaced light dots and equally spaced light bars both suffer from overlap problems. That is, if the dots and bars are not sufficiently spaced apart, then one dot or bar may shift more than the spacing between adjacent dots or bars resulting in an incorrect height measurement calculated for the box. If the spacing between dots or bars is narrowed to increase the resolution of the range finder, the maximum box height for the system will be limited. If, on the other hand, the dot or bar spacing is increased to accommodate large box heights, the resolution of the dots or bars across the belt is reduced. With large spacing between the dots or bars, while the box height may be obtained, the ability to accurately detect the extents of the box is diminished. Thus, substituting the unique laser code word pattern in place of equally spaced dots and bars overcomes both the sensor alignment and overlap issues.

An optical axis 304 and 306 of each laser device is offset from an optical axis 308 of linear camera sensor 296 by a predetermined distance 310 by an angle θ, which allows for the linear sensor to be positioned transverse to conveyor belt 104 instead of being parallel with the axis of travel of conveyor 104. Angle θ is used by the range finder processor to determine the height of a package using known triangulation methods. The purpose of having two laser devices 270 and 272 is to eliminate the effect of shadowing caused by a single light source. That is, if a single laser source 270 is used, then the portion of belt 104 adjacent to the left side of an object traveling down conveyor 104 will not be illuminated by the laser pattern since the object will block this portion of the belt from being illuminated. Consequently, the addition of second laser device 272 allows for each laser device to be cycled on and off at a rate that causes a complete scan line to be projected at each point along the length of the belt, thereby effectively eliminating the effects of shadowing.

As an object passes into illumination laser device fields of view 302, the spatially-unique bar arrangement shifts transverse to the direction of travel on conveyor 104, which is sensed by a field of view 312 of linear sensor 296. Because the laser pattern across the belt is unique, the shifted portion of the pattern can be detected, and based on known triangulation methods the amount of shift can be translated into a height for the detected object. The extent of the pattern found at the object height indicates the left and right extents of the object. The object height and extent information is correlated with tachometer count information and transmitted over Ethernet network 114 to camera modules 106, 108 and 110, and the resultant package information is used to drive camera focus servo module 212. Range finder linear sensor board 290 contains a processor (not shown) that captures images picked up by sensor 296, processes the images to determine if objects are present within range finder field of view 312 and determine the object's height and extents (left and right edges) on a line-by-line basis.

In one embodiment, linear sensor 296 is a Toshiba 1209D 2000 pixel, single tap, charged coupled device sensor and the processor is an i.MX31L processor manufactured by Freescale Semiconductor of Austin, Tex. For a belt speed of six hundred and twenty feet per minute, range finder 102 can perform 2,480 sample lines per second, which yields a resolution of $1/20^{th}$ of an inch in the direction of travel and produces a video rate of about five megabytes per second. Laser illumination devices 270 and 272 operate at 658 nm wavelength and the laser is collimated with a spot diameter of 2.5×7.0 mm. Each laser illumination device and DOE is offset 20 inches from the center of conveyor 104, and laser devices 270 and 272 are directed at a 13.94 degree angle θ with respect to axis 308.

The range finder image plane is located 76 inches from the plane of the conveyor. In this configuration, the system can accommodate a maximum package size of 36 inches wide and 36 inches high. It should be understood that other configurations are within the scope of the present invention and the above configuration is merely presented as one example configuration. For example, the maximum box height that can be detected by range finder 102 without a unique code word shifting from one portion of the unique pattern to a portion where the pattern repeats is approximately 50 inches high. Thus, the position of the laser devices can be placed in other configurations to accommodate box heights up to 50 inches tall.

Figure 22:
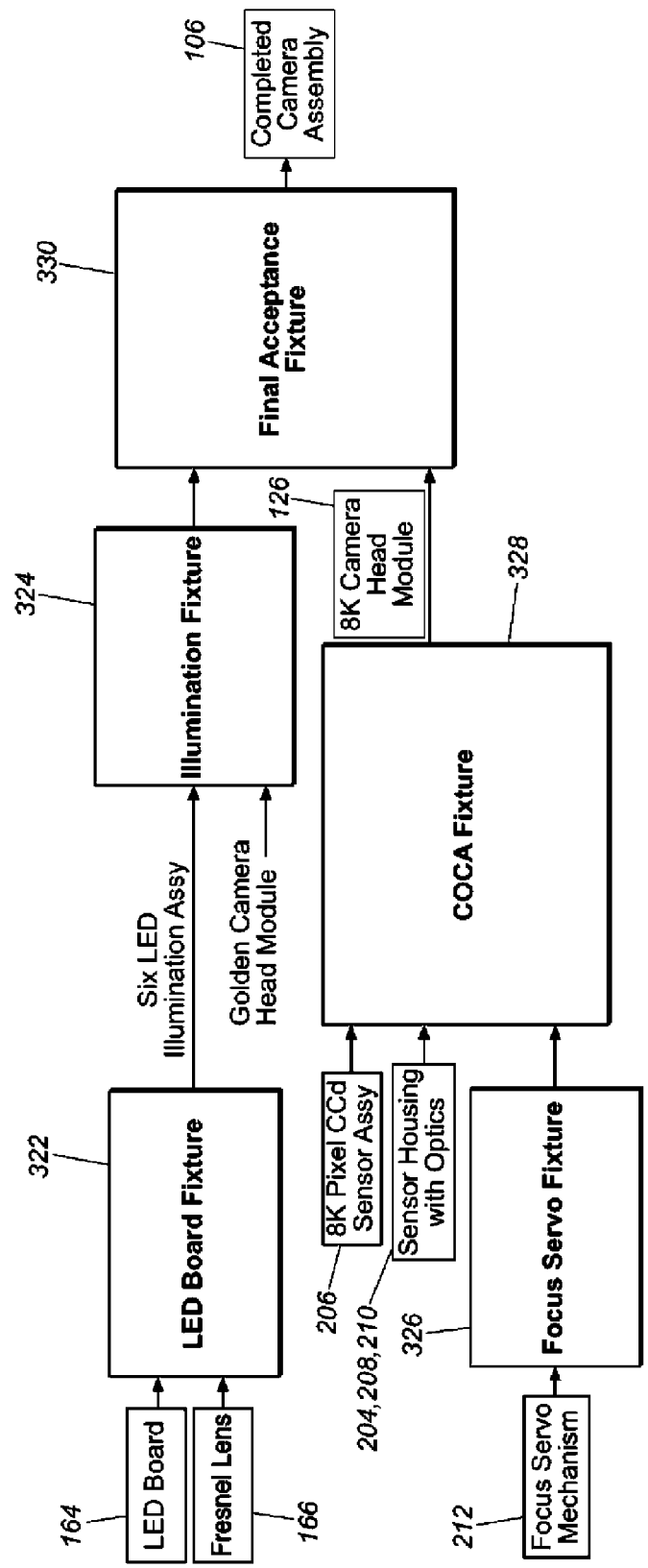
FIG. 22 is a block diagram of the assembly of the camera of FIG. 5.

When range finder 102 and camera 106 are manufactured, they are calibrated in-house prior to being shipped. Referring to FIG. 22, when assembling camera 106, at step 322, LED boards 164 and Fresnel lens 166 are mounted to the LED board fixture. Next, at step 324, Fresnel lens 166 is aligned with respect to the LEDs and the output of the LEDs is calibrated. At step 326, focus servo module 212 is calibrated to its forty-five degree position and the operation of the camera is verified. At step 328, pixel compensation for image module 206 is determined, the module is aligned with a target, and focus servo module 212 is calibrated to form a focus table that is stored in the camera's memory. At step 330, camera module 126 and illumination module 128 are mounted on chassis module 124 and the video gain table is calibrated as a function of object distance, and a video gain table is created and the table is stored in the cameras memory. The camera read rate is verified and the performance of the camera optics is checked.

Figure 23:
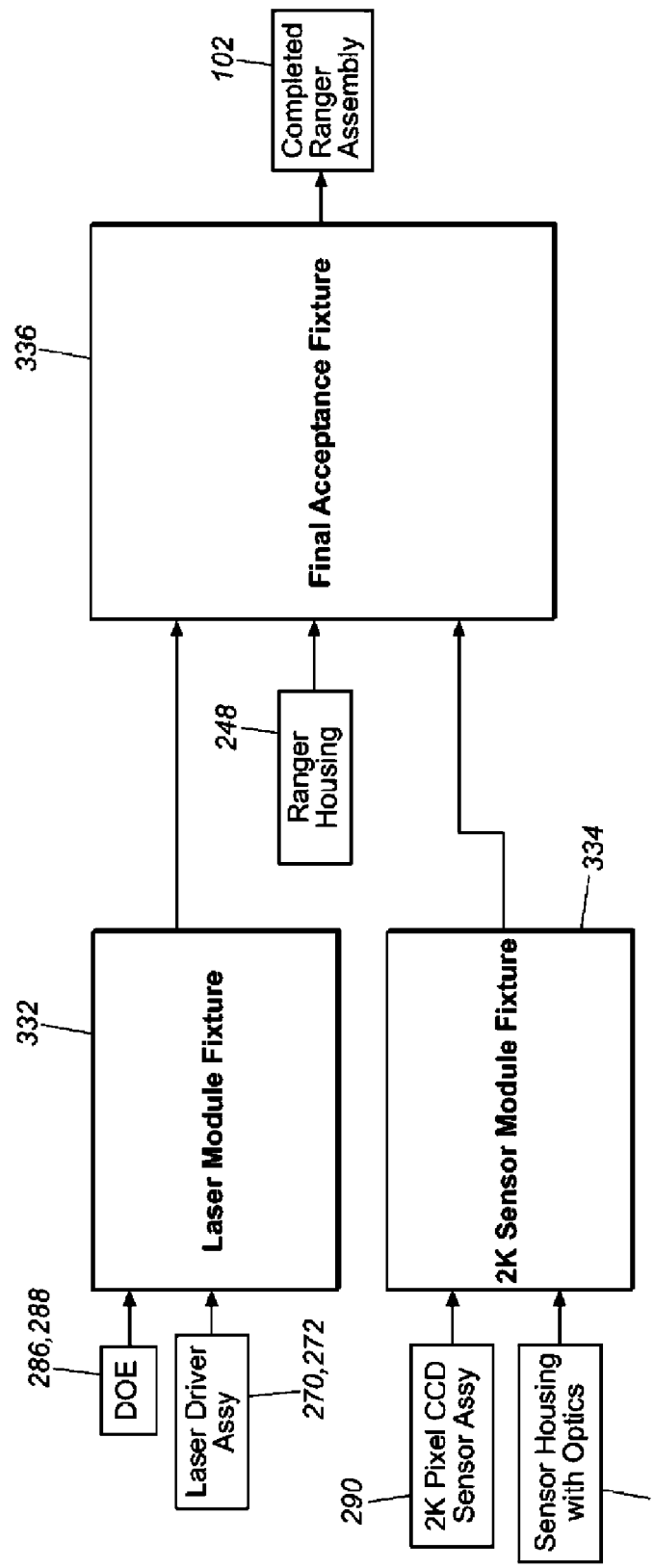
FIG. 23 is a block diagram of the assembly of the range finder of FIG. 16.

With regard to range finder 102 and referring to FIG. 23, at step 332, laser illumination devices 270 and 272 and their respective diffractive optical elements 286 and 288 are aligned to a target, their respective fields of view 302 are focused, the beams are properly orientated and the laser output power is set. At step 334, linear sensor 296 and optics 298 are mounted and the sensor ambient gain is set. The sensor is then aligned to a target to set the x-axis, y-axis and yaw angle, and the sensor focus is set. At step 336, once all of the components are mounted in range finder housing 246, the sensor is once again aligned to a target, the laser spots are aligned to the sensor, the diffractive optical element line pattern is aligned to the sensor and the line pattern is calibrated to the correct depth of field for the range finder sensor.

Figure 23A:
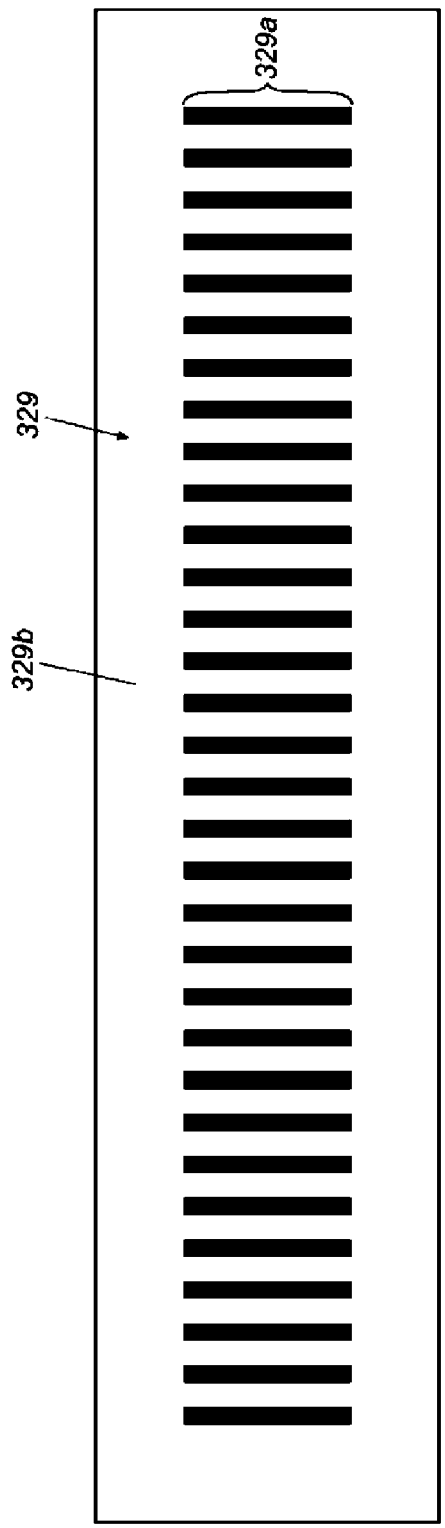
FIG. 23A is a plan view of a pattern used during manufacturing to calibrate the camera and range finder of FIGS. 5 and 16, respectively.
Figure 23B:
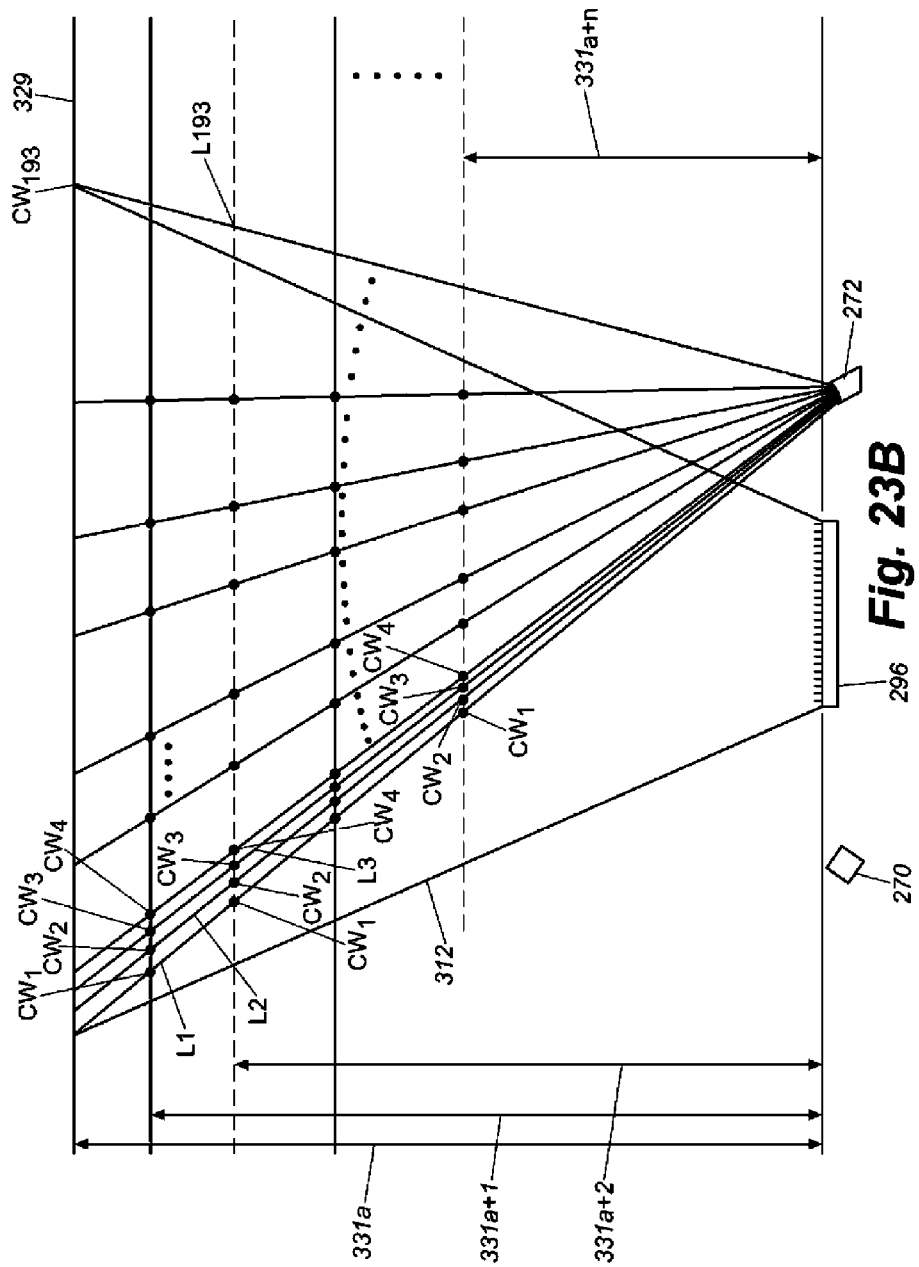
FIG. 23B is a top plan view of a calibration technique of the range finder of FIG. 16.
Figure 23C:
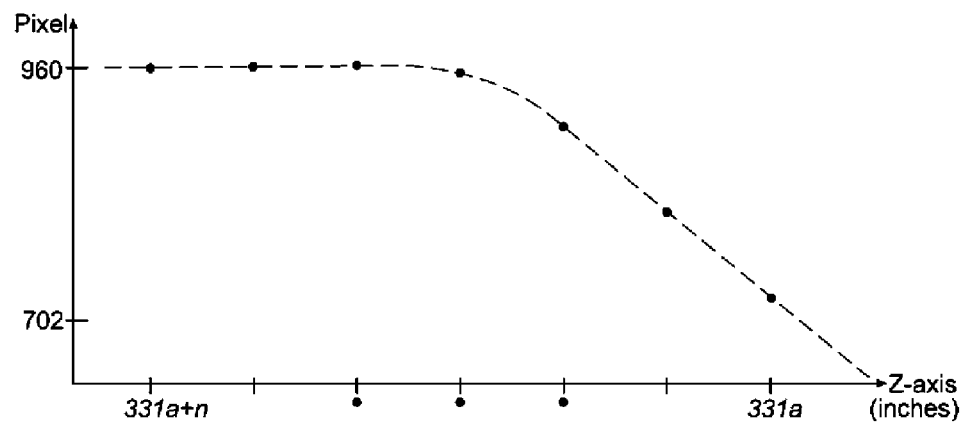
FIG. 23C is a plot of pixel versus distance for the range finder calibration of FIG. 23B.

Referring to FIG. 23A, a test strip 329 is illustrated having a series of bars 329a, having a known width and spacing, and surrounding white space 329b. Bars 329a and white space 329b are used during the in-house calibration of the range finder and camera for respectively calculating height data and building an ambient gain table. With regard to range finder 102 and referring to FIG. 23B, test strip 329 is placed at a point $331_a$ representative of the mounting height of the range finder above the conveyor, and the pixel position of each code word $CW_1 \ldots CW_{193}$ is recorded and stored in memory. Test strip 329 is moved to a new distance $331_{a+1}$ and the pixel location for each code word is again recorded and stored in memory. The process is repeated for $331_{a+n}$ distances and the pixel location for each code word are stored in memory. Referring to FIG. 23C, a plot of the pixel location versus distance is shown for one code word. Data for each code word is used to fit a $5^{th}$ order polynomial to the stored data, and the $5^{th}$ order polynomial for each code word $CW_1 \ldots CW_{193}$ is stored in the range finder's memory and used for calculating the distance of objects. The process is repeated for light source 270 and a second set of $5^{th}$ order polynomials for each code word are stored in memory. Use of $5^{th}$ order polynomials for each code word allows a height measurement to be calculated by the amount of shift that occurs of one or more code words. Independent polynomials for each code word allow the system to calculate the measured height based on the shift of one or more code words.

Figure 23D:
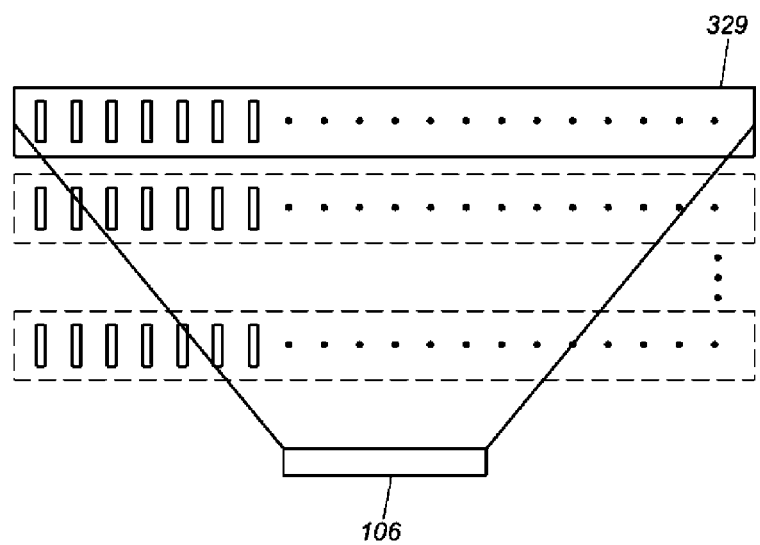
FIG. 23D is a top plan view of a calibration technique of the camera of FIG. 5.

Referring to FIG. 23D, test strip 329 may also be used to build a distance versus focus table for camera 106 during in-house calibration. As previously discussed above, camera 106 adjust it focal length by adjusting the distance between main imaging lens 208 and sensor 213 by adjusting the mirror (not shown) through focus servo module 212. Thus, test strip 329 may be mounted at different distances from camera 106, and servo module 212 is adjusted until the bars detected by the camera are in focus. The servo module position is recorded for multiple distances and a $5^{th}$ order polynomial is fit to the measured data points. Thus, for any distance of an object from the camera, a corresponding position of servo module 212 can be calculated based on the derived $5^{th}$ order polynomial to obtain a focused picture as the object moves into the cameras field of view. Moreover, the camera's focus can be dynamically changed as the object moves through the camera's field of view allowing accurate scans to be obtained by the camera's sensor even when the side of the object is offset from the direction of travel.

Figure 24:
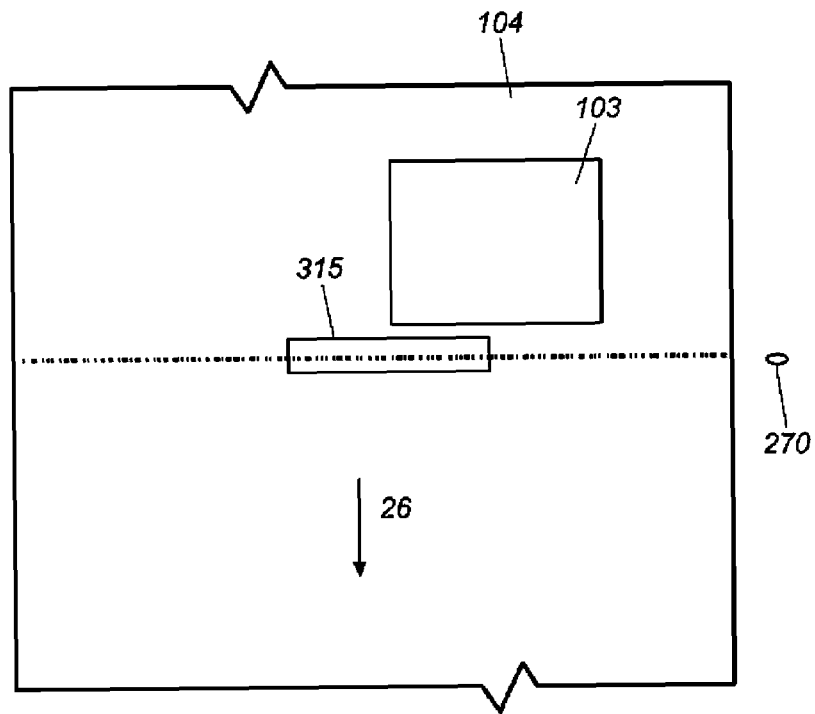
FIG. 24 is a plan view of the conveyor and range finder pattern of FIG. 16.
Figure 25:
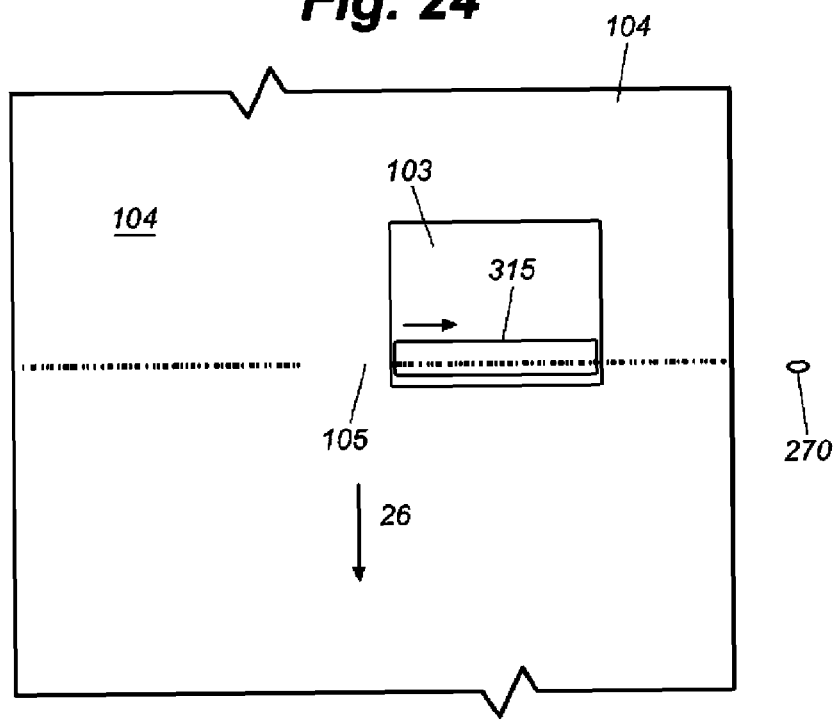
FIG. 25 is a plan view of the conveyor and range finder pattern of FIG. 16.

In operation and as previously described, range finder 102 detects the height of objects moving along conveyor belt 104 by detecting the longitudinal shift of a laser pattern projected across the belt when the object intersects the laser pattern. In particular and referring to FIGS. 24 and 25, a box 103 is shown moving along conveyor 104 in direction 26. Laser 270 projects the unique laser line pattern sequence across the width of belt 104. As box 103 passes through the light pattern, a portion 315 of the unique code shifts to the right since the distance the code must travel is shorter when the box is present. A portion of the unique line pattern 105 is not seen on the belt due to shading caused by box 103. The linear range finder sensor is positioned transverse to the direction of belt travel and detects a series of light and dark areas along the width of the belt. These light and dark areas are converted to a detected illumination intensity signal that is used by the range finder processor to detect the edges of the bars and spaces.

Figure 26:
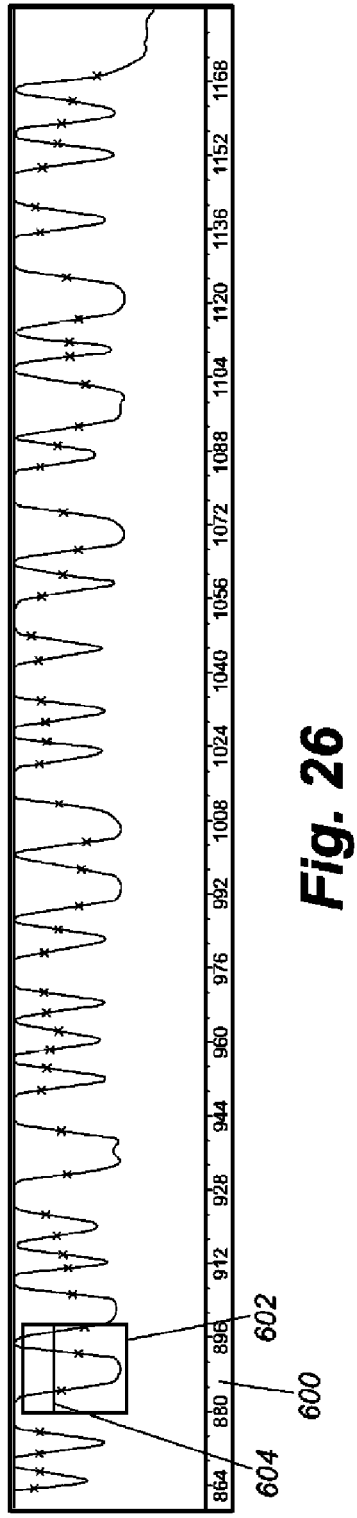
FIG. 26 is a intensity plot by pixel for the range finder of FIG. 25.
Figure 27:
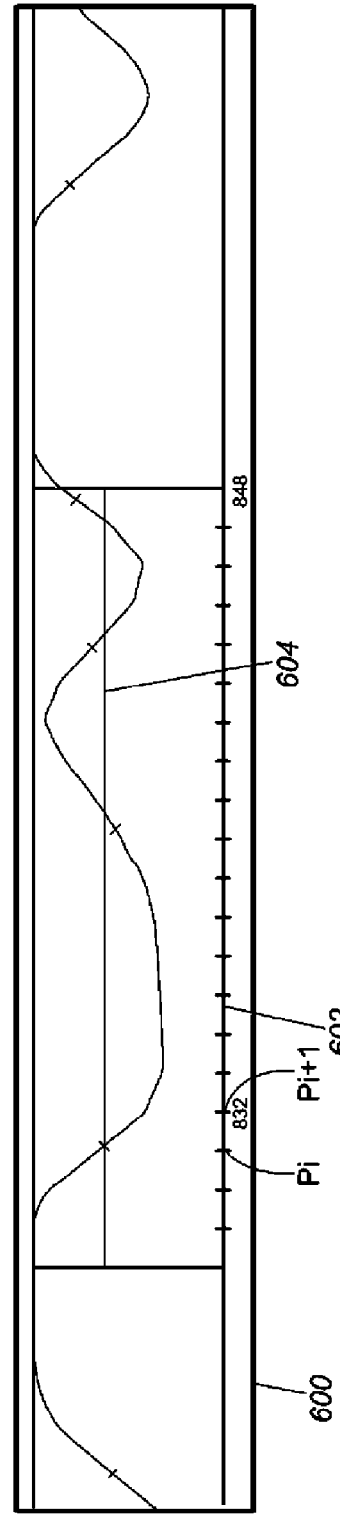
FIG. 27 is a close up view of the intensity plot of FIG. 26.

Referring to FIGS. 26 and 27, the illumination intensity signal is shown plotted versus pixel number in graph 600. The range finder processor carries out an edge detection programming routine by first selecting a sliding window 602 of twenty pixels and then calculating an average illumination intensity 604 over the twenty pixel window. If the intensity between adjacent pixels $P_i$ and $P_{i+1}$ cross average intensity line 604, an edge between a lighted bar and a non-lighted space is determined to be present between pixels $P_i$ and $P_{i+1}$. The following linear interpolation formula is used to calculate the approximate position of an edge with respect to a particular pixel $P_i$:

$$\text{Offset} = (\text{Average Intensity}_{twenty\ pixel\ window} - P_{i\ intensity})/(P_{i+1\ intensity} - P_{i\ intensity})$$

The actual location of an edge is equal to $P_i$+Offset. Window 602 is shifted by one pixel and the average intensity calculation is repeated, another edge is detected and the process is repeated until all edge locations are detected across the width of the sensor array. It should be understood that if the intensity increases from $P_i$ to $P_{i+1}$, then the transition is from a space to a bar, and if the intensity decreases from $P_i$ to $P_{i+i}$, then the transition is from a bar to a space.

After all edge locations are detected across the width of the belt, the range finder processor calculates the width of a bar or space based on the following formula:

$$\text{Width}_i = \text{edge location}_{i+1} - \text{edge location}_i$$

Once all bar and space widths have been determined, code word extraction is performed by examining six consecutive widths: three bars and three spaces. For the three bars, the widest (W) and narrowest (N) bars are determined. If W/N>7/5 and W−N>2.5 then there exists at lease one wide bar and a least one narrow bar. Otherwise, all three bars must be narrow since, in one embodiment, there cannot be three adjacent wide bars. If it is determined that one wide bar and one narrow bar exists, then if the middle bar width>(W+N)/2, then the third bar is also wide, otherwise the third bar is narrow. The above code word calculations are repeated for all spaces between the bars. The pixel widths of each of the narrow and wide bars and spaces drive the above ratios for determining whether detected edges define a wide or narrow bar or space. At this point, the processor can determine the order of bars and spaces and the location of the code words with respect to the width of conveyor belt 104.

In the above described embodiments, the heights of boxes placed on the conveyor should not be larger than 51 inches to ensure that a shifted code word does not move into the repeated portion of the unique pattern. If, on the other hand, a box having a height greater than 51 inches is placed on the conveyor causing a code word to shift into the repeated portion of the unique pattern, the measured height of the box would not be accurate. However, a disambiguation step can be performed to ensure that larger boxes are properly measured so that the cameras are accurately focused.

As previously described, a fundamental property of the unique bar pattern is that each instance of a codeword is located in at most three disjointed locations across the width of the belt since the unique pattern repeats approximately two and one-half times, Thus, to account for the possibility of a codeword shifting into the repeated portion of the pattern, a photo-eye or light curtain (not shown) may be placed upstream from range finder 102 to detect when a box greater than 51 inches approaches the range finder. If the photo eye or light curtain (not shown) detects a box greater than 51 inches in height, the range finder processor adds 51 inches to the measured height of the box. That is, because a shift in a code word moves into the repeated portion of the pattern when a box is greater than 51 inches, the measured height of the box would be the actual height minus 51 inches. For example, if a box having a height of 53 inches passes under range finder 102 and a code word from the first portion of the pattern shifts into the second repeated portion, then the measured height of the box would be based on the amount of shift of the code word from the original location of the second occurrence of the code word and not based on the amount of the shift from the original first occurrence of the code word. As such, the calculated height of the box would be two inches instead of 53 inches. Thus, to account for disambiguation, the system adds 51 inches to the measured shift resulting in the correct height of the box.

After disambiguation, the range finder processor calculates the shift in code words. When the range finder is manufactured, a memory table is stored containing the pixel location of each code word at a far field (calibrated) which, in one embodiment is calculated at approximately seventy-six inches. Based on the pixel location of the shifted code word and the pixel location in the far field for the code word, the code word shift is calculated in pixel distance using the following formula:

$$\text{Code Word Shift} = \text{Pixel location}_{near\ field} - \text{Pixel Location}_{far\ field}$$

The range finder processor calculates the shift of each code word across the top of the box for each scan in pixels. In one embodiment, the code word shifts in pixels are used by the stored $5^{th}$ order polynomials (as described with respect to FIGS. 23A-23C) to calculate the height of the object being measured. In other embodiments, the shift in pixels can be converted to inches using known techniques and the height calculated using the formula h=code word shift (inches)*tan θ.

The range finder also detects the right and left extents of the box by detecting interruptions in code words, for example when two adjacent words are not in the correct order. That is, because the laser light projects from the left or right side of the belt, the last code word on the conveyor at the base of the box and the first code word on the top edge of the box will not be properly sequenced since a number of words will be projected onto the side of the box. Therefore, abrupt changes in the unique sequence will alert the range finder processor that an edge of the box has been detected. The same will be true on the opposite extent of the box furthest from the laser source. Because the box creates a shadow, there will be an abrupt change in the code word sequence at the furthest extent of the box and the belt.

At this point, a single slice profile of box 103 is stored in the range finder memory similar to prior art dimensioners. The range and extent information is transmitted to each camera and the information is used to focus the cameras based on their location with respect to the conveyor belt. Range finder 102 takes multiple scans of box 103 over time and uses the height and extent information to build a 3-D model of the box. The 3-D model of the object and any barcode data obtained by the cameras in the tunnel are transmitted to the host system for further processing.

Prior to operation of range finder 102 and cameras 106, 108 and 110, the devices must be installed into a scanning tunnel system at the host location. The range finder and cameras have been designed and manufactured so that a scanning tunnel can be mechanically set-up and calibrated (hard set-up) by a single technician. In particular, range finder brackets 266 and 268 contain machined locating pins (not shown) and three point contacting surfaces to accurately align range finder 102 into substantially the same orientation and position in the field as that used for calibration and set-up in-house. Additionally, camera chassis module 124 contains machined locating pins (not shown) and three point contact surfaces, which are also used to align the cameras into substantially the same orientation and position in the field as that used for calibration and set-up during manufacture. The range finder and cameras are mounted to brackets that are permanently attached to the tunnel. In some embodiments, the mounting brackets may be integrally formed with the tunnel. The tunnel mounting brackets, locating pins and three point contact surfaces result in the range finder and cameras having negligible assembly to assembly variations. As a result, the range finder's and cameras' factory calibrations and set-ups are unaffected by shipping or mounting in the tunnel system.

Figure 28:
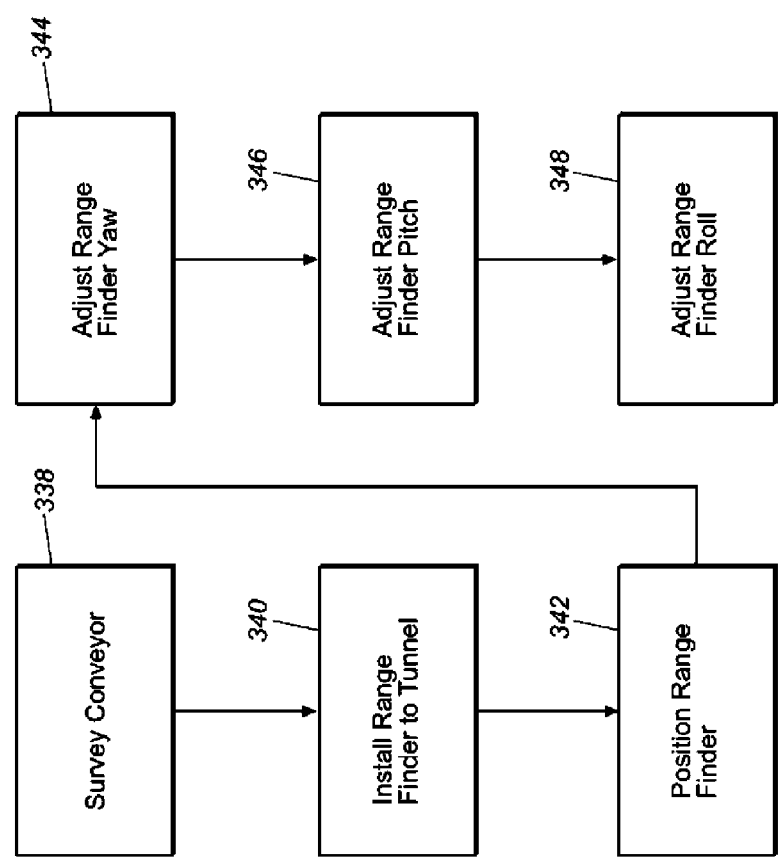
FIG. 28 is a block diagram of steps for mounting the range finder of FIG. 16 in the tunnel system as shown in FIG. 3.

Referring to FIG. 28, at step 338, the technician surveys the conveyor system and makes reference marks on belt 104 parallel to the direction of a package's travel to indicate the center of the conveyor. Additionally, reference marks are made transverse to the direction of travel at the left and right edges of the conveyor. The latter two reference marks are used to adjust the range finder's yaw angle relative to the conveyor. At step 340, the range finder is loosely attached to the scanning tunnel's structural member. At step 342, a plumb bob is attached to a center of the range finder having a 75.5±½ inch length. The range finder is then positioned above the belt so that the plumb bob touches the conveyor surface, the structural member is secured in place, the mount assembly is moved across the conveyor until the plumb bob is centered above the center reference mark, and the mount is secured to the tunnel structure. At step 344, the technician attaches the power supply to the range finder and observes the position of the range finder's laser pattern on the conveyor belt relative to the two reference yaw marks. The yaw screw adjustments are manipulated until the laser pattern is parallel to the yaw reference marks.

At step 346, a calibration package (24 to 36 inches high) is placed on the conveyor in the center of the range finder's field of view that produces a range measurement of 40 to 52 inches. Once the box is in place, the technician observes the position of the range finder's laser pattern on the vertical sides of the package and manipulates a pitch adjustment screw until the laser pattern is parallel to the vertical edges of the package.

Figure 30A:
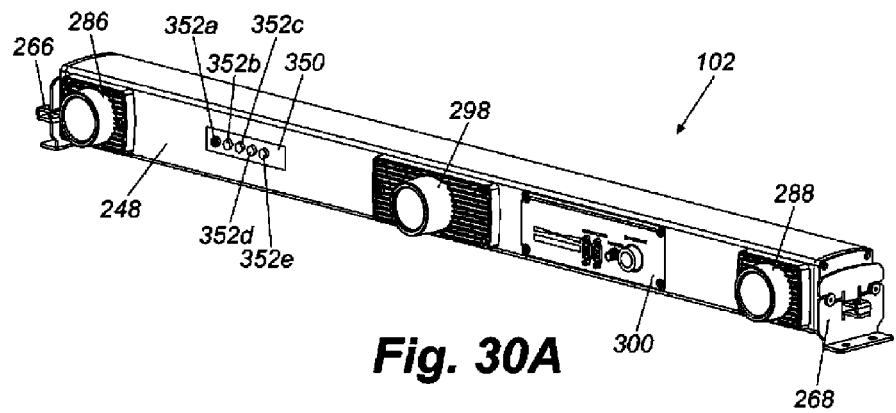
FIGS. 30A-30C are perspective views of a range finder in accordance with an embodiment of the present invention.
Figure 30B:
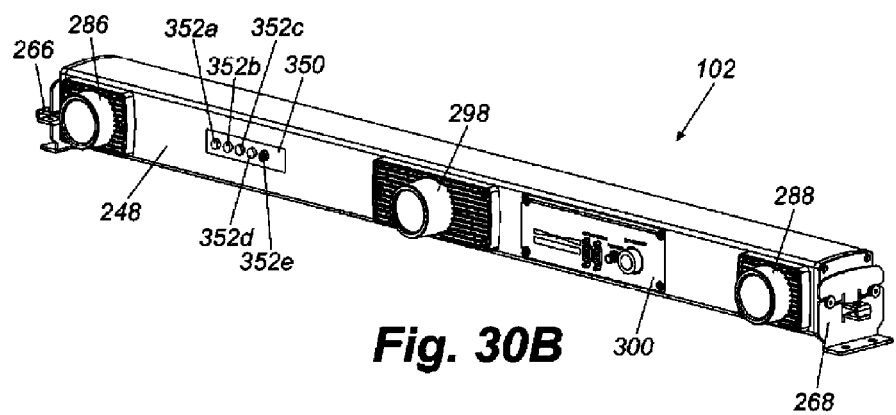
Figure 30C:
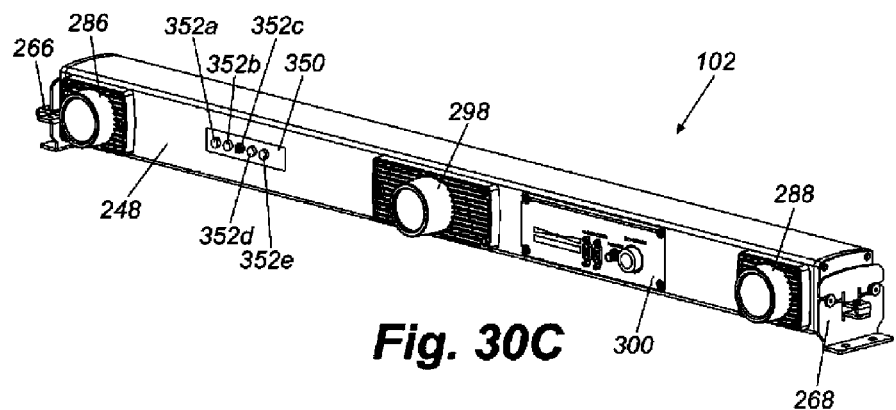

Referring to FIGS. 30A-30C, one embodiment of range finder 102 may be equipped with a roll adjustment display panel 350. Display panel 350 may contain five led lights 352a-352e that illuminate depending on the roll angle of the range finder with respect to a surface below the range finder. At step 348 (FIG. 28) and referring particularly to FIG. 30A, light 352a is illuminated indicating that the range finder is tilted with respect to the conveyor surface. Thus, display panel 350 indicates that the technician should adjust the roll adjustment screw. Referring to FIG. 30B, light 352e is illuminated indicating that the roll adjustment screw was over adjusted causing the range finder to be tilted in the opposite direction from that shown in FIG. 30A. Consequently, the technician must manipulate the roll adjustment screw in the opposite direction until center light 352c illuminates, as shown in FIG. 30C. Once center light 352c illuminates and stays lit, the technician may lock down all adjustment screws and fasteners.

The roll of the range finder is determined by the image sensed by the range finder's image sensor. In particular, the range finder calculates its distance to the conveyor at points across the belt and determines if one side of the range finder is further from the belt surface than the other side. Thus, as the roll adjustment screw is turned, real-time readings are taken to determine the effect of the adjustment. Once the distance measurements across the belt are substantially equal (within acceptable tolerances), center light 352c illuminates. It should be understood that other display panels may be used in place of the LEDs, for example a LCD screen and bar graph. In addition to the technician using manual roll adjustment screws to change the roll of range finder 102, the range finder may include servo motors operatively connected to the mounting brackets to allow range finder 102 to automatically self-level itself with respect to the face of the conveyor belt.

Figure 29:
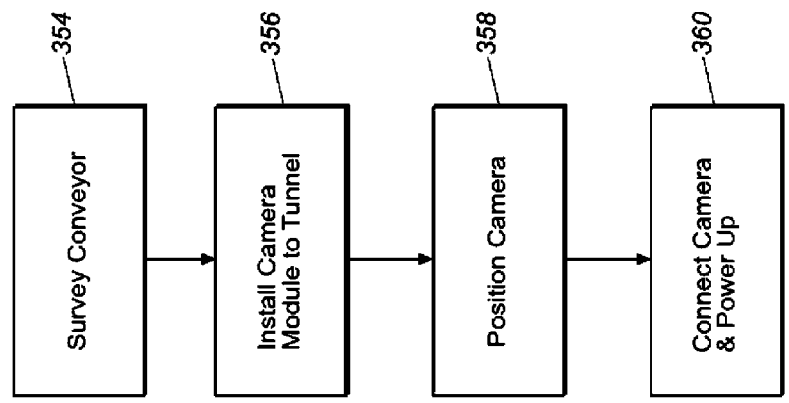
FIG. 29 is a block diagram of steps for mounting the camera of FIG. 5 in the tunnel system as shown in FIG. 3.

With regard to the camera installation, referring to FIG. 29, at step 354, the technician surveys the conveyor system and makes a reference mark on the conveyor to indicate an approximate location of the camera's illumination beam with respect to the range finder's laser pattern. This information is provided on the CAD drawings associated and shipped with the scanning tunnel. At step 356, the camera is installed to the camera mount assembly on the tunnel. To ease installation, the camera may be taken apart to reduce the overall weight of the camera during installation, which allows for a single technician to mount and secure the camera chassis module to the tunnel Once camera chassis module 128 is secured to the tunnel frame, illumination module 124 and communications module 130 may be assembled on the chassis module. At step 358, the coarse position of the camera is adjusted to position the camera illumination beam in the center of the conveyor. Depending on the tunnel system, a mirror may be installed to redirect the camera laser and sensor field of view. In one embodiment, the mirror may be set to one of its working angles of 8, 30 or 45 degrees, and the mirror is centered relative to the camera. The mirror redirects the cameras field of view allowing the camera to be mounted in various orientations with respect to conveyor 24. At step 360, the power and networking cables are connected to the camera and the technician verifies that the camera passes its power-on self-test. The technician repeats the camera set-up procedure for each camera in the scanning tunnel. At this point, the initial hard set-up of the scanning tunnel is complete and the range finder and cameras are ready for electrical calibration (soft set-up).

During the soft set-up, the range finder and cameras are calibrated to determine their x-axis, y-axis, z-axis positions and roll, pitch and yaw angles with respect to the conveyor coordinate system. Additionally, the camera's ambient light compensation, the tachometer scale factor, the conveyor's region of interest, the symbol decode engine options, host communication parameters, Ethernet network communication parameters and the information transmit point are all set-up and/or calibrated. For purposes of discussion and referring to FIG. 31, coordinate systems 362, 364 and 366 are shown for each of the conveyor, the range finder and one camera, a top mount camera, respectively. It should be understood by those skilled in the art that each camera will have its own unique coordinate system with respect to the conveyor coordinate system. Calibration of the range finder and cameras allow for a point in the conveyor coordinate system to be mapped to a point in the camera's or range finder's coordinate system and vice versa so that the location of each camera with respect to the range finder can be established. Knowledge of the location and orientation of the cameras with respect to the range finder allows for the cameras to properly focus on objects traveling on the conveyor system based on information provided by the range finder.

In prior art systems, scanning tunnel cameras were calibrated by first mounting the camera in an exact position and orientation using manual positioning devices (i.e. levels, angles, etc.). Once the cameras were mounted, a computer was connected to each individual camera and the camera was calibrated through an extensive programming routine and visual orientation by the technician setting up the tunnel. These prior art calibration techniques required a skilled technician to participate in every tunnel set-up, which is time consuming and expensive. The present invention seeks to eliminate the need for highly skilled technicians and timely manual calibration methods. In the present invention, calibration of the scanning tunnel is performed through a combination of static and dynamic calibration routines using one or more calibration boxes that are placed within the scanning tunnel. The static calibration routine allows for a lower skilled tunnel operator or technician to set-up and calibrate the tunnel and establish the tunnel's operating region of interest for both the range finder and the cameras, as explained in more detail below.

Figures 32, 32A:
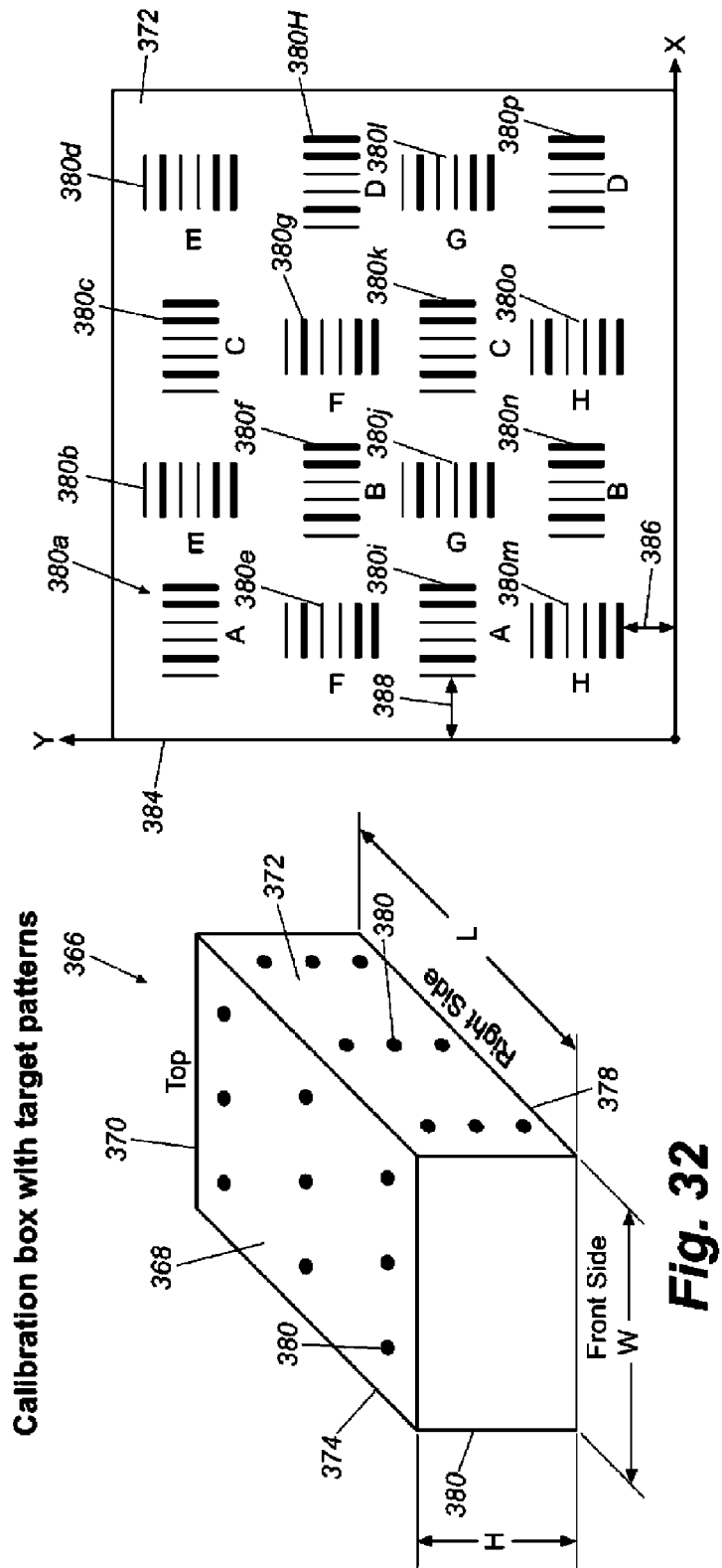
FIG. 32 is a perspective view of a calibration box in accordance with an embodiment of the present invention.
FIG. 32A is a plan view of one side of the calibration box shown in FIG. 28.

Referring to FIG. 32, one embodiment of a calibration box 366 is shown having a top surface 368, a front surface 370, a right side surface 372, a left side surface 374, a back surface 376 and a bottom surface 378. A series of indicia, for example, barcodes 380 are placed across the top, bottom, sides, front and back of the box in various positions and orientations. The barcodes are oriented in different positions to ensure that the camera's line scanner will read at least one barcode in any orientation on the belt's surface. Therefore, for each barcode, all adjacent barcodes are rotated ninety degrees, thereby ensuring that no matter the box orientation at least one barcode can be read. Each barcode contains a calibration box code number, a box face indicator (i.e., front, top, left, right, back or bottom face) and an offset of the beginning of the code from the box x- or y-axis, which has an origin at the bottom left corner of the box.

FIG. 32A illustrates one embodiment of a single side 372 of calibration box 366 having sixteen distinct barcodes 380a-380p. The location and orientation of each barcode is known to the system. For example, a distance 386 of each bar in barcode 380a is known with respect to a bottom edge 382 (x-axis position), and a distance 388 for the first bar is know with respect to an edge 384 (y-axis position). The same is true for every other barcode 380b-380p with respect to the bottom left corner (the origin of the box). No two similar barcodes should be adjacent in any column or row since the greater the distance between two identical barcodes, the better the calibration results. The same holds true for adjacent sides of calibration box 366 in the event that one camera can read two adjacent sides of the calibration box. It should be understood that many different types of indicia may be used including, but not limited to, one-dimensional barcodes, two dimensional barcodes or other suitable graphics capable of conveying information.

Figure 33:
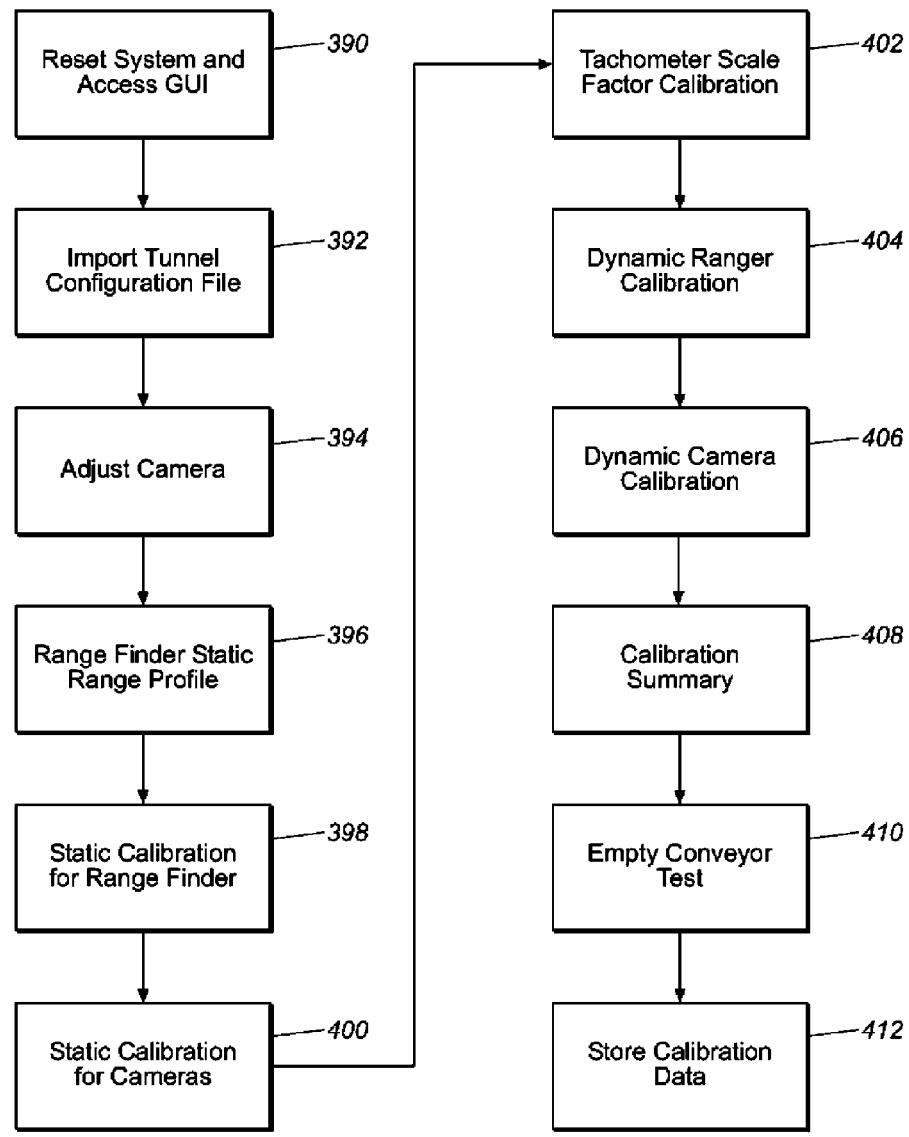
FIG. 33 is a flow diagram of an automated calibration routine in accordance with one embodiment of the present invention.

Referring to FIG. 33, the soft set-up consists of two parts: a static calibration where calibration boxes are positioned on the conveyor belt in known locations while the conveyor is not moving, and a dynamic calibration where calibration boxes are passed through the tunnel system on conveyor 104. The purpose of static calibration is to determine the x-axis, y-axis and z-axis and the pitch, roll and yaw angle of the range finder with respect to the conveyor belt. Additionally, starting values of the x-axis, y-axis and z-axis and the pitch, roll and yaw angle of each camera is also determined. Through dynamic calibration, the x-axis, y-axis and z-axis and the pitch, roll and yaw angle of each camera is refined.

Static Calibration

For the static calibration, the items to be calibrated for the range finder are its x-axis, y-axis, z-axis position and its pitch, roll and yaw angle with respect to the conveyor belt. The items to be calibrated for each camera are its x-axis, y-axis, z-axis position and its pitch, roll and yaw angle with respect to the conveyor belt, and the camera's ambient light compensation. Additional calibration items include the conveyor's tachometer scale factor (counts/inch) and the conveyor's region of interest (ROI). The dynamic calibration allows for the system to fine tune the position attributes that were measured during static calibration by using barcodes found on the calibration boxes.

The conveyor's ROI is the segment of the range finder's field of view (FOV) across the conveyor in which objects to be scanned will be present. Thus, the term "ROI" as used herein refers to that portion of the belt of interest for the particular application by the customer. For example, referring to FIG. 33A, the potential ROI extends between points $ROI_1$ and $ROI_2$, which is the FOV of the ranger with respect to the belt. In some applications, the customer only expects to read data over a limited ROI such as the right twenty inches of the belt (the ROI defined between $ROI_1$ and $ROI_3$). That is, the customer knows that packages are going to be loaded onto the conveyor belt along the right side edge that will be no wider than fifteen inches so that no box should ever appear outside of this range. As a result, the ROI for this customer application is the right most twenty inches of the belt. It should be understood that it is not necessary for the ROI to include one or more of the right or left edges of the belt or the belt's center. In fact, the ROI may be any portion of the belt between $ROI_1$ and $ROI_2$.

To begin the soft set-up of the scanning tunnel, at step 390, the technician attaches a computer to the tunnel network and uses an internet browser, for example Internet Explorer, Netscape or Mozilla, or other suitable browsers, to access a graphical user interface (GUI). The software will automatically detect whether the cameras and range finder require a soft set-up calibration and, if so, the GUI indicates that a calibration is necessary and provides a web link to a calibration webpage in which directions for the calibration process are provided in real-time.

At step 392, the technician is prompted to import a tunnel configuration data file, which contains initial factory estimates of camera and ranger position within the particular tunnel structure. In particular, the data file may contain one or more of the following pieces of information regarding the tunnel system:

Number of cameras
Number of range finders
Choice of units: English or metric
Belt speed: feet/minute
Tachometer scale factor
Tachometer input mode
Fixed focus distance
Light curtain offset
Package detect input mode
Belt width: 1 to 50 inches
Minimum side-to-side spacing: 1"
Max: package size: 78"×36"×36" (L,W,H)

Min: package size: 1"×2"×1" (L,W,H)
Camera Data: name, type and mounting position, focus mode, gain table, transmit point, etc.
Server Value: camera acts as the server
Minimum spacing between packages: 12"
Focus source: fixed, range finder, light curtain
Trigger source: focus, trigger or software
Barcode table: Aztec, codabar, code 11, code 128, code_39, code_93, datamatrix, etc.
Ranger configuration: name, type and mounting position Once the tunnel configuration file is imported, at step 394, each camera's illumination is turned on and the installer is prompted by the GUI to adjust each cameras mirror angle to center its illumination pattern on the reference marks placed on the belt during the hard set-up, as previously described. Once centered, the technician clicks a button on the GUI and the system turns off the cameras' illumination patterns.

Figure 33A:
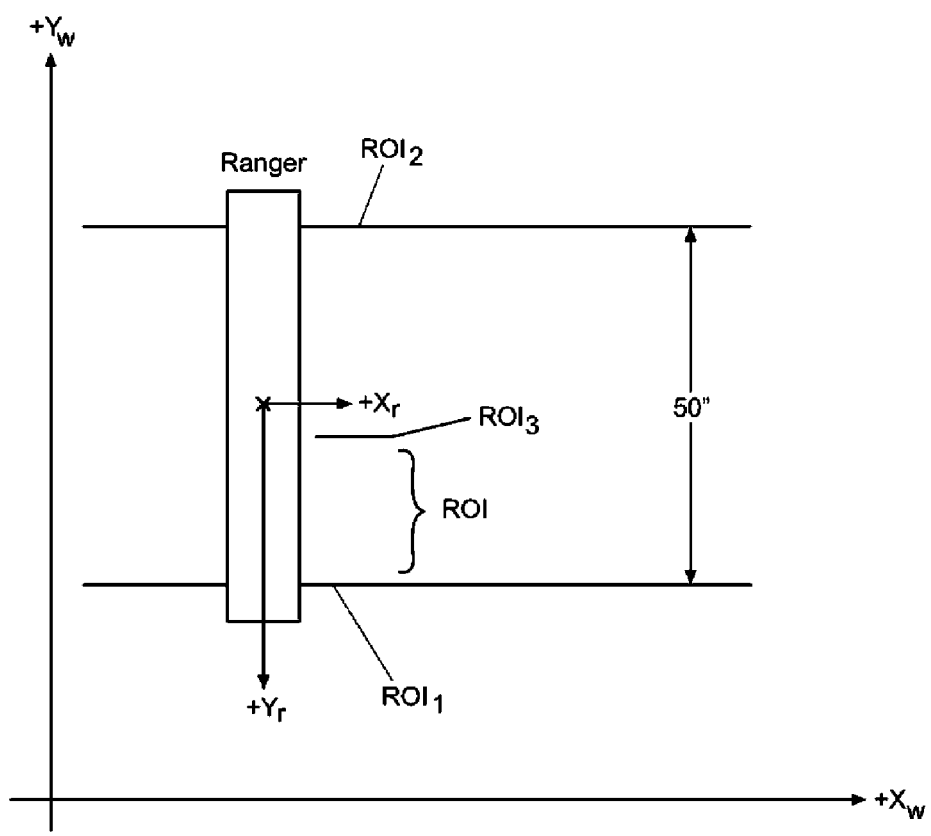
FIG. 33A is a top plan view of the conveyor system and range finder of FIG. 31.
Figure 34D:
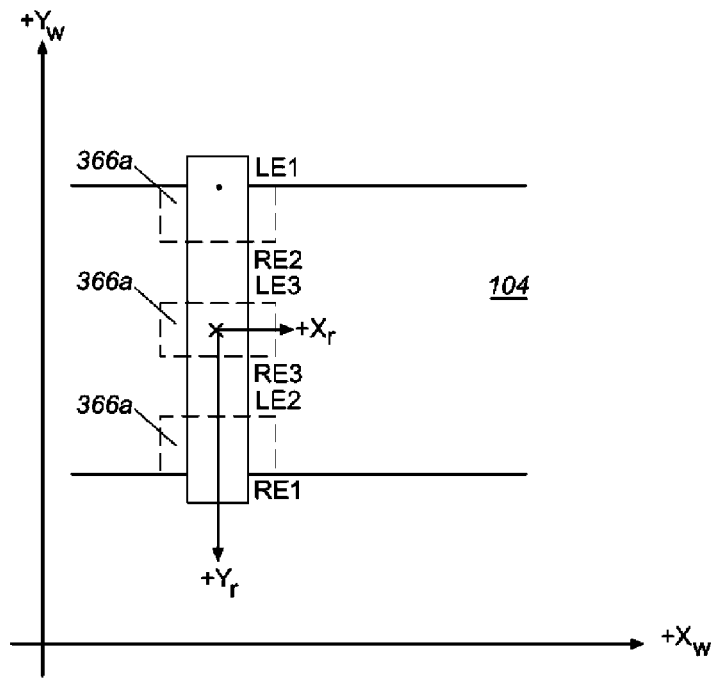
FIG. 34D is top plan view of the conveyor system of FIG. 31.
Figure 34E:
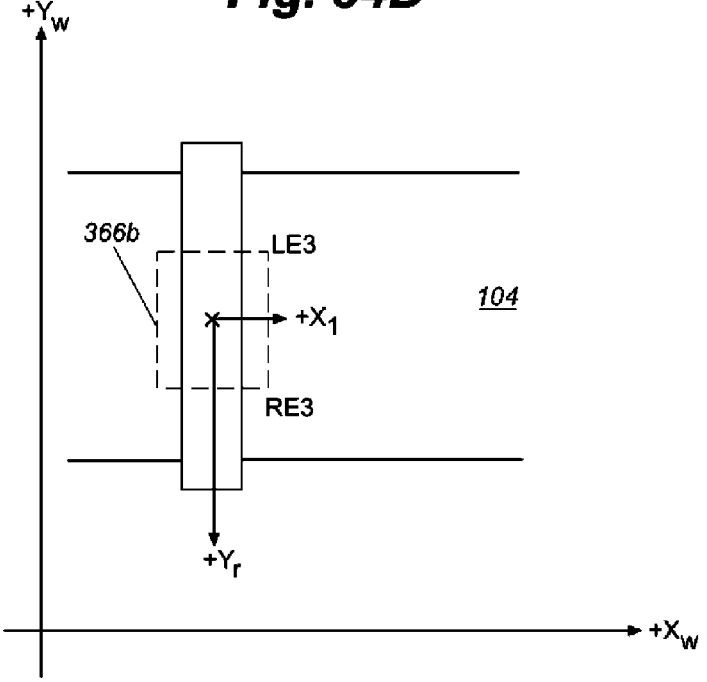
FIG. 34E is top plan view of the conveyor system of FIG. 31.

At step 396, the GUI directs the technician to remove all items from conveyor belt 104 and prompts the technician to initiate the range finder's static belt calibration process. At step 398, the range finder first determines the static across the belt range profile for the face of conveyor belt 104. That is, the range finder determines the distance to the belt and the left and right extents of the belt by projecting it pattern onto the belt and reading the results. Referring to FIG. 34A, the GUI then instructs the technician to place a first calibration box 366A onto conveyor 104 in the range finder field of view 312 (FIG. 19) at three separate locations with respect to the ROI. This step is carried out with the conveyor belt in a static condition, i.e. not moving. The first at the right edge (RE1) of the ROI, the second at the left edge (LE1) of the ROI and the last at the approximate center of the ROI. For ease of explanation, it is assumed for this discussion that the ROI equals the full width of belt 104 and extends between $ROI_1$ and $ROI_2$ (FIG. 33A). If, however, the ROI was to extend between $ROI_1$ and $ROI_3$, then the calibration box would instead be placed at the edge of $ROI_3$ and not at $ROI_2$.

At each of the static positions, the range finder records the first calibration box's left (LE1, LE2 and LE3) and right (RE1, RE2 and RE3) extents and its height. Referring to FIG. 34B, after calibration with the first box, the GUI instructs the technician to place a second calibration box 366b onto conveyor 104 at the center of the ROI and the range finder again determines the second calibration box's extents RE3 and LE3 and range. Based on the actual measurements, the system computes the extents of the conveyor's ROI. The range finder determines its y-axis position with respect to the center of the ROI based on the range finder's center pixel location with respect to the center of the ROI. During calibration, the x-axis position of the range finder, with respect to the conveyor belt's coordinates, is set to zero. Referring to FIGS. 34A and 34B, the range finder's x-axis, y-axis and z-axis positions are calculated by the following formulas:

Ranger X position=0

Ranger Y position=Right side ROI(RE1)−((Right side ROI(RE1)−Left side ROI(LE1))/2)

Ranger Z position=$(((Ht_{calbox1}+Range_{calbox1})+(Ht_{calbox2}+Range_{calbox2}))/2*cos(Range Finder_{pitch\ angle})$ Belt Width=RightSide ROI(RE)−LeftSide ROI(LE)

Where "Ht" is the actual height of the calibration boxes, "Range" is the measured height of the calibration boxes and Range Finder pitch angle is obtained from the CAD drawings shipped with the tunnel.

Based on the "across the conveyor" ranger profile data and the ROI calculated in step 398, range finder 102 computes the roll angle between its self and conveyor 104 and determines the across the belt length over which range data is valid for computing the roll angle. The accuracy of the left and right position measurements are typically on the order of ±0.25 inches and the measured range height is typically on the order of ±0.1 inches. Therefore, if the measured height information differs by more than a predetermined value, for example 0.35 inches from the calibration box's known height, the system will warn the technician.

For example, if belt 104 was 50 inches in width and the ROI included only the right most 25 inches of the belt, then the Ranger X and Y positions would be calculated as follows:

Ranger X position=0

Ranger Y position=50"(RE1)−((50"(RE1)−25"(LE1))/2)=37.5"

Thus, the origin for the range finder would be at X=0" and Y=37.5 inches, which is offset from the actual ranger Y axis by 12.5 inches.

At step 400, for each top, front and rear mounted camera, the cameras are calibrated using the first and second calibration boxes, which are each placed in a static position on conveyor 104 in the cameras' fields of view at the extents of conveyor ROI ($ROI_1$ and $ROI_2$, FIG. 33A). For example, for each box the GUI instructs the technician to place the calibration box into the center of the camera's field of view so that the camera auto-focuses onto a top, side or bottom of each calibration box and captures the focal distance at the extents of the ROI. The focal distance is determined by the amount of movement required for the camera to obtain a sharp image of the calibration box. Based on the focal distance, the camera determines the range from the calibration box to the image sensor based on the $5^{th}$ order polynomial derived during the camera's initial in-house calibration and stores focus information in the camera's memory. In addition, for each calibration box, the system automatically makes changes to the camera's video gain table to compensate for the ambient light levels in the tunnel. Each camera can provide a visual or audio signal to let the technician know that the data has been captured, for example a sound or the flash of the camera's illumination LEDs.

Front, Top and Rear Mounted Cameras

From the height data of the first and second calibration boxes, as measured by the range finder and the top, front and rear mounted cameras using the camera's auto-focus technique, the system establishes an initial z-coordinate for the position of each front, top and rear mounted camera and range finder relative to the conveyor belt. Additionally, the system computes a linear relationship between the height measurement detected by the range finder and the camera's focus command for use in focusing the camera based on range finder measurements. Referring again to FIG. 31, the following formulas are used to determine the camera's focus command and an initial value of the camera's z-position:

Focus CMD=Range Y*((Focus $CMD_{Calbox1}$−Focus $CMD_{Calbox2}$)/($Range_{Calbox1}$−$Range_{Calbox2}$))

Camera Z=$(((Ht_{calbox1}+Range\ 1)+(Ht_{calbox2}+Range\ 2))/2)*Cos(Camera_{Pitch\ Angle})$ $Camera_{yaw}$=0

$Camera_{roll}$=0

Where Ht is the actual height of the calibration boxes, Focus CMD is the measured height of the calibration boxes based on the camera's focus table, RangeY is the calculated position in the range finder step of the box's edge position relative to the range finder's ROI and Camera pitch angle is obtained from the CAD drawings shipped with the tunnel. The camera's roll and yaw angle are assumed to be zero degrees during static calibration. Thus, these calculations provide an initial measurement of the camera's position in the conveyor coordinate system and for the relationship of the camera's focus command with respect to the range finder's measured position and the height of each camera.

Side Mounted Cameras

Figure 35:
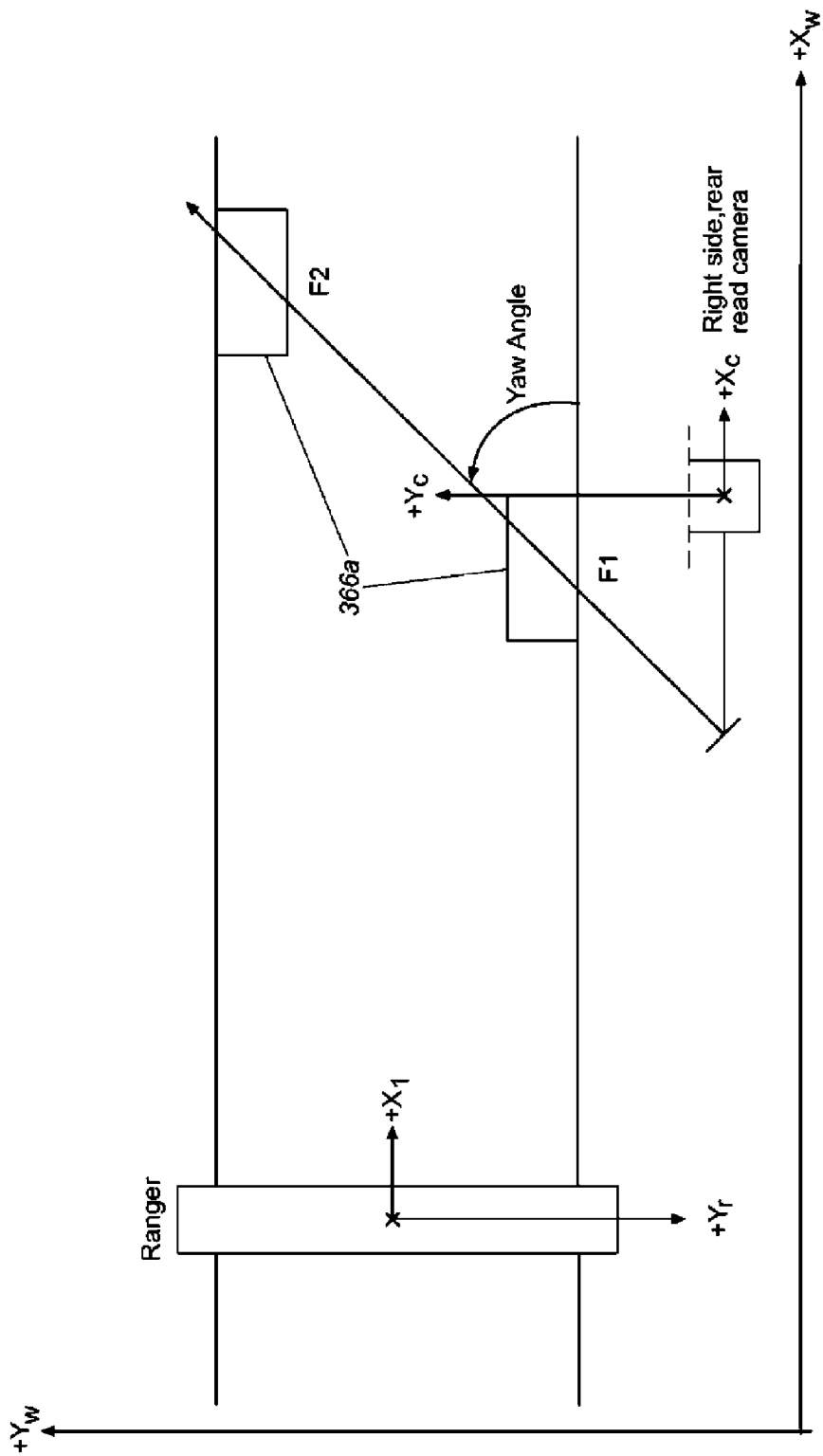
FIG. 35 is a top plan view of the conveyor system of FIG. 31.
Figure 36:
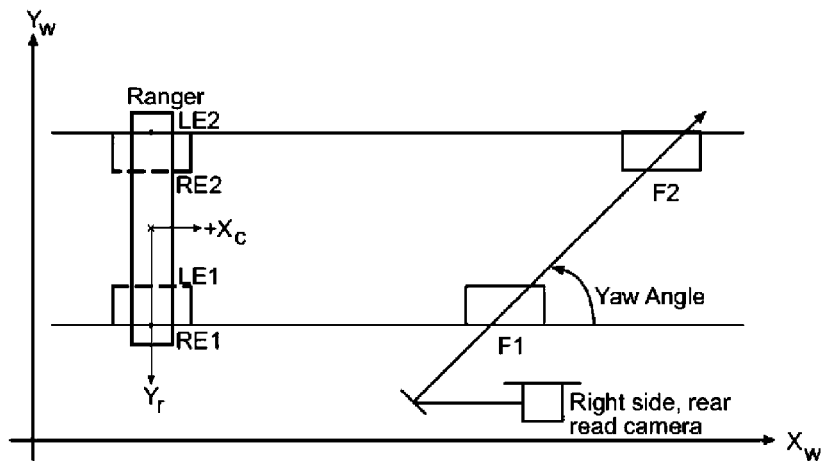
FIG. 36 is a top plan view of the conveyor system of FIG. 31.

Referring to FIG. 35, for each side read camera in the tunnel the GUI instructs the technician to place the calibration boxes at two positions in the camera's field of view: the first is at the conveyor's ROI right edge close to the camera and the second is at the conveyor's ROI left edge farther away from the camera. For each box, at each position, the camera uses its auto-focus technique to measure the focal distance to the object. Thus, two focal points are obtained for each box F1 and F2, which are used to determine the relationship between the range finder's y-axis coordinate and the side camera's focus command, and to determine the yaw angle of the camera, which is the angle the camera is disposed at with respect to the x-axis of the conveyor system. It should be understood that the position of the static calibration boxes in the y-axis should be positioned in substantially the same y-axis position for the camera as that for the range finder i.e., at the right and left extents of the ROI. Consequently, the focal distance measured by the camera along the y-axis can be correlated to the y-axis measurement from the range finder.

In addition to the above measurements, the camera adjusts its video gain table to account for differences in the ambient light conditions in the tunnel. The system uses the following formulas to calculate the focus distance in the y-axis and the yaw angle of each side camera:

Focus(y)=((Range(y)−RE1)*((F2−F1)/(RE2−RE1)))+F1

Yaw Angle=arcsin((RE2−RE1)/F2−F1))

The above equation for Focus(y) is used during the operation of the tunnel system to set the side read cameras' focus given a range position across the conveyor (y-axis) during operation. That is, for any given y-axis position of a box edge determined by the range finder, the camera can calculate the correct focus command for that specific point. Said another way, as the range finder provides y-axis position information for a box edge, the camera can dynamically change its focus to accurately read data at the specific y-axis position transmitted by the range finder.

Bottom Read Camera

If the tunnel includes an optional bottom read camera, the GUI instructs the technician to place a calibration box onto the center of the conveyor in the top camera's field of view. The bottom read camera then uses its auto-focus to measure the focal distance to the box. It should be understood that when a bottom read camera is used, conveyor 104 is formed from two adjacent conveyors with a sufficient gap between them to allow the camera to read the bottom of a box. The bottom read camera will also make changes to its video gain table to adjust for ambient light conditions. Unlike a top, front, rear or side read camera, the bottom cameras focal distance does not require adjustment since the height between the camera and an object should never change.

In one embodiment, the calibration boxes should be chosen from one or more of the following sized boxes:

| Box Number | Dimensions (L by W by H) in inches |
|---|---|
| 1 | 3 by 5 by 9 |
| 2 | 6 by 12 by 18 |
| 3 | 15 by 15 by 36 |

One of skill in the art would understand that other sized boxes can be used for the calibration boxes. The key being that the calibration boxes vary in size to provide the greatest accuracy in the initial static calibration measurements. Therefore, the above sized boxes represent one of many combinations of box sizes.

Tachometer Scale Factor

Referring again to FIG. 29, at step 402, in some embodiments, a tachometer scale factor is calibrated to correct for inaccuracies in measured distance per tachometer pulse. In particular, if, for example, a tachometer is manufactured to output a predefined number of tachometer pulses per inch, when installed in the field, the tachometer may provide a different number of pulses per inch. Thus, a tachometer scale factor is calculated to compensate for any inaccuracies using a tachometer calibration box having a length greater than 72 inches and a width and height of about 3 inches. Once the technician places the tachometer calibration box on the conveyor, a button on the GUI is pressed, and the box is moved through the tunnel by conveyor 104.

Range finder 102 computes the tachometer scale factor based on the calibration box's measured length in tachometer counts compared to its actual length in inches, which is known. The length in tachometer pulses is then compared to the known length in tachometer pulses and a scale factor is calculated. It should be understood that greater accuracy in calculating the tachometer scale factor is achieved when the calibration box is longer than 72 inches, and a less accurate scale factor is computed when the box is less than 72 inches. To improve the accuracy in the X-axis, the scale factor calibration box can be run through the system several times and the result of each run can be averaged.

It should be understood that the tachometer scale factor can be determined during the dynamic calibration step, as explained in greater detail below.

During the scale factor calibration step, each of the cameras continuously acquire images of the conveyor and tachometer calibration box, compare its current image to its "no object image" and record the tachometer value when the camera initially detects the box and when it no longer detects the box in its field of view. Based on this information and information obtained from the range finder, the camera computes the tachometer offset (TachOffset) between itself and range finder 102, which is equal to the average of the difference in counts between the range finder and each camera's "object present" and "not present" transitions. The offset and camera's pitch angle (from CAD drawings) are used to set the initial x-axis position of the top, front and rear cameras with respect to the range finder for any y-axis range value using the following formula:

Camera $X$=Counts*Tach scale factor+((Camera $Z$−Ht$_{TachCalBox}$)*tan(Camera$_{Pitch\ Angle}$))

For each side read camera, the camera computes the tachometer offset between itself and range finder 102, which is equal to the difference in counts between the range finder and each camera's "object present" and "not present" transitions. Using the range finder's y-axis location of the calibration box, the count offset and the cameras pitch angle (from CAD drawings), the side read cameras are able to computer the x-axis offset between themselves and the range finder for any y-axis range value using the following formula:

$$\text{Camera } X_{Left\text{-}side\ camera}=(\text{Range}(y)-\text{LE})/\tan(\text{Camera}_{Pitch\ Angle})+\text{TachOffset}$$

$$\text{Camera } X_{Right\text{-}side\ camera}=(\text{Range}(y)-\text{RE})/\tan(\text{Camera}_{Pitch\ Angle})+\text{TachOffset}$$

The Camera$_{Pitch\ Angle}$ is the angle listed in the CAD drawings provided with the tunnel Once the static calibration is completed, the system will have calculated initial range finder X, Y, and Z positions, and the position of each camera (X, Y, Z) relative to the conveyor and range finder. The technician is then directed to the system to move to the dynamic calibration phase of the soft set-up where the angle positions of each of the components are refined.

Dynamic Calibration

The static calibration technique described above provides approximate values for the cameras' position with respect to the range finder and conveyor belt by performing a dynamic calibration. The dynamic calibration is carried out by running calibration boxes containing barcodes or other indicia through the scanning tunnel so that the calibration boxes can be imaged. From the imaged data, the system is configured to calculate precise x-axis, y-axis, z-axis and pitch, roll and yaw angles for each camera. Referring again to FIG. 33, at step 404, the dynamic calibration begins when the GUI instructs the technician to place the first calibration box onto the conveyor to the left-center of its ROI. As the object travels along the conveyor, range finder 102 detects its presence and records its height (z-axis), left and right edges (y-axis) and tachometer values (x-axis). When the object reaches a camera's field of view, the camera records the object. Once the first calibration box exits the tunnel, the GUI instructs the technician to place the second calibration box onto conveyor 104 to the right-center of its ROI. As the object passes through the tunnel, range finder 102 detects its presence and records its height (z-axis), left and right edges (y-axis) and tachometer values (x-axis). When the object reaches a cameras field of view, the camera records the object. From the information collected by the range finder for each box, the system analyzes the range data and computes a rectangular outline of the calibration box top surface with respect to the conveyor belt.

At step 406, the dynamic calibration for each camera is carried out. For top, front, rear and bottom read cameras, the system creates a 2D image of each calibration box from its collected data of 1D scans, analyzes the images and locates the position of the barcodes on the calibration box. The camera can detect the spacing of the bars of each detected barcode and the distances of the bars with respect to the edges of the calibration box. The system uses this information to calculate the cameras pitch angle with respect to the conveyor belt. For the left and right side cameras, the system computes the camera's roll angle with respect to the conveyor belt. Additionally, from the X-Y center and yaw angle of the rectangles formed from the range finder data, and from the X-Y center and yaw angle of the barcodes on the top of the boxes, the system computes the XY position and yaw of the top camera with respect to the ranger. It's assumed that the yaw angle of the ranger with respect to the conveyer is zero.

Based on the detected Y pixel locations for the barcodes in the 2D image of the front (rear) side of the calibration box and the barcodes actual spacing in inches, the system computes the measured spacing by converting the found locations into inches using the camera's dots per inch (DPI) and lines per inch (LPI) values. For top, front-top, rear-top, and bottom read cameras, the camera pitch angle is determined by the following formula:

$$\text{Camera}_{Pitch}=a\tan(\text{measured spacing/actual spacing})$$

A similar computation is performed using the measured spacing from the image data of the left (right) side of the box to compute the top camera's roll angle.

$$\text{Camera}_{Roll}=a\tan(\text{measured spacing/actual spacing})$$

Figure 37A:
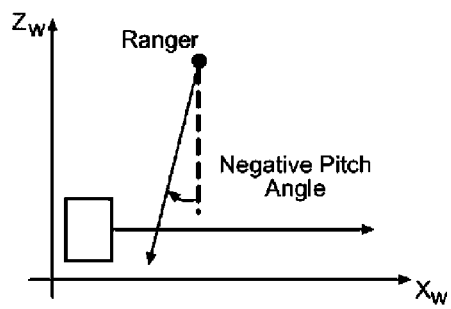
FIG. 37A is a side plan view of the scanning tunnel of FIG. 31.
Figure 37B:
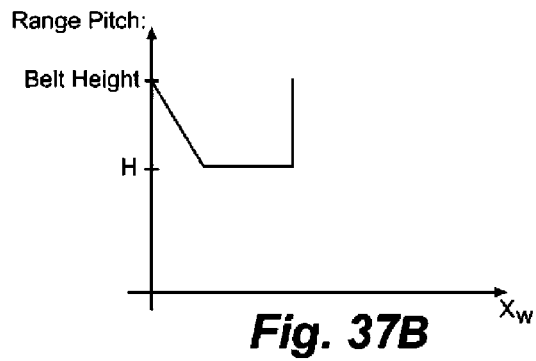
FIG. 37B is a plot of the range finder's pitch angle with respect to the conveyer.

Referring to FIGS. 37A and 37B, the range finder's pitch angle with respect to the conveyer is computed by analyzing the range (height) data of the box as a function of its conveyer position. Specifically, the slope of the range (height) data as the box enters (or leaves depending on the sign of the pitch angle) represents the range finder's pitch angle. The larger the pitch angle (for a given conveyer speed) the more range sample of the front (or rear) surface of the box will be acquired. Thus, using the following formulas, the range finder's pitch angle and Z-axis position can be measured.

$$\text{Ranger Finder}_{Pitch}=\text{slope of calibration box height data}$$

$$H=\text{Belt Height}-((\text{Calibration Box Height/cos(Ranger Finder}_{Pitch}))$$

$$\text{Ranger Finder}_Z=(\text{Range to belt at Range Finder's center pixel})*\cos(\text{Ranger Finder}_{Pitch})$$

Because the distance along the X-axis is measurable, the slope can be calculated from the measured distances.

Figure 31:
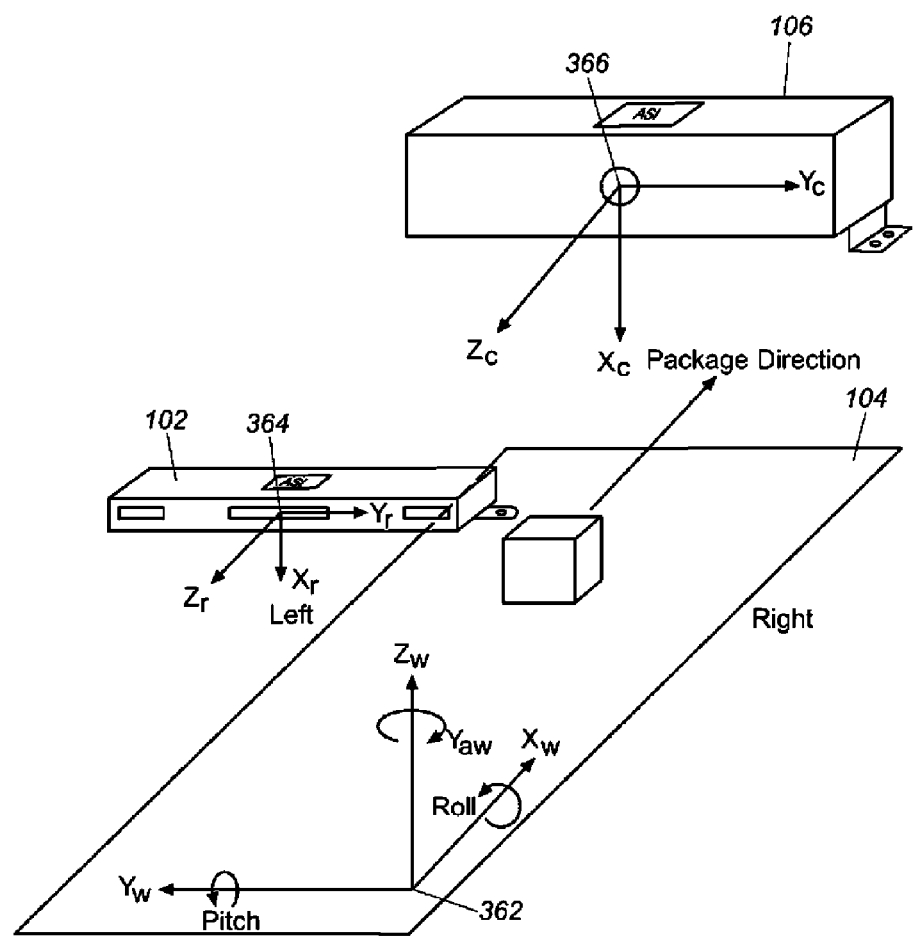
FIG. 31 is a perspective view of the coordinate systems used in the tunnel system of FIG. 3.
Figure 38:
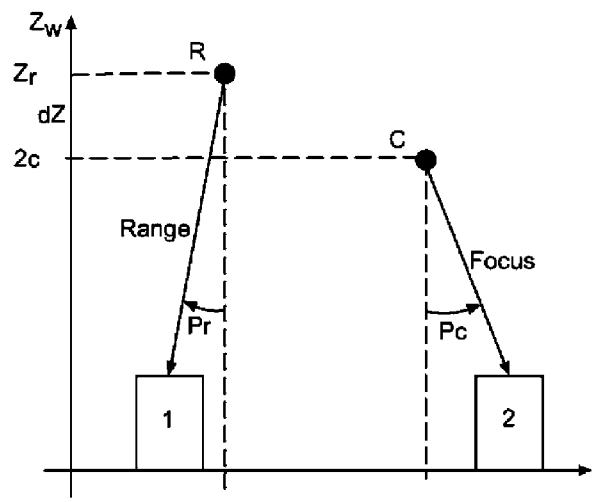
FIG. 38 is a side plan view of the scanning tunnel of FIG. 31.

Top, Front-Top, Rear-Top, and Bottom Read Cameras:

Referring to FIG. 38, using the best focus position (Focus CMD) and Camera Z position calculated above at step 400 with respect to FIG. 31, and the camera's pitch angle calculated at step 406 above, the following formulas can be used to fine tune the camera's X-axis and Z-axis positions and the calculated camera pitch angle.

$$\text{Camera}_Z=(\text{Focus}CMD*\cos(\text{Camera}_{Pitch})+\text{CalBox}_Z$$

$$\text{Camera}_Y=(\text{CameraBoxCenter}_Y-\text{RangerBoxCenter}_Y)+\text{Ranger}_Y$$

$$\text{Camera}_X=((\text{Tach Counts})*(\text{Tach Scale}))+((\text{Ranger}_Z+\text{Camera}_Z)*\tan(\text{Camera}_{Pitch}))$$

Where CameraBoxCenter$_Y$ is the measured center Y-axis position by the camera of the center of the calibration box and the RangerBoxCenter$_Y$ is the measured center Y-axis position by the range finder of the center of the calibration box. Tach Counts is the X-axis distance in counts between the range finder and camera as determined in the previous steps. Still referring to FIG. 38, P$_r$ is the pitch angle of the range finder, P$_c$ is the pitch angle of the camera, Z$_r$ is the Z-axis coordinate of the range finder, and Z$_c$ is the Z-axis coordinate of the camera. The following relationship exists between these values:

$$Z_r=\text{Range}*\cos(P_r)$$

$$Z_c=Z_r-dZ$$

$$\text{Focus}=Zc/\cos(P_c)=(Z_r-dZ)/\cos(P_c)$$

$$dZ=Z_r-((\text{Focus})*(\cos(P_c)))=((\text{Range})*(\cos(P_r))-((\text{Focus})*(\cos(P_c)))$$

Side Read Cameras

Figure 39:
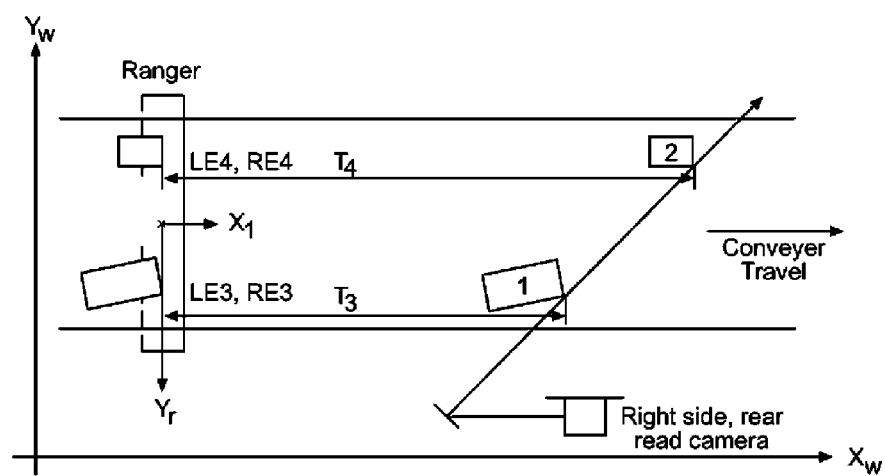
FIG. 39 is a top plan view of the scanning tunnel of FIG. 31.
Figure 40A:
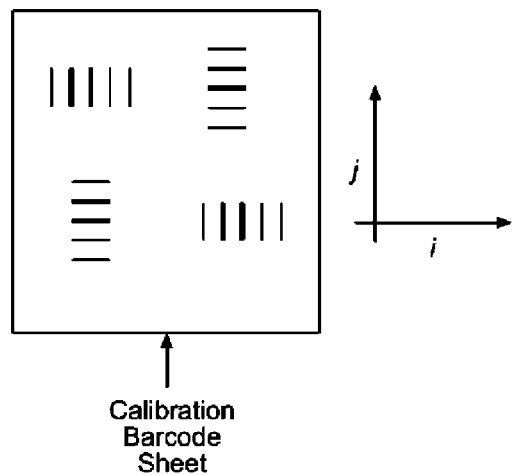
FIG. 40A is a calibration barcode sheet coordinate system in accordance with one embodiment of the present invention.
Figure 40B:
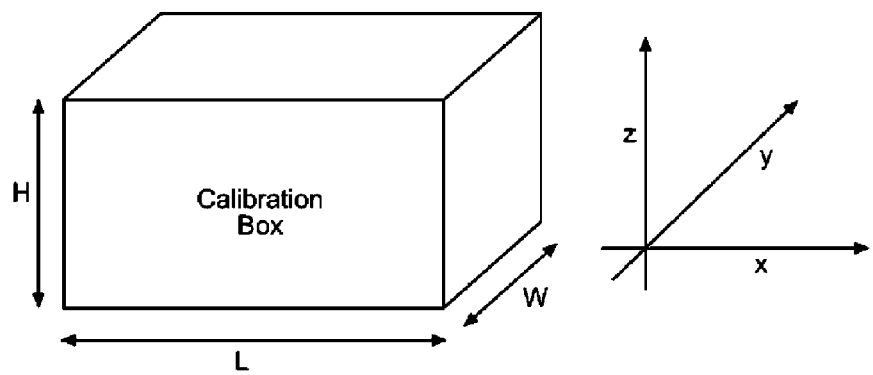
FIG. 40B is a calibration box coordinate system in accordance with one embodiment of the present invention.
Figure 40C:
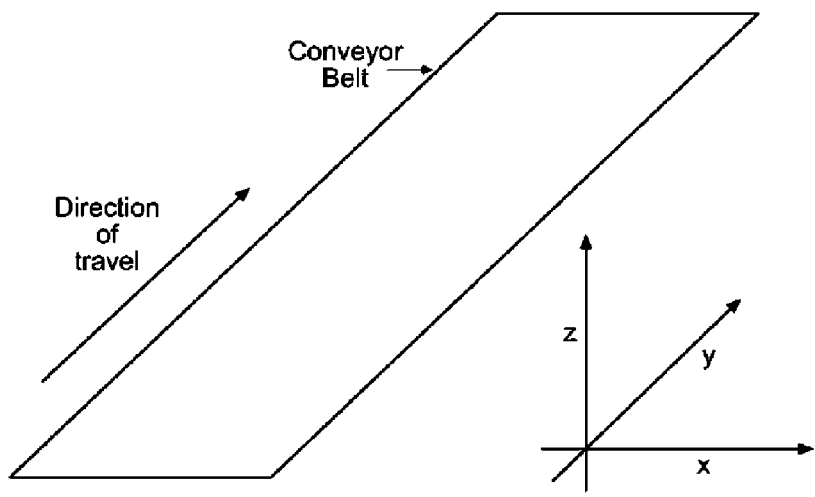
FIG. 40C is a conveyor belt coordinate system in accordance with one embodiment of the present invention.
Figure 40D:
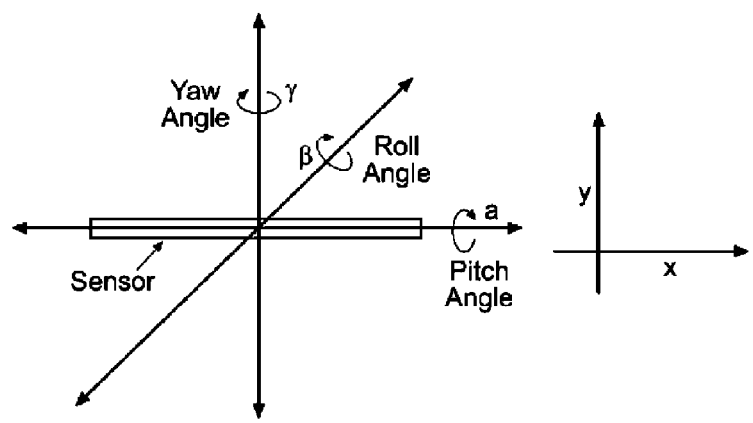
FIG. 40D is a camera coordinate system.

Referring to FIG. 39, the side cameras set their focus based on an initial Y-axis position of each calibration box as reported by the range finder as it entered the range finder's FOV. Each camera then enters a continuous acquire mode in which it compares its current image to a "no-object" image. When a camera detects the presence of a calibration box it records its tachometer count. The tachometer count difference between the range finder and camera for two objects at different Y-axis locations establishes the camera's relationship for tachometer offset for any given range finder Y-axis value. After detecting the presence of a calibration box, the camera collects a series of images representing the barcodes on the side of the calibration box. Initially roll and yaw of side read cameras will be assumed to be zero. Optionally, the target position data could be analyzed to determine yaw and roll angle of the camera with respect to the conveyer.

The direction of the camera's Y-axis with respect to the range finder can be established using the change in height of the objects as reported by the range finder to the camera's Y-axis dimension of the object. Additionally, the camera can verify its mounting location (right or left side, front or rear read) from the range finder's Y-axis position, camera focus distance, and tachometer offset of the two calibration boxes.

$$\text{Camera}_X = (T(RE_1)*\text{Tach Inch per Count}) - (F_1 * \cos(\text{Yaw Angle}))$$

$$\text{Camera}_Y = RE1 - (F_1 * \sin(\text{Yaw Angle}))$$

$$\text{Camera}_Z = 0.5 * (DPI(\text{at near distance}) * 8192)$$

$$T(\text{Range } Y) = ((\text{Range } Y - RE_3) ** ((T_4 - T_3)/(RE_4 - RE_3))) + T_3$$

Two calibration boxes of different sizes are placed onto the conveyor one at a time. The range finder records the tachometer value when the box first enters its FOV. The camera sets a continuous acquire fixed focus mode and compares the current images to a "no object" image. When an object is detected, the system records the tachometer reading. The difference in tachometer values between the range finder and the camera for each object (values $T_3$ and $T_4$) at a given range finder y-axis position is used to set the tachometer offset for any box across the conveyor.

Using the above formulas, values for the x-axis, y-axis and z-axis coordinates and the camera's pitch, roll and yaw angles can be calculated, based on measurements using the camera's focus command look-up table. Consequently, the calculated values from dynamic calibration may be off due to inaccuracies arising from calculating distances using the focus command look-up table. Moreover, during static calibration the pitch angle for each camera is assumed to be the value listed in the CAD drawings shipped with the scanning tunnel, and the yaw and roll angle for each camera is assumed to be zero degrees. Lastly, during dynamic calibration, the position of the calibration box on the belt cannot be controlled, and the boxes may be positioned in an infinite number of orientations. Therefore, to compensate for the unknowns arising during dynamic calibration, the present system uses a series of mathematical equations to map a known point on a given side of a calibration box into pixel coordinates in a given camera since the only known values in the system prior to dynamic calibration are the barcode coordinates with respect to the box and the camera sensor pixel coordinates, i.e. the coordinates of the pixels in the camera with respect to the camera's coordinate system.

During dynamic calibration, each camera in the scanning tunnel captures images of the calibration box as it moves through the tunnel and stores these images in memory. Using the following mapping techniques and the above position equations, precise values for the cameras' x-axis, y-axis and z-axis and the pitch, roll and yaw angle may be calculated using standard non-linear optimization algorithms. That is, based on a series of "known constants," "unknown fixed constants" and "unknown variable constants," the equations may be solved to determine the unknown constants as explained in further detail below.

Referring to FIGS. 40A-40D, the coordinate system for the calibration sheet (FIG. 40A), the calibration box (FIG. 40B), the conveyor system (FIG. 40C) and the camera (FIG. 40D) is shown. "Known system constants" are those parameters which are known to a reasonable degree of certainty, are set at calibration design time and will not change in the future. The significance of these values is that the calibration procedure does not need to solve for these constants, thereby speeding up and improving the accuracy of the solution of the unknown quantities. The "known system constants" include certain features about the calibration box and the cameras, for example the dimensions of the calibration box, the number of pixels in the cameras, and the field of view angle of the cameras, as shown in the table below.

| Description | Variable |
| --- | --- |
| Calibration Box Length | L |
| Calibration Box Width | W |
| Calibration Box Height | H |
| Number Sensor Pixels | NumPixels |
| Camera Field of View Angle | FOV |

Note that the constant FOV could be treated as an "unknown constant" should there be a certain degree of manufacturing variability that introduces an undesired loss of precision in the solution of the remaining parameters. Should more than one calibration box be required during dynamic calibration, the parameters L, W and H should be indexed to indicate which box is being used for calibration at a given time.

"Unknown one-time system constants" are parameters that are constant throughout one given calibration run but, can and most likely will be different on the next calibration run. For each run of the calibration procedure, the exact position of the calibration box is subject to variations in placement and orientation in the conveyor coordinate system—although there should be a fixed "up" side to the calibration box in order to assist in face disambiguation.

| Description | Variable |
| --- | --- |
| Calibration Box Rotation | $\theta$ |
| Calibration Box Offset | $\Delta x_{box}, \Delta y_{box}$ |

"Unknown fixed constants" are parameters that are sought to be solved by the calibration procedure. These values are fixed from calibration run to calibration run, but will vary from machine to machine "Unknown fixed constants" include the lines per inch of the belt (i.e., the tachometer scale factor), and the camera x-axis, y-axis and z-axis and the camera's pitch, roll and yaw angles with respect to the conveyor belt.

| Description | Variable |
| --- | --- |
| Belt Lines Per Inch | LPI |
| Camera Roll | $\alpha_i$ |
| Camera Pitch | $\beta_i$ |
| Camera Yaw | $\gamma_i$ |
| Camera Offset | $\Delta x_{camera_i}, \Delta y_{camera_i}, \Delta z_{camera_i}$ |

The "coordinates" shown in FIGS. 40A-40D comprise all of the coordinate systems used in the following transformation model. For ease of model derivation, five separate coordinate systems are used:

1) Position on calibration box side relative to bottom left corner of the box side;
2) Position on calibration box, relative to centroid of bottom face of the box;
3) Position on belt, relative to point directly underneath top camera;
4) Position in 3-space, relative to each camera; and
5) Pixel coordinates in given camera.

| Description | Variable |
| --- | --- |
| Coordinate on Calibration Barcode Page | i, j |
| Coordinate relative to Calibration Box | $x_{box}, y_{box}, z_{box}$ |
| Coordinate relative to Belt | $x_{belt}, y_{belt}, z_{belt}$ |
| Coordinate relative to camera i | $x_{camera_i}, y_{camera_i}, z_{camera_i}$ |
| Pixel Coordinate | $x_{pixel}, y_{pixel}$ |

In order to transform the barcode coordinates into camera coordinates, the barcode coordinates are first transformed from a point on a calibration barcode sheet (FIG. 40A) to a coordinate in 3-space relative to the calibration box using the following matrices for each of the calibration box sides:

Top Side $$\begin{bmatrix} x_{box} \\ y_{box} \\ z_{box} \end{bmatrix} = \begin{bmatrix} 1 & 0 \\ 0 & 1 \\ 0 & 0 \end{bmatrix} \begin{bmatrix} i \\ j \end{bmatrix} + \begin{bmatrix} -L/2 \\ -W/2 \\ H \end{bmatrix}$$

Bottom Side $$\begin{bmatrix} x_{box} \\ y_{box} \\ z_{box} \end{bmatrix} = \begin{bmatrix} -1 & 0 \\ 0 & 1 \\ 0 & 0 \end{bmatrix} \begin{bmatrix} i \\ j \end{bmatrix} + \begin{bmatrix} L/2 \\ -W/2 \\ 0 \end{bmatrix}$$

Left Side $$\begin{bmatrix} x_{box} \\ y_{box} \\ z_{box} \end{bmatrix} = \begin{bmatrix} 0 & 0 \\ -1 & 0 \\ 0 & 1 \end{bmatrix} \begin{bmatrix} i \\ j \end{bmatrix} + \begin{bmatrix} -L/2 \\ W/2 \\ 0 \end{bmatrix}$$

Right Side $$\begin{bmatrix} x_{box} \\ y_{box} \\ z_{box} \end{bmatrix} = \begin{bmatrix} 0 & 0 \\ 1 & 0 \\ 0 & 1 \end{bmatrix} \begin{bmatrix} i \\ j \end{bmatrix} + \begin{bmatrix} L/2 \\ -W/2 \\ 0 \end{bmatrix}$$

Front Side $$\begin{bmatrix} x_{box} \\ y_{box} \\ z_{box} \end{bmatrix} = \begin{bmatrix} 1 & 0 \\ 0 & 0 \\ 0 & 1 \end{bmatrix} \begin{bmatrix} i \\ j \end{bmatrix} + \begin{bmatrix} -L/2 \\ -W/2 \\ 0 \end{bmatrix}$$

Back Side $$\begin{bmatrix} x_{box} \\ y_{box} \\ z_{box} \end{bmatrix} = \begin{bmatrix} -1 & 0 \\ 0 & 0 \\ 0 & 1 \end{bmatrix} \begin{bmatrix} i \\ j \end{bmatrix} + \begin{bmatrix} L/2 \\ W/2 \\ 0 \end{bmatrix}$$

It is assumed that every vertical barcode sheet is placed right-side up (so that the origin of the sheet is on the bottom left corner of the calibration box side), and that the top sheet is placed so that it origin is at the near left hand side. Next, the calibration box coordinates must be transformed into the belt coordinates. Because the calibration box may be placed on the belt at an unknown rotation relative to the belt, the following matrix is used to transform the barcode coordinates represented in box coordinates into conveyor belt coordinates:

$$\begin{bmatrix} x_{belt} \\ y_{belt} \\ z_{belt} \end{bmatrix} = \begin{bmatrix} \cos\theta & -\sin\theta & 0 \\ \sin\theta & \cos\theta & 0 \\ 0 & 0 & 1 \end{bmatrix} \begin{bmatrix} x_{box} \\ y_{box} \\ z_{box} \end{bmatrix} + \begin{bmatrix} \Delta x_{box} \\ \Delta y_{box} \\ 0 \end{bmatrix}$$

Once the barcode coordinates are represented in conveyor belt coordinates, they must be converted to camera coordinates. The three rotations of each camera may be expressed as a single matrix as follows:

$$R_i = \begin{bmatrix} \cos\alpha_i & -\sin\alpha_i & 0 \\ \sin\alpha_i & \cos\alpha_i & 0 \\ 0 & 0 & 1 \end{bmatrix} \begin{bmatrix} 1 & 0 & 0 \\ 0 & \cos\beta_i & -\sin\beta_i \\ 0 & \sin\beta_i & \cos\beta_i \end{bmatrix} \begin{bmatrix} \cos\gamma_i & 0 & -\sin\gamma_i \\ 0 & 1 & 0 \\ \sin\gamma_i & 0 & \cos\gamma_i \end{bmatrix}$$

Each camera has a given offset to the belt, and pitch, roll and yaw angles that rotate the box within its field of view. Thus, the following matrix is used to convert from belt coordinates to camera coordinates for each camera:

$$\begin{bmatrix} x_{camera_i} \\ y_{camera_i} \\ z_{camera_i} \end{bmatrix} = R_i \begin{bmatrix} x_{belt} \\ y_{belt} \\ z_{belt} \end{bmatrix} + \begin{bmatrix} \Delta x_{camera_i} \\ \Delta y_{camera_i} \\ \Delta z_{camera_i} \end{bmatrix}$$

The above expression gives the 3-space coordinates for the calibration box. However, in a camera using a linear sensor such as that described above, 3D space is created by aggregating multiple 1D field of view images to create a 2D view. Because the direction of motion of the box is along the belt (the x-axis), the direction of motion of the box in terms of the belt coordinates is:

$$\vec{v}_{belt} = \begin{bmatrix} 1 \\ 0 \\ 0 \end{bmatrix}$$

Converting this to camera coordinates, the direction of motion can be represented as:

$$\vec{v}_{camera_i} = R_i \begin{bmatrix} 1 \\ 0 \\ 0 \end{bmatrix}$$

Therefore, a point in 3-space would become visible when its location in the camera's coordinate system has a zero value for its y location.

$$\begin{bmatrix} x_{camera_i} \\ y_{camera_i} \\ z_{camera_i} \end{bmatrix} + y_{visible_i} \vec{v}_{camera_i} = \begin{bmatrix} x_{visible_i} \\ 0 \\ z_{visible_i} \end{bmatrix}$$

This may in turn be rewritten in the following form:

$$\begin{bmatrix} x_{visible_i} \\ y_{visible_i} \\ z_{visible_i} \end{bmatrix} = \left( \begin{bmatrix} 1 & 0 & 0 \\ 0 & 0 & 0 \\ 0 & 0 & 1 \end{bmatrix} - \frac{\begin{bmatrix} 0 & 0 & 0 \\ 1 & 0 & 1 \\ 0 & 0 & 0 \end{bmatrix} R_i \begin{bmatrix} 0 & 1 & 0 \\ 0 & 0 & 0 \\ 0 & 0 & 0 \end{bmatrix} + \begin{bmatrix} 0 & 0 & 0 \\ 0 & 1 & 0 \\ 0 & 0 & 0 \end{bmatrix}}{[0 \ 1 \ 0] R_i \begin{bmatrix} 1 \\ 0 \\ 0 \end{bmatrix}} \right) \begin{bmatrix} x_{camera_i} \\ y_{camera_i} \\ z_{camera_i} \end{bmatrix}$$

Note that the above equation will only have a zero denominator when the rotation about the camera's x-axis is zero since the optical axis of the camera will be parallel to the belt, resulting in a camera that is not able to "see" any points on the box—as it is only able to "see" points at its own elevation, which by design is higher than any object that is able to pass on the belt.

Finally, using similar triangles, the equation for mapping from a point in three dimensional space to a pixel on the x-axis and y-axis of the sensor are as follows:

$$x_{pixel} = \frac{NumPixels}{2\tan\left(\frac{FOV_i}{2}\right)} \frac{x_{visible_i}}{z_{visible_i}} + \frac{NumPixels}{2}$$

$$y_{pixel} = LPI \, y_{visible_i}$$

Cascading all of the steps up to, but not including, transforming to pixel coordinates results in the following formula:

$$\begin{bmatrix} x_{visible_i} \\ y_{visible_i} \\ z_{visible_i} \end{bmatrix} = \begin{bmatrix} a & b \\ c & d \\ e & f \end{bmatrix} \begin{bmatrix} i \\ j \end{bmatrix} + \begin{bmatrix} g \\ h \\ k \end{bmatrix}$$

for some value of a through k. Simply performing the matrix algebra with the substitution of the appropriate values of the parameters will give the values of the constants. One such equation will exist for each face of the calibration box for each camera, for a total of 25 equations. Mapping into pixels results in the following formula:

$$x_{pixel} = \frac{A + Bi + Cj}{D + Ei + Fj}$$

$$y_{pixel} = G + Hi + Kj$$

where $$\begin{bmatrix} A \\ B \\ C \\ D \\ E \\ F \\ G \\ H \\ K \end{bmatrix} = \begin{bmatrix} \frac{NumPixels}{2}\left(\frac{g}{\tan\frac{FOV_i}{2}} + k\right) \\ \frac{NumPixels}{2}\left(\frac{a}{\tan\frac{FOV_i}{2}} + e\right) \\ \frac{NumPixels}{2}\left(\frac{b}{\tan\frac{FOV_i}{2}} + f\right) \\ k \\ e \\ f \\ LPI \, h \\ LPI \, c \\ LPI \, d \end{bmatrix}$$

Furthermore, these equations may be inverted so that positions on any side of the calibration box may be expressed in terms of the pixel location on a given camera.

$$i = \frac{AK - CG + (FG - DK)x + Cy - Fxy}{CH - BK + (EK - FH)x}$$

$$j = -\frac{AK - BG + (EG - DH)x + By - Exy}{CH - BK + (FH - EK)x}$$

It should be noted that a given pixel may map to points on more than one side of the calibration box. Of course, not every side will in reality be visible to every camera, so some logic must be performed to determine which sides of the calibration box are visible to the camera. In one embodiment, the system may simply compute the z-axis coordinate for each side using the following formula:

$$z = D + Ei + Fj$$

Therefore, choosing the size that is closest to the camera (smallest z coordinate) may be assumed to be the side that is visible.

In solving for the above, the constants a-k are estimated values based on the tunnel design and values obtained through static calibration. By starting with appropriate estimations of constants a through k, initial values for A to K may be calculated. Through the use of standard non-linear optimization algorithms, for example the gradient decent method, the Nelder-Mead method or the simulated annealing method, the unknown parameters for each of the cameras may be determined by solving the equations until the predicted pixel location is as close to the actual pixel location as possible. Thus, in a scanning tunnel having five cameras, the above equations result in thirty-one degrees of freedom—i.e., x-axis, y-axis and z-axis and pitch, roll and yaw angles for each camera and the tachometer scale.

At step 408, the GUI presents the results of the calibration to the installer. The installer can accept the results, modify the results, or in cases where the results are out of tolerances, repeat some or all of the calibration steps. In addition, a summary page that contains the settings for the system's decode engine is presented for the installer's review and acceptance. In step 410, the GUI prompts the user to clear all calibration boxes and other objects from the conveyor in preparation for an empty conveyor test. The empty conveyor test is designed to verify that the system is not treating any conveyor artifacts, i.e. belt bubbles, seams, etc., as object triggers. Finally, at step 412, the GUI prompts the installer to export the calibration and set-up data for offline storage. In addition, calibration data for each camera and the range finder is also stored in every camera. Therefore, when a camera or range finder is replaced in the system, the calibration data can be downloaded to the new component from any of the other components without having to recalibrate the system. The ability to switch out component arises from the three point mounting brackets and the networked components in the scanning tunnel. The mounting bracket ensures that a replacement component is mounted at the same coordinates and angles as the component it is replacing—within acceptable tolerances. The network allows information to be shared from existing components with the replacement component, thereby eliminating the necessity for the installer to directly connect to the replacement component in order to calibrate the component.

Once calibrated, the tunnel system can operate to scan barcodes and track packages placed on the conveyor belt. For example, given a particular y-axis value of a package detected by the range finder, the camera, based on its x-, y- and z-axis position with respect to the range finder, can determine when to expect that particular edge of the package associated with the range finder y-axis value to enter the camera's fields of view. Moreover, the values calculated for the pitch, roll and yaw for each camera can be used to correct for distortion in the captured images. For example, when a barcode is read by a camera, the distance between the bars of the code may be compressed or expanded due to the camera's positioning in the scanning tunnel. Thus, one of skill in the art of barcode scanning tunnels would understand how to uses the calculated calibration values for these angles to compensate for such image distortions.

In addition to distortion compensation, the automated calibration technique described herein allows for a low level trained technician to quickly set-up a scanning tunnel in the field without the need for one or more highly trained installers. Furthermore, the three point mounting brackets allows for a scanning tunnel to be set-up in the field with negligible differences from one set-up to another. Therefore, the auto-calibration techniques described herein allows for these negligible differences to be removed from the system. Finally, the described apparatus and method of calibration allows for the parts of the system, for example a camera or parts of the camera, to be exchanged without the need of recalibrating the entire scanning tunnel or individual camera. Instead, after a camera is replaced, the measured calibration values are downloaded over the network to the new camera and the tunnel is ready to operate without performing a time consuming recalibration of the new camera or the overall scanning tunnel.

In the network scanning tunnel described above, cameras 106, 108 and 110 may play different roles in a scanning tunnel. For example, one camera may be assigned as the master camera. The master camera would receive a trigger signal and the system tachometer signal, and it would in turn provide a trigger signal to the other cameras as well as focus information to other cameras in the tunnel. The remaining cameras in the tunnel system would be slave units that receive trigger and focus information from the master camera. In some embodiments, one camera may be connected to the host system and would be responsible for transmitting package data to the host system. It should be understood that in other embodiments, more than one camera may be connected to the host system, or different cameras may be connected to different host systems.

During operation of the scanning tunnel, data collected by each camera for a single box is combined into a single message, which is transmitted to the host system when the package reaches a transmit point. Bar code and package information may be transferred between cameras over the 100Base-T Ethernet network. Each of camera modules 106, 108 and 110 is capable of correlating the messages from all of the other cameras in the tunnel system and generating a combined message. Thus, two camera modules in the same tunnel system may be connected to different host systems, each with a different data format and transmit points.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A method of calibrating a barcode scanning tunnel, said method comprising:
   a. providing a scanning tunnel having
      i. a moveable surface,
      ii. at least one camera having an orientation; and
      iii. a first calibration object having an indicia disposed in a predetermined relationship to a feature of said first calibration object;
   b. capturing at least one image of said first calibration object by said at least one camera when the first calibration object is on the moveable surface;
   c. electronically detecting, within the at least one image captured at step (b), the indicia and the feature, and determining a relationship between the indicia and the feature in the image; and
   d. determining at least one component of said at least one camera's orientation with respect to said moveable surface based on comparison of the relationship determined at step (c) with the predetermined relationship.

2. The method of calibrating a barcode scanning tunnel of claim 1, wherein step (a) comprises providing at least one dimensioning device having an orientation, said method further comprising electronically calculating a height and extents of the first calibration object by said at least one dimensioning device by electronically detecting one or more said calibration object features.

3. The method of claim 2, wherein the dimensioning device is separate from the at least one camera.

4. The method of claim 2, wherein the dimensioning device is a module of the at least one camera.

5. The method of calibrating a barcode scanning tunnel of claim 1, wherein said indicia is a barcode.

6. The method of calibrating a barcode scanning tunnel of claim 5, wherein the first calibration object has a plurality of the indicia, each disposed in a respective said predetermined relationship to a respective said feature of the first calibration object.

7. The method of calibrating a barcode scanning tunnel of claim 6, wherein said respective predetermined relationship between each said indicia and its respective calibration object feature comprises distance of said indicia from its respective said calibration object feature.

8. The method of calibrating a barcode scanning tunnel of claim 1, wherein said feature of the first calibration object comprises at least one of a length, width and height of the first calibration object.

9. The method of calibrating a barcode scanning tunnel of claim 1, further comprising providing a second calibration object having a plurality of said indicia disposed in respective predetermined relationships to respective said features of said second calibration object.

10. The method of calibrating a barcode scanning tunnel of claim 9, wherein
    a. each said indicia is formed from a plurality of bars, and
    b. a spacing between adjacent said bars of said plurality of bars and a thickness of each bar of said plurality of bars is known.

11. The method of calibrating a barcode scanning tunnel of claim 1, further comprising:
    a. placing the first calibration object at a first position on said moveable surface when said moveable surface is stationary;

b. placing the first calibration object at a second position on said moveable surface when said moveable surface is stationary;
c. capturing a first image of the first calibration object at said first position;
d. capturing a second image of the first calibration object at said second position; and
e. electronically calculating a region of interest based on information contained in said first image and said second image related to said feature of the first calibration object.

12. The method of calibrating a barcode scanning tunnel of claim 11, further comprising:
   a. placing the first calibration object at a first position distal from said at least one camera on said moveable surface when said moveable surface is stationary;
   b. placing the first calibration object at a second position proximate to said at least one camera on said moveable surface when said moveable surface is stationary;
   c. measuring a distance between the first calibration object at said first distal position and said at least one camera using electronics of said at least one camera;
   d. measuring a distance between the first calibration object at said second proximate position and said at least one camera using the electronics of said at least one camera; and
   e. electronically calculating a height of said at least one camera with respect to a surface of said moveable surface.

13. The method of calibrating a barcode scanning tunnel of claim 1, wherein step (a) comprises providing at least one dimensioning device having an orientation, said method further comprising calculating a positional relationship of said at least one camera, said moveable surface and said at least one dimensioning device with respect to one another.

14. The method of calibrating a barcode scanning tunnel of claim 1, wherein
   a. said moveable surface defines an x-axis in a direction of travel of said moveable surface, a z-axis normal to a top surface of said moveable surface and a y-axis transverse to said direction of travel of said moveable surface; and
   b. said at least one component of said at least one camera's orientation with respect to said moveable surface is selected from the group consisting of:
      i. a z-axis offset from said moveable surface;
      ii. a pitch angle with respect to said moveable surface x-axis;
      iii. a yaw angle with respect to said moveable surface z-axis; and
      iv. a roll angle with respect to said moveable surface y-axis.

15. The method of calibrating a barcode scanning tunnel of claim 1, wherein step (a) comprises providing at least one dimensioning device having an orientation, and the method further comprising:
   a. providing a plurality of said cameras each having an orientation with respect to said moveable surface and said at least one dimensioning device; and
   b. networking said plurality of cameras and said at least one dimensioning device,
   wherein said networked plurality of cameras and said at least one dimensioning device share information to electronically calculate at least one component of said orientation of said each camera with respect to said at least one dimensioning device and said moveable surface.

16. The method of calibrating a barcode scanning tunnel of claim 15, wherein
   a. said moveable surface defines an x-axis in a direction of travel of said moveable surface, a z-axis normal to a top surface of said moveable surface and a y-axis transverse to said direction of travel of said moveable surface; and
   b. in said step of determining at least one component comprises determining a value of the at least one component of said orientation of said each camera, wherein said at least one component is selected from the group consisting of:
      i. an x-axis offset from said at least one dimensioning device;
      ii. a y-axis offset from said at least one dimensioning device;
      iii. a z-axis offset from said moveable surface;
      iv. a pitch angle with respect to said moveable surface x-axis;
      v. a yaw angle with respect to said moveable surface z-axis; and
      vi. a roll angle with respect to said moveable surface y-axis.

17. A method of calibrating a barcode scanning tunnel, said method comprising:
   a. providing a calibration object having an indicia disposed thereon;
   b. providing a first coordinate system defined with respect to the calibration object, so that a location of the indicia in the first coordinate system is known;
   c. providing a scanning tunnel having (i) a moveable surface and (ii) a camera having an orientation;
   d. providing a second coordinate system defined with respect to the moveable surface, wherein a plurality of parameters define the camera's orientation within the second coordinate system;
   e. providing a third coordinate system defined with respect to images captured by the camera;
   f. for a said calibration object disposed on the moveable surface, providing a first transform between the first coordinate system and the second coordinate system;
   g. providing a second transform between the second coordinate system and the third coordinate system, wherein the second transform includes variables defined by components of the camera's orientation;
   h. capturing an image of the calibration object by the camera when the calibration object is disposed on the moveable surface, and detecting a first position of the indicia therein in the third coordinate system;
   i. determining a second position of the indicia, in the first coordinate system, based on the first transform, the second transform, and estimated values for the variables; and
   j. based on comparison of the first position and the second position, modifying the values of the variables, and repeating step (i), so that the second position moves toward the first position.

18. A system for calibrating a barcode scanning system, comprising:
   at least one camera disposed in a predetermined position with respect to a moveable surface, the at least one camera having an orientation;
   a computer in communication with the camera; and
   a first calibration object having an indicia disposed in a predetermined relationship to a respective feature of the first calibration object,
   wherein the computer is configured to
      electronically detect, within at least one image captured by the at least one camera of the first calibration object when the first calibration object is on the movable surface, the indicia and the respective feature and to determine a relationship between the indicia and the respective feature in the image, and determine at least one component of said at least one camera's orientation with respect to the movable surface based on comparison of the determined relationship between the indicia and the respective feature with the predetermined relationship.

19. The system as in claim 18, wherein the computer is separate from the camera.

20. The system as in claim 18, wherein said indicia is a barcode.

21. The system as in claim 20, wherein the first calibration object has a plurality of the indicia, each disposed in a respective said predetermined relationship to a respective said feature of the first calibration object.

22. The system as in claim 21, wherein said respective predetermined relationship between each said indicia and its respective calibration object feature comprises distance of said indicia from its respective said calibration object feature.

23. The system as in claim 18, wherein said respective feature of the first calibration object comprises at least one of a length, width and height of the first calibration object.

24. The system as in claim 18, further comprising a second calibration object having a plurality of said indicia disposed in respective predetermined relationships to respective features of said second calibration object.

25. The system as in claim 24, wherein each said indicia is formed from a plurality of bars, and a spacing between adjacent said bars of said plurality of bars and a thickness of each bar of said plurality of bars is predetermined.

26. The system as in claim 18, wherein the computer is configured to electronically calculate a region of interest based on information related to said respective feature of the first calibration object contained in a first image acquired by the at least one camera and a second image acquired by the at least one camera, wherein the first image is of the first calibration object at a first position on the movable surface when the movable surface is stationary, and wherein the second image is of the first calibration object at a second position on the moveable surface when the moveable surface is stationary.

27. The system as in claim 26, wherein the computer is configured to electronically calculate a height of said at least one camera with respect to the moveable surface based on detection of the first position in the first image, the second position in the second image, and a difference between the detected first position and the detected second position.

28. The system as in claim 18, further comprising
a dimensioning device disposed in a predetermined position with respect to the moveable surface, and
a plurality of said cameras, each having a respective said orientation with respect to the moveable surface and said dimensioning device.

29. The system as in claim 28, wherein the dimensioning device and the plurality of cameras are in a networked communication with each other, and wherein the computer is in communication with the dimensioning device and the plurality of cameras through the networked communication.

30. The system as in claim 29, wherein
a. said moveable surface defines an x-axis in a direction of travel of said moveable surface, a z-axis normal to a top surface of said moveable surface and a y-axis transverse to said direction of travel of said moveable surface; and
b. the computer is configured to determine a value of the at least one component of said respective orientation of said each camera, wherein said at least one component is selected from the group consisting of:
   i. an x-axis offset from said dimensioning device;
   ii. a y-axis offset from said dimensioning device;
   iii. a z-axis offset from said moveable surface;
   iv. a pitch angle with respect to said moveable surface x-axis;
   v. a yaw angle with respect to said moveable surface z-axis; and
   vi. a roll angle with respect to said moveable surface y-axis.

* * * * *